United States Patent
El-Kady et al.

(10) Patent No.: US 11,062,855 B2
(45) Date of Patent: Jul. 13, 2021

(54) DEVICES AND METHODS FOR HIGH VOLTAGE AND SOLAR APPLICATIONS

(71) Applicants: The Regents of the University of California, Oakland, CA (US); Nanotech Energy, Inc., Los Angeles, CA (US)

(72) Inventors: Maher F. El-Kady, Los Angeles, CA (US); Richard B. Kaner, Pacific Palisades, CA (US); Jack Kavanaugh, Los Angeles, CA (US)

(73) Assignees: The Regents of the University of California, Oakland, CA (US); Nanotech Energy, Inc., Los Angeles, CA (US)

( * ) Notice: Subject to any disclaimer, the term of this patent is extended or adjusted under 35 U.S.C. 154(b) by 290 days.

(21) Appl. No.: 15/466,425

(22) Filed: Mar. 22, 2017

(65) Prior Publication Data
US 2017/0278643 A1 Sep. 28, 2017

Related U.S. Application Data

(60) Provisional application No. 62/312,408, filed on Mar. 23, 2016, provisional application No. 62/421,920, filed on Nov. 14, 2016.

(51) Int. Cl.
*H01G 11/32* (2013.01)
*H01G 11/28* (2013.01)
(Continued)

(52) U.S. Cl.
CPC ............ *H01G 11/32* (2013.01); *H01G 11/04* (2013.01); *H01G 11/10* (2013.01); *H01G 11/28* (2013.01);
(Continued)

(58) Field of Classification Search
CPC ........ H01G 11/32; H01G 11/04; H01G 11/10; H01G 11/28; H01G 11/66; Y02E 60/13; Y02T 10/7022; H01M 12/005
(Continued)

(56) References Cited

U.S. PATENT DOCUMENTS 2,800,616 A 7/1957 Becker
3,288,641 A 11/1966 Rightmire
(Continued)

FOREIGN PATENT DOCUMENTS

CA 2862806 A1 * 10/2013 ............. B32B 27/32
CN 100372035 C 2/2008
(Continued)

OTHER PUBLICATIONS

Wang, Xu et al., "Manganese Oxide Micro-Supercapacitors with Ultra-high Areal Capacitance," Electronic Supplementary Material (ESI) for Nanoscale, vol. 5, Mar. 21, 2013, The Royal Society of Chemistry, 6 pages.
(Continued)

*Primary Examiner* — Michael P McFadden
(74) *Attorney, Agent, or Firm* — Withrow & Terranova, P.L.L.C.

(57) ABSTRACT

Provided herein are devices comprising one or more cells, and methods for fabrication thereof. The devices may be electrochemical devices. The devices may include three-dimensional supercapacitors. The devices may be microdevices such as, for example, microsupercapacitors. In some embodiments, the devices are three-dimensional hybrid microsupercapacitors. The devices may be configured for high voltage applications. In some embodiments, the devices are high voltage microsupercapacitors. In certain embodiments, the devices are high voltage asymmetric microsuper-
(Continued)

capacitors. In some embodiments, the devices are integrated microsupercapacitors for high voltage applications.

20 Claims, 31 Drawing Sheets

(51) Int. Cl.
H01G 11/66 (2013.01)
H01M 12/00 (2006.01)
H01G 11/10 (2013.01)
H01G 11/04 (2013.01)

(52) U.S. Cl.
CPC .......... *H01G 11/66* (2013.01); *H01M 12/005* (2013.01); *Y02E 60/13* (2013.01); *Y02T 10/70* (2013.01)

(58) Field of Classification Search
USPC ........................................................ 361/502
See application file for complete search history.

(56) References Cited

U.S. PATENT DOCUMENTS

| | | | |
|---|---|---|---|
| 3,536,963 A | 10/1970 | Boos | |
| 3,652,902 A | 3/1972 | Hart et al. | |
| 4,327,157 A | 4/1982 | Himy et al. | |
| 5,225,296 A | 7/1993 | Ohsawa et al. | |
| 5,442,197 A | 8/1995 | Andrieu et al. | |
| 6,043,630 A | 3/2000 | Koenck et al. | |
| 6,117,585 A | 9/2000 | Anani et al. | |
| 6,252,762 B1 | 6/2001 | Amatucci | |
| 6,451,074 B2 | 9/2002 | Bluvstein et al. | |
| 6,510,043 B1 | 1/2003 | Shiue et al. | |
| 6,522,522 B2 | 2/2003 | Yu et al. | |
| 6,982,517 B2 | 1/2006 | Reineke et al. | |
| 7,623,340 B1 | 11/2009 | Song et al. | |
| 7,833,663 B2 | 11/2010 | Phillips et al. | |
| 7,875,219 B2 | 1/2011 | Zhamu et al. | |
| 8,315,039 B2 | 11/2012 | Zhamu et al. | |
| 8,503,161 B1 | 8/2013 | Chang et al. | |
| 8,593,714 B2 | 11/2013 | Agrawal et al. | |
| 8,753,772 B2 | 6/2014 | Liu et al. | |
| 8,771,630 B2 | 7/2014 | Wu et al. | |
| 8,828,608 B2 | 9/2014 | Sun et al. | |
| 8,906,495 B2 | 12/2014 | Chen | |
| 8,951,675 B2 | 2/2015 | Bhardwaj et al. | |
| 9,118,078 B2 | 8/2015 | Huang et al. | |
| 9,295,537 B2 | 3/2016 | Cao | |
| 9,437,372 B1 | 9/2016 | Zhamu et al. | |
| 2002/0136881 A1 | 9/2002 | Yanagisawa et al. | |
| 2002/0160257 A1 | 10/2002 | Lee et al. | |
| 2003/0013012 A1 | 1/2003 | Ahn et al. | |
| 2003/0169560 A1 | 9/2003 | Welsch et al. | |
| 2004/0090736 A1 | 5/2004 | Bendale et al. | |
| 2004/0099641 A1 | 5/2004 | Mathieu et al. | |
| 2004/0131889 A1 | 7/2004 | Leddy et al. | |
| 2005/0153130 A1 | 7/2005 | Long et al. | |
| 2006/0121342 A1 | 6/2006 | Sano et al. | |
| 2006/0201801 A1 | 9/2006 | Bartlett et al. | |
| 2006/0207878 A1 | 9/2006 | Myung et al. | |
| 2006/0269834 A1 | 11/2006 | West et al. | |
| 2007/0172739 A1 | 7/2007 | Visco et al. | |
| 2007/0204447 A1 | 9/2007 | Bernstein et al. | |
| 2008/0090141 A1 | 4/2008 | Meitav et al. | |
| 2008/0158778 A1 | 7/2008 | Lipka et al. | |
| 2008/0180883 A1 | 7/2008 | Palusinski et al. | |
| 2008/0199737 A1 | 8/2008 | Kazaryan et al. | |
| 2008/0220293 A1 | 9/2008 | Marmaropoulos et al. | |
| 2009/0059474 A1 | 3/2009 | Zhamu et al. | |
| 2009/0117467 A1 | 5/2009 | Zhamu et al. | |
| 2009/0289328 A1 | 11/2009 | Tanioku | |
| 2009/0290287 A1 | 11/2009 | Lipka et al. | |
| 2010/0159346 A1 | 6/2010 | Hinago et al. | |
| 2010/0159366 A1 | 6/2010 | Shao-Horn et al. | |
| 2010/0195269 A1 | 8/2010 | Kim et al. | |
| 2010/0203362 A1 | 8/2010 | Lam et al. | |
| 2010/0221508 A1 | 9/2010 | Huang et al. | |
| 2010/0226066 A1 | 9/2010 | Sweeney et al. | |
| 2010/0237296 A1 | 9/2010 | Gilje | |
| 2010/0266964 A1 | 10/2010 | Gilje | |
| 2010/0273051 A1 | 10/2010 | Choi et al. | |
| 2010/0317790 A1 | 12/2010 | Jang et al. | |
| 2011/0026189 A1 | 2/2011 | Wei et al. | |
| 2011/0111283 A1 | 5/2011 | Rust, III et al. | |
| 2011/0111299 A1 | 5/2011 | Liu et al. | |
| 2011/0143101 A1 | 6/2011 | Sandhu | |
| 2011/0159372 A1 | 6/2011 | Zhamu et al. | |
| 2011/0163274 A1 | 7/2011 | Plee et al. | |
| 2011/0163699 A1 | 7/2011 | Elder et al. | |
| 2011/0183180 A1 | 7/2011 | Yu et al. | |
| 2011/0227000 A1 | 9/2011 | Ruoff et al. | |
| 2011/0242730 A1 | 10/2011 | Zhou et al. | |
| 2011/0256454 A1 | 10/2011 | Nicolas et al. | |
| 2011/0318257 A1 | 12/2011 | Sokolov et al. | |
| 2012/0111730 A1 | 5/2012 | Choi et al. | |
| 2012/0129736 A1 | 5/2012 | Tour et al. | |
| 2012/0134072 A1 | 5/2012 | Bae et al. | |
| 2012/0145234 A1 | 6/2012 | Roy-Mayhew et al. | |
| 2012/0300364 A1 | 11/2012 | Cai et al. | |
| 2012/0313591 A1 | 12/2012 | Brambilla et al. | |
| 2013/0026409 A1 | 1/2013 | Baker et al. | |
| 2013/0048949 A1 | 2/2013 | Xia et al. | |
| 2013/0056346 A1 | 3/2013 | Sundara et al. | |
| 2013/0056703 A1 | 3/2013 | Elian et al. | |
| 2013/0100581 A1 | 4/2013 | Jung et al. | |
| 2013/0155578 A1 | 6/2013 | Tsai et al. | |
| 2013/0161570 A1 | 6/2013 | Hwang et al. | |
| 2013/0168611 A1 | 7/2013 | Zhou et al. | |
| 2013/0171502 A1 | 7/2013 | Chen et al. | |
| 2013/0180912 A1 | 7/2013 | Li | |
| 2013/0182373 A1 | 7/2013 | Yu et al. | |
| 2013/0189602 A1 | 7/2013 | Lahiri et al. | |
| 2013/0217289 A1 | 8/2013 | Nayfeh et al. | |
| 2013/0230747 A1 | 9/2013 | Patolsky et al. | |
| 2013/0264041 A1 | 10/2013 | Zhamu et al. | |
| 2013/0266858 A1 | 10/2013 | Inoue et al. | |
| 2013/0280601 A1 | 10/2013 | Geramita et al. | |
| 2013/0314844 A1 | 11/2013 | Chen et al. | |
| 2013/0330617 A1 | 12/2013 | Yoshimura et al. | |
| 2014/0029161 A1 | 1/2014 | Beidaghi et al. | |
| 2014/0030590 A1 | 1/2014 | Wang et al. | |
| 2014/0045058 A1 | 2/2014 | Zhao et al. | |
| 2014/0050947 A1 | 2/2014 | Donnelly | |
| 2014/0065447 A1 | 3/2014 | Liu et al. | |
| 2014/0099558 A1 | 4/2014 | Itakura et al. | |
| 2014/0118883 A1 | 5/2014 | Xie | |
| 2014/0120453 A1 | 5/2014 | Ajayan et al. | |
| 2014/0134503 A1 | 5/2014 | Lockett et al. | |
| 2014/0154164 A1 | 6/2014 | Chen et al. | |
| 2014/0170476 A1* | 6/2014 | Tan | H01G 11/86 429/188 |
| 2014/0178763 A1 | 6/2014 | Mettan | |
| 2014/0205841 A1 | 7/2014 | Qui et al. | |
| 2014/0255776 A1 | 9/2014 | Song et al. | |
| 2014/0255785 A1 | 9/2014 | Do et al. | |
| 2014/0287308 A1 | 9/2014 | Okada et al. | |
| 2014/0313636 A1 | 10/2014 | Tour et al. | |
| 2014/0323596 A1 | 10/2014 | Jeong et al. | |
| 2015/0050554 A1 | 2/2015 | Fukumine et al. | |
| 2015/0098167 A1 | 4/2015 | El-Kady et al. | |
| 2015/0103469 A1 | 4/2015 | Lee et al. | |
| 2015/0111449 A1 | 4/2015 | Cruz-Silva et al. | |
| 2015/0218002 A1 | 8/2015 | Plomb et al. | |
| 2015/0218003 A1 | 8/2015 | Zhamu et al. | |
| 2015/0235776 A1 | 8/2015 | Miller | |
| 2015/0259212 A1 | 9/2015 | Li et al. | |
| 2015/0287544 A1 | 10/2015 | Irazoqui et al. | |
| 2015/0311504 A1 | 10/2015 | Hong et al. | |
| 2015/0332868 A1 | 11/2015 | Jung et al. | |
| 2015/0340171 A1 | 11/2015 | Li et al. | |
| 2015/0364738 A1 | 12/2015 | Pope et al. | |
| 2015/0364755 A1 | 12/2015 | Liu et al. | |
| 2016/0035498 A1 | 2/2016 | Honma et al. | |

(56) References Cited

U.S. PATENT DOCUMENTS

| | | | |
|---|---|---|---|
| 2016/0055983 A1 | 2/2016 | Kurungot et al. | |
| 2016/0077074 A1 | 3/2016 | Strong et al. | |
| 2016/0099116 A1* | 4/2016 | Yang | H01G 13/00 |
| | | | 264/406 |
| 2016/0133396 A1* | 5/2016 | Hsieh | H01G 11/38 |
| | | | 361/502 |
| 2016/0148759 A1 | 5/2016 | El-Kady et al. | |
| 2017/0062821 A1 | 3/2017 | Tour et al. | |
| 2017/0240424 A1 | 8/2017 | Roberts et al. | |
| 2017/0338472 A1 | 11/2017 | Zhamu et al. | |
| 2018/0366280 A1 | 12/2018 | Hwang et al. | |
| 2019/0006675 A1 | 1/2019 | Cheng et al. | |
| 2019/0088420 A1 | 3/2019 | Tour et al. | |
| 2019/0237752 A1 | 8/2019 | El-Kady et al. | |

FOREIGN PATENT DOCUMENTS

| | | |
|---|---|---|
| CN | 101723310 A | 6/2010 |
| CN | 101894679 A | 11/2010 |
| CN | 102187413 A | 9/2011 |
| CN | 102509632 A | 6/2012 |
| CN | 102543483 A | 7/2012 |
| CN | 102923698 A | 2/2013 |
| CN | 103208373 A | 7/2013 |
| CN | 103723715 A | 4/2014 |
| CN | 203631326 U | 6/2014 |
| CN | 203839212 U | 9/2014 |
| CN | 104299794 A | 1/2015 |
| CN | 104355306 A | 2/2015 |
| CN | 104617300 A | 5/2015 |
| CN | 104637694 A | 5/2015 |
| CN | 105062074 | 11/2015 |
| EP | 1262579 A2 | 12/2002 |
| EP | 1843362 A1 | 10/2007 |
| EP | 2088637 A2 | 8/2009 |
| EP | 2933229 A1 | 10/2015 |
| JP | S61010855 A | 1/1986 |
| JP | S62287568 A | 12/1987 |
| JP | 2002063894 A | 2/2002 |
| JP | 2003217575 A | 7/2003 |
| JP | 2004039491 A | 2/2004 |
| JP | 2004055541 A | 2/2004 |
| JP | 2004063297 A | 2/2004 |
| JP | 2005138204 A | 6/2005 |
| JP | 2005199267 A | 7/2005 |
| JP | 20050317902 A | 11/2005 |
| JP | 2006252902 A | 9/2006 |
| JP | 2007160151 A | 6/2007 |
| JP | 2009525247 A | 7/2009 |
| JP | 2010222245 A | 10/2010 |
| JP | 2011026153 A | 2/2011 |
| JP | 2011165680 A | 8/2011 |
| JP | 2012169576 A | 9/2012 |
| JP | 2012188484 A | 10/2012 |
| JP | 2013534686 A | 9/2013 |
| JP | 2014053209 A | 3/2014 |
| JP | 2014201492 A | 10/2014 |
| JP | 2015218085 A | 12/2015 |
| KR | 20070083691 A | 8/2007 |
| KR | 20080064967 A | 7/2008 |
| KR | 10-2009-0107498 A | 10/2009 |
| KR | 1020100114827 B1 | 4/2017 |
| NO | 2014181763 A1 | 11/2014 |
| WO | 9632618 A1 | 10/1996 |
| WO | 2011019431 A1 | 2/2011 |
| WO | 2011021982 A1 | 2/2011 |
| WO | 2011072213 A2 | 6/2011 |
| WO | 2012006657 A1 | 1/2012 |
| WO | 2012087698 A1 | 6/2012 |
| WO | 2012138302 A1 | 10/2012 |
| WO | 2013024727 A1 | 2/2013 |
| WO | 2013040636 A1 | 3/2013 |
| WO | 2013066474 A2 | 5/2013 |
| WO | 2013070989 A1 | 5/2013 |
| WO | 2013128082 A1 | 9/2013 |
| WO | 2013155276 A1 | 10/2013 |
| WO | 2014011722 A2 | 1/2014 |
| WO | 2014028978 A1 | 2/2014 |
| WO | 2014062133 A1 | 4/2014 |
| WO | 2014072877 A2 | 5/2014 |
| WO | 2014134663 A1 | 9/2014 |
| WO | 2015023974 A1 | 2/2015 |
| WO | 2015069332 A1 | 5/2015 |
| WO | 2015153895 A1 | 10/2015 |
| WO | 2015195700 A1 | 12/2015 |
| WO | 2016094551 A1 | 6/2016 |
| WO | 2016133571 A2 | 8/2016 |
| WO | 2016190225 A1 | 12/2016 |
| WO | 2017035462 A1 | 3/2017 |

OTHER PUBLICATIONS

Wang, Xuebin et al., "Three-dimensional strutted graphene grown by substrate-free sugar blowing for high-power-density supercapacitors," Nature Communications, vol. 4, Issue 2905, Dec. 16, 2013, Macmillan Publishers Limited, pp. 1-8.

Wassei, Jonathan K et al., "Oh the Places You'll Go with Graphene", Accounts of Chemical Research, Dec. 20, 2012, Vers. 9, 11 pages.

Weng, Zhe et al., "Graphene-Cellulose Paper Flexible Supercapacitors," Advanced Energy Materials, vol. 1, Issue 5, Aug. 10, 2011, Wiley-VCH Verlag GmbH & Co., pp. 917-922.

Wu, Zhong-Shuai et al., "Graphene Anchored with $Co_3O_4$ Nanoparticles as Anode of Lithium Ion Batteries with Enhanced Reversible Capacity and Cyclic Performance," ACS Nano, vol. 4, Issue 6, May 10, 2010, American Chemical Society, pp. 3187-3194.

Xie, Guoxin, "Direct Electrochemical Synthesis of Reduced Graphene Oxide (rGO)/Copper Composite Films and Their Electrical/Electroactive Properties," Applied Materials & Interfaces, vol. 6, Issue 10, May 1, 2014, American Chemical Society, pp. 7444-7455.

Xu, Bin et al., "Sustainable nitrogen-doped porous carbon with high surface areas prepared from gelatin for supercapacitors," Journal of Materials Chemistry, vol. 22, Issue 36, Jul. 25, 2012, The Royal Society of Chemistry, pp. 19088-19093.

Xu, Jing et al., "Flexible Asymmetric Supercapacitors Based upon $Co_9S_8$ Nanorod//$Co_3O_4$@$RuO_2$ Nanosheet Arrays on Carbon Cloth," ACS Nano, vol. 7, Issue 6, May 6, 2013, American Chemical Society, pp. 5453-5462.

Xu, Yuxi et al., "Flexible Solid-State Supercapacitors Based on Three-Dimensional Graphene Hydrogel Films," ACS Nano, vol. 7, Issue 5, Apr. 4, 2013, American Chemical Society, 8 pages.

Xu, Zhanwei et al., "Electrochemical Supercapacitor Electrodes from Sponge-like Graphene Nanoarchitectures with Ultrahigh Power Density," The Journal of Physical Chemistry Letters, vol. 3, Issue 20, Sep. 25, 2012, American Chemical Society, pp. 2928-2933.

Yan, Jun et al., "Fast and reversible surface redox reaction of graphene-$MnO_2$ composites as supercapacitor electrodes," Carbon, vol. 48, Issue 13, Jun. 25, 2010, Elsevier Ltd., pp. 3825-3833.

Yan, Jun et al., "Recent Advances in Design and Fabrication of Electrochemical Supercapacitors with High Energy Densities," Advanced Energy Materials, vol. 4, Issue 4, 1300816, Dec. 23, 2013, Wiley-VCH Verlag GmbH & Co., pp. 1-43.

Yang, Xiaowei et al, "Bioinspired Effective Prevention of Restacking in Multilayered Graphene Films: Towards the Next Generation of High-Performance Supercapacitors," Advanced Materials, vol. 23, Issue 25, May 10, 2011, Wiley-VCH Verlag GmbH & Co., pp. 2833-2838.

Yang, Peihua et al., "Low-Cost High-Performance Solid-State Asymmetric Supercapacitors Based on $MnO_2$ Nanowires and $Fe_2O_3$ Nanotubes," Nano Letters, vol. 14, Issue 2, Jan. 1, 2014, American Chemical Society, pp. 731-736.

Yang, Xiaowei et al, "Liquid-Mediated Dense Integration of Graphene Materials for Compact Capacitive Energy Storage," Science, vol. 341, Issue 6145, Aug. 2, 2013, American Association for the Advancement of Science, 5 pages.

Yoo, Eunjoo et al., "Large Reversible Li Storage of Graphene Nanosheet Families for Use in Rechargeable Lithium Ion Batteries," Nano Letters, vol. 8, Issue 8, Jul. 24, 2008, American Chemical Society, pp. 2277-2282.

(56) References Cited

OTHER PUBLICATIONS

Yoo, Jung Joon et al., "Ultrathin Planar Graphene Supercapacitors," Nano Letters, vol. 11, Issue 4, Mar. 7, 2011, American Chemical Society, pp. 1423-1427.
Yu, Dingshan et al., "Scalable synthesis of hierarchically structured carbon nanotube-graphene fibres for capacitive energy storage," Nature Nanotechnology, vol. 9, Issue 7, May 11, 2014, Macmillan Publishers Limited, pp. 1-8.
Yu, Guihua et al., "Solution-Processed Graphene/$MnO_2$ Nanostructured Textiles for High-Performance Electrochemical Capacitors," Nano Letters, vol. 11, Issue 7, Jun. 13, 2011, American Chemical Society, pp. 2905-2911.
Yu, Pingping et al., "Graphene-Wrapped Polyaniline Nanowire Arrays on Nitrogen-Doped Carbon Fabric as Novel Flexible Hybrid Electrode Materials for High-Performance Supercapacitor," Langmuir, vol. 30, Issue 18, Apr. 24, 2014, American Chemical Society, pp. 5306-5313.
Yu, Pingping et al., "Polyaniline Nanowire Arrays Aligned on Nitrogen-Doped Carbon Fabric for High-Performance Flexible Supercapacitors," Langmuir, vol. 29, Issue 38, Aug. 28, 2013, American Chemical Society, 8 pages.
Yu, Zenan et al., "Supercapacitor electrode materials: nanostructures from 0 to 3 dimensions," Energy & Environmental Science, vol. 8, Issue 3, Dec. 3, 2014, The Royal Society of Chemistry, pp. 702-730.
Zhang, Jintao et al., "A high-performance asymmetric supercapacitor fabricated with graphene-based electrodes," Energy & Environmental Science, vol. 4, Issue 10, Aug. 2, 2011, The Royal Society of Chemistry, pp. 4009-4015.
Zhang, Li et al., "High Voltage Super-capacitors for Energy Storage Devices Applications," 14th Symposium on Electromagnetic Launch Technology, Jun. 10-13, 2008, IEEE, pp. 1-4.
Zhang, Long et al., "Porous 3D graphene-based bulk materials with exceptional high surface area and excellent conductivity for supercapacitors," Scientific Reports, vol. 3, Issue 1408, Mar. 11, 2013, Nature Publishing Group, pp. 1-9.
Zhang, Yonglai et al., "Direct imprinting of microcircuits on graphene oxides film by femtosecond laser reduction," Nano Today, vol. 5, Issue 1, Jan. 19, 2010, Elsevier Ltd., pp. 15-20.
Zhang, Zheye et al., "Facile Synthesis of 3D $MnO_2$-Graphene and Carbon Nanotube-Graphene Composite Networks for High-Performance, Flexible, All-Solid-State Asymmetric Supercapacitors," Advanced Energy Materials, vol. 4, Issue 10, Jul. 15, 2014, Wiley-VCH Verlag GmbH & Co. KGaA, Weinheim, pp. 1-9.
Zhang, Zhongshen et al., "A New-Type Ordered Mesoporous Carbon/Polyaniline Composites Prepared by a Two-step Nanocasting Method for High Performance Supercapacitor Applications," Journal of Materials Chemistry A, vol. 2, Issue 39, Aug. 13, 2014, Royal Society of Chemistry, pp. 1-25.
Zhao, Xin et al., "Incorporation of Manganese Dioxide within Ultraporous Activated Graphene for High-Performance Electrochemical Capacitors," ACS Nano, vol. 6, Issue 6, May 3, 2012, American Chemical Society, pp. 5404-5412.
Zhi, Mingjia et al, "Nanostructured carbon-metal oxide composite electrodes for supercapacitors: a review," Nanoscale, vol. 5, Issue 1, Oct. 23, 2012,The Royal Society of Chemistry, pp. 72-88.
Zhou, Chuanqiang et al., "Synthesis of Polyaniline Hierarchical Structures in a Dilute SDS/HCl Solution: Nanostructure-Covered Rectangular Tubes," Macromolecules, vol. 42, Issue 4, Jan. 27, 2009, American Chemical Society, pp. 1252-1257.
Zhou, Guangmin et al., "Graphene-Wrapped $Fe_3O_4$ Anode Material with Improved Reversible Capacity and Cyclic Stability for Lithium Ion Batteries," Chemistry of Materials, vol. 22, Issue 18, Aug. 26, 2010, American Chemical Society, pp. 5306-5313.
Zhu, Xianjun et al., "Nanostructured Reduced Graphene Oxide/$Fe_2O_3$ Composite As a High-Performance Anode Material for Lithium Ion Batteries," ACS Nano, vol. 5, Issue 4, Mar. 28, 2011, American Chemical Society, pp. 3333-3338.
Zhu, Yanwu et al., "Carbon-Based Supercapacitors Produced by Activation of Graphene," Science, vol. 332, May 12, 2011, www.sciencemag.org, pp. 1537-1541.
Zoski, Cynthia G., "Handbook of Electrochemistry," First Edition, 2007, Las Cruces, New Mexico, USA, Elsevier B. V., 935 pages.
Non-Final Office Action for U.S. Appl. No. 13/725,073, dated Apr. 15, 2016, 32 pages.
Final Office Action for U.S. Appl. No. 13/725,073, dated Oct. 4, 2016, 38 pages.
First Examination Report for Australian Patent Application No. 2012378149, dated Jul. 28, 2016, 3 pages.
First Office Action for Chinese Patent Application No. 201280070343.4, dated Jul. 23, 2015, 29 pages.
Second Office Action for Chinese Patent Application No. 201280070343.4, dated Apr. 6, 2016, 8 pages.
Third Office Action for Chinese Patent Application No. 201280070343.4, dated Sep. 7, 2016, 25 pages.
Extended European Search Report for European Patent Application No. 12874989.2, dated Jun. 17, 2015, 6 pages.
Notice of Reason for Rejection for Japanese Patent Application No. 2014-548972, dated Feb. 7, 2017, 5 pages.
International Search Report and Written Opinion for PCT/US2012/071407, dated Nov. 12, 2013, 9 pages.
International Preliminary Report on Patentability for PCT/US2012/071407 dated Jul. 3, 2014, 6 pages.
Non-Final Office Action for U.S. Appl. No. 14/382,463, dated Jan. 6, 2017, 23 pages.
Notice of Allowance for U.S. Appl. No. 14/382,463, dated Apr. 6, 2017, 7 pages.
First Examination Report for Australian Patent Application No. 2013230195, dated May 27, 2016, 4 pages.
First Office Action and Search Report for Chinese Patent Application No. 201380023699.7, dated Nov. 21, 2016, 21 pages.
Extended European Search Report for European Patent Application No. 13757195.6, dated Jul. 1, 2015, 9 pages.
Huang, L. et al., "Pulsed laser assisted reduction of graphene oxide," Carbon, vol. 49, 2011, Elsevier, pp. 2431-2436.
Kumar, P. et al., "Graphene produced by radiation-induced reduction of graphene oxide," Sep. 26, 2010, DOI: DOI:10.1142/S0219581X11008824, 23 pages.
Notice of Preliminary Rejection for Korean Patent Application No. 10-2014-7020353, dated Apr. 15, 2019, 11 pages.
Non-Final Office Action for U.S. Appl. No. 16/029,930, dated Apr. 3, 2019, 13 pages.
Examination Report No. 1 for Australian Patent Application No. 2015277264, dated Mar. 7, 2019, 4 pages.
Interview Summary for U.S. Appl. No. 14/945,232, dated Apr. 11, 2019, 3 pages.
Notification of the Second Office Action for Chinese Patent Application No. 201580072540.3, dated Mar. 7, 2019, 12 pages.
Official Action for Eurasian Patent Application No. 201791078, dated Mar. 27, 2019, 5 pages.
Interview Summary for U.S. Appl. No. 15/382,871, dated Apr. 1, 2019, 10 pages.
Advisory Action for U.S. Appl. No. 15/382,871, dated Apr. 24, 2019, 3 pages.
Non-Final Office Action for U.S. Appl. No. 15/688,342, dated Mar. 26, 2019, 9 pages.
Decision on Rejection for Chinese Patent Application No. 201380023699.7, dated Aug. 16, 2018, 11 pages.
International Preliminary Report on Patentability for International Patent Application No. PCT/US2017/024716, dated Oct. 11, 2018, 10 pages.
International Preliminary Report on Patentability for International Patent Application No. PCT/US2017/023632, dated Oct. 4, 2018, 8 pages.
Invitation to Pay Additional Fees for International Patent Application No. PCT/US2018/041728, dated Sep. 12, 2018, 2 pages.
Notice of Allowance for U.S. Appl. No. 15/319,286, dated Oct. 1, 2018, 8 pages.
Non-Final Office Action for U.S. Appl. No. 15/410,404, dated Sep. 27, 2018, 9 pages.
Advisory Action for U.S. Appl. No. 14/945,232, dated Oct. 15, 2018, 3 pages.

(56) References Cited

OTHER PUBLICATIONS

Braz, Elton P., et al., "Effects of Gamma Irradiation in Graphene/Poly(ethylene Oxide) Nanocomposites," 2013 International Nuclear Atlantic Conference—INAC 2013, Nov. 24-29, 2013, Recife, PE, Brazil, 7 pages.

Hu, Liangbing, et al., "Lithium-Ion Textile Batteries with Large Areal Mass Loading," Advanced Energy Materials, vol. 1, Issue 6, Oct. 6, 2011, pp. 1012-1017.

Extended European Search Report for European Patent Application No. 15861794.4, dated Oct. 2, 2018, 13 pages.

Corrected Notice of Allowability for U.S. Appl. No. 15/319,286, dated Oct. 29, 2018, 5 pages.

Invitation to Pay Additional Fees for International Patent Application No. PCT/US2017/048883, dated Sep. 29, 2017, 2 pages.

Final Office Action for U.S. Appl. No. 14/945,232, dated Aug. 10, 2018, 7 pages.

Notification of the First Office Action for Chinese Patent Application No. 201580072540.3, dated Jun. 25, 2018, 14 pages.

International Preliminary Report on Patentability for International Patent Application No. PCT/US2017/014126, dated Aug. 2, 2018, 10 pages.

Gao, Yu et al., "High power supercapcitor electrodes based on flexible TiC-CDC nano-felts," Journal of Power Sources, vol. 201, Issue 1, Mar. 2012, Elsevier B.V., pp. 368-375.

Gao, Lijun et al., "Power Enhancement of an Actively Controlled Battery/Ultracapacitor Hybrid," IEEE Transactions on Power Electronics, vol. 20, Issue 1, Jan. 2005, IEEE, pp. 236-243.

Ghasemi, S. et al., "Enhancement of electron transfer kinetics on a polyaniline-modified electrode in the presence of anionic dopants," Journal of Solid State Electrochemistry, vol. 12, Issue 3, Jul. 28, 2007, Springer-Verlag, pp. 259-268.

Ghidiu, Michael et al., "Conductive two-dimensional titanium carbide 'clay' with high volumetric capacitance," Nature, vol. 516, Dec. 4, 2014, Macmillan Publishers Limited, pp. 78-81.

Gilje, Scott et al., "A Chemical Route to Graphene for Device Applications," Nano Letters, vol. 7, Issue 11, Oct. 18, 2007, American Chemical Society, pp. 3394-3398.

Gilje, Scott et al., "Photothermal Deoxygenation of Graphene Oxide for Patterning and Distributed Ignition Applications," Advanced Materials, vol. 22, Issue 3, Oct. 26, 2009, Wiley-VCH Verlag GmbH & Co. KGaA, Weinheim, Germany, pp. 419-423.

Glavin, M.E. et al, "A Stand-alone Photovoltaic Supercapacitor Battery Hybrid Energy Storage System," Proceedings of the 13th International Power Electronics and Motion Control Conference (EPE-PEMC), Sep. 1-3, 2008, Poznań, Poland, IEEE, pp. 1688-1695.

Gogotsi, Y. et al., "True Performance Metrics in Electrochemical Energy Storage," Science Magazine, vol. 334, Issue 6058, Nov. 18, 2011, 4 pages.

Gracia, J. et al., "Corrugated layered heptazine-based carbon nitride: the lowest energy modifications of $C_3N_4$ ground state," Journal of Materials Chemistry, vol. 19, 2009, pp. 3013-3019.

Griffiths, Katie et al., "Laser-scribed graphene presents an opportunity to print a new generation of disposable electrochemical sensors," Nanoscale, vol. 6, Sep. 22, 2014, The Royal Society of Chemistry, pp. 13613-13622.

Guardia, L. et al., "UV light exposure of aqueous graphene oxide suspensions to promote their direct reduction, formation of graphene-metal nanoparticle hybrids and dye degradation," Carbon, vol. 50, Issue 3, Oct. 12, 2011, Elsevier Ltd., pp. 1014-1024.

Guerrero-Contreras, Jesus et al., "Graphene oxide powders with different oxidation degree, prepared by synthesis variations of the Hummers method," Materials Chemistry and Physics, vol. 153, Mar. 1, 2015, Elsevier B.V., pp. 1-12.

Günes, Fethullah et al., "Layer-by-Layer Doping of Few-Layer Graphene Film," ACS Nano, vol. 4, Issue 8, Jul. 27, 2010, American Chemical Society, pp. 4595-4600.

He, Xinping et al., "A new nanocomposite: Carbon cloth based polyaniline for an electrochemical supercapacitor," Electrochimica Acta, vol. 111, Aug. 17, 2013, Elsevier Ltd., pp. 210-215.

Hu, Liangbing et al., "Symmetrical $MnO_2$-Carbon Nanotube-Textile Nanostructures for Wearable Pseudocapacitors with High Mass Loading," ACS Nano, vol. 5, Issue 11, Sep. 16, 2011, American Chemical Society, pp. 8904-8913.

Huang, Yi et al., "An Overview of the Applications of Graphene-Based Materials in Supercapacitors," Small, vol. 8, Issue 12, Jun. 25, 2012, Wiley-VCH Verlag GmbH & Co. KGaA, Weinheim, pp. 1-30.

Huang, Ming et al., "Self-Assembly of Mesoporous Nanotubes Assembled from Interwoven Ultrathin Birnessite-type $MnO_2$ Nanosheets for Asymmetric Supercapacitors," Scientific Reports, vol. 4, Issue 3878, Jan. 27, 2014, ww.nature.com/scientificreports, pp. 1-8.

Hwang, Jee Y. et al., "Direct preparation and processing of graphene/RuO2 nanocomposite electrodes for high-performance capacitive energy storage," Nano Energy, vol. 18, Sep. 25, 2015, Elsevier B.V., pp. 57-70.

Jana, Milan et al., "Non-covalent functionalization of reduced graphene oxide using sulfanilic acid azocromotrop and its application as a supercapacitor electrode material," Journal of Materials Chemistry A, vol. 3, Issue 14, Feb. 24, 2015, The Royal Society of Chemistry, pp. 7323-7331.

Ji, Junyi et al., "Nanoporous $Ni(OH)_2$ Thin Film on 3D Ultrathin-Graphite Foam for Asymmetric Supercapacitor," ACS Nano, vol. 7, Issue 7, Jun. 11, 2013, American Chemical Society, pp. 6237-6243.

Jimbo, "Transistors," Sparkfun, https://learn.sparkfun.com/tutorials/transistors/extending-the-water-analogy, accessed Dec. 14, 2015, SparkFun Electronics, 3 pages.

Jin, H. Y. et al., "Controllable functionalized carbon fabric for high-performance all-carbon-based supercapacitors," RSC Advances, vol. 4, Issue 62, Jul. 15, 2014, The Royal Society of Chemistry, pp. 33022-33028.

Kang, Yu Jin et al., "All-solid-state flexible supercapacitors based on papers coated with carbon nanotubes and ionic-liquid-based gel electrolytes," Nanotechnology, vol. 23, Issue 6, Jan. 17, 2012, IOP Publishing Ltd, pp. 1-6.

Khaligh, Alireza et al., "Battery, Ultracapacitor, Fuel Cell, and Hybrid Energy Storage Systems for Electric, Hybrid Electric, Fuel Cell, and Plug-In Hybrid Electric Vehicles: State of the Art," IEEE Transactions on Vehicular Technology, vol. 59, Issue 6, Jul. 2010, IEEE, pp. 2806-2814.

Khomenko, V. et al., "Optimisation of an asymmetric manganese oxide/activated carbon capacitor working at 2 V in aqueous medium," Journal of Power Sources, vol. 153, Issue 1, Mar. 14, 2005, Elsevier B.V., pp. 183-190.

Kiani, Mohammad Ali et al., "Fabrication of High Power LiNi0.5Mn1.5O4 Battery Cathodes by Nanostructuring of Electrode Materials," RSC Advances, vol. 5, Issue 62, May 26, 2015, The Royal Society of Chemistry, pp. 1-6.

Kiani, M.A. et al., "Size effect investigation on battery performance: Comparison between micro- and nano-particles of 3-Ni(OH), as nickel battery cathode material," Journal of Power Sources, vol. 195, Issue 17, Apr. 2, 2010, Elsevier B.V., pp. 5794-5800.

Kiani, M.A. et al., "Synthesis of Nano- and Micro-Particles of $LiMn_2O_4$: Electrochemical Investigation and Assessment as a Cathode in Li Battery," International Journal of Electrochemical Science, vol. 6, Issue 7, Jul. 1, 2011, ESG, pp. 2581-2595.

Kovtyukhova, Nina, I. et al., "Layer-by-Layer Assembly of Ultrathin Composite Films from Micron-Sized Graphite Dxide Sheets and Polycations," Kovtyukhova, et al, Chemistry of Materials, vol. 11, Issue 3, Jan. 28, 1999, American Chemical Society, pp. 771-778.

Lam, L.T. et al., "Development of ultra-battery for hybrid-electric vehicle applications," Journal of Power Sources, vol. 158, Issue 2, May 2, 2006, Elsevier B.V., pp. 1140-1148.

Lang, Xingyou et al., "Nanoporous metal/oxide hybrid electrodes for electrochemical supercapacitors," Nature Nanotechnology, vol. 6, Apr. 2011, Macmillan Publishers Limited, pp. 232-236.

Lee, Kyu Hyung et al., "Large scale production of highly conductive reduced graphene oxide sheets by a solvent-free low temperature reduction," Carbon, vol. 69, Dec. 16, 2013, Elsevier Ltd., pp. 327-335.

(56) References Cited

OTHER PUBLICATIONS

Lee, Kyoung, G. et al, "Sonochemical-assisted synthesis of 3D graphene/nanoparticle foams and their application in supercapacitor," Ultrasonics Sonochemistry, vol. 22, May 2, 2014, Elsevier B.V., pp. 422-428.

Lee, Seung Woo et al., "Carbon Nanotube/Manganese Oxide Ultrathin Film Electrodes for Electrochemical Capacitors," ACS Nano, vol. 4, Issue 7, Jun. 16, 2010, American Chemical Society, pp. 3889-3896.

Lei, Zhibin et al., "Platelet CMK-5 as an Excellent Mesoporous Carbon to Enhance the Pseudocapacitance of Jolyaniline," ACS Applied Materials & Interfaces, vol. 5, Issue 15, Jul. 12, 2013, American Chemical Society, pp. 7501-7508.

Li, Dan et al., "Processable aqueous dispersions of graphene nanosheets," Nature Nanotechnology, vol. 3, Feb. 2008, Nature Publishing Group, pp. 101-105.

Li, Lei et al., "Nanocomposite of Polyaniline Nanorods Grown on Graphene Nanoribbons for Highly Capacitive Pseudocapacitors," ACS Applied Materials and Interfaces, vol. 5, Issue 14, Jun. 21, 2013, American Chemical Society, 6 pages.

Li, Peixu et al., "Core-Double-Shell, Carbon Nanotube@Polypyrrole@$MnO_2$ Sponge as Freestanding, Compressible Supercapacitor Electrode," ACS Applied Materials and Interfaces, vol. 6, Issue 7, Mar. 12, 2014, American Chemical Society, pp. 5228-5234.

Li, Qi et al., "Design and Synthesis of $MnO_2$/Mn/$MnO_2$ Sandwich-Structured Nanotube Arrays with High Supercapacitive Performance for Electrochemical Energy Storage," Nano Letters, vol. 12, Issue 7, Jun. 25, 2012, American Chemical Society, pp. 3803-3807.

Li, Yingzhi et al., "Oriented Arrays of Polyaniline Nanorods Grown on Graphite Nanosheets for an Electrochemical Supercapacitor," Langmuir, vol. 29, Issue 1, Dec. 3, 2012, American Chemical Society, 8 pages.

Li, Zhe-Fei et al., "Fabrication of high-surface-area graphene/polyaniline nanocomposites and their application in supercapacitors," ACS Applied Materials & Interfaces, vol. 5, Issue 7, Mar. 12, 2013, American Chemical Society, pp. 1-25.

Lin, Jian et al., "3-Dimensional Graphene Carbon Nanotube Carpet-Based Microsupercapacitors with High Electrochemical Performance," Nano Letters, vol. 13, Issue 1, Dec. 13, 2012, American Chemical Society, pp. 72-78.

Linden, David et al., "Handbook of Batteries," McGraw-Hill Handbooks, Third Edition, 2010, New York, The McGraw-Hill Companies, Inc., 1,454 pages.

Liu, Wenwen et al., "Novel and high-performance asymmetric micro-supercapacitors based on graphene quantum dots and polyaniline nanofibers," Nanoscale, vol. 5, Apr. 24, 2013, The Royal Society of Chemistry, pp. 6053-6062.

Liu, Wen-Wen et al., "Superior Micro-Supercapacitors Based on Graphene Quantum Dots," Advanced Functional Materials, vol. 23, Issue 33, Mar. 26, 2013, Wiley-VCH Verlag GmbH & Co. KGaA, Weinheim, pp. 4111-4122.

Liu, Yongfeng et al., "Advanced hydrogen storage alloys for Ni/MH rechargeable batteries," Journal of Materials Chemistry, vol. 21, Issue 11, Dec. 15, 2010, The Royal Society of Chemistry, pp. 4743-4755.

Long, Jeffrey W. et al., "Asymmetric electrochemical capacitors—Stretching the limits of aqueous electrolytes," MRS Bulletin, vol. 36, Jul. 2011, Materials Research Society, pp. 513-522.

Lu, Xihong et al., "Stabilized TiN Nanowire Arrays for High-Performance and Flexible Supercapacitors," Nano Letters, vol. 12, Issue 10, Sep. 4, 2012, American Chemical Society, 6 pages.

Lukatskaya, Maria R. et al., "Cation Intercalation and High Volumetric Capacitance of Two-Dimensional Titanium Carbide," Science, vol. 341, Issue 6153, Sep. 27, 2013, American Association for the Advancement of Science, pp. 1502-1505.

Lukic, Srdjam, M. et al., "Power Management of an Ultracapacitor/Battery Hybrid Energy Storage System in an HEV," IEEE Vehicle Power and Propulsion Conference (VPPC), Sep. 6-8, 2006, IEEE, 6 pages.

Final Office Action for U.S. Appl. No. 13/725,073, dated Apr. 6, 2018, 37 pages.
Notice of Allowance for U.S. Appl. No. 15/612,405, dated May 16, 2018, 8 pages.
Third Office Action and Search Report for Chinese Patent Application No. 201380023699.7, dated Mar. 9, 2018, 16 pages.
Examination Report for European Patent Application No. 12874989.2, dated Mar. 5, 2019, 5 pages.
Non-Final Office Action for U.S. Appl. No. 16/029,930, dated Jan. 14, 2019, 8 pages.
Office Action for Canadian Patent Application No. 2,866,250, dated Jan. 11, 2019, 3 pages.
Corrected Notice of Allowability for U.S. Appl. No. 15/319,286, dated Jan. 18, 2019, 5 pages.
Notice of Reasons for Rejection for Japanese Patent Application No. 2016-573846, dated Feb. 26, 2019, 8 pages.
Search Report for Japanese Patent Application No. 2016-573846, dated Feb. 28, 2019, 44 pages.
Non-Final Office Action for U.S. Appl. No. 14/945,232, dated Jan. 9, 2019, 7 pages.
Examination Report No. 1 for Australian Patent Application No. 2015349949, dated Mar. 8, 2019, 4 pages.
Final Office Action for U.S. Appl. No. 15/382,871, dated Jan. 25, 2019, 16 pages.
Final Office Action for U.S. Appl. No. 15/410,404, dated Feb. 21, 2019, 9 pages.
Final Office Action for U.S. Appl. No. 15/472,409, dated Jan. 18, 2019, 12 pages.
International Preliminary Report on Patentability for International Patent Application No. PCT/US2017/048883, dated Mar. 14, 2019, 7 pages.
International Preliminary Report on Patentability for International Patent Application No. PCT/US2017/038992, dated Jan. 3, 2019, 10 pages.
Non-Final Office Action for U.S. Appl. No. 15/427,210, dated Feb. 28, 2019, 17 pages.
Fourth Office Action for Chinese Patent Application No. 201280070343.4, dated Apr. 26, 2017, 22 pages.
Notice of Reason for Rejection for Japanese Patent Application No. 2014-548972, dated May 23, 2017, 4 pages.
International Preliminary Report on Patentability for International Patent Application No. PCT/US2015/061400, dated Jun. 1, 2017, 16 pages.
International Search Report and Written Opinion for International Patent Application No. PCT/US2016/067468, dated Apr. 21, 2017, 10 pages.
International Search Report and Written Opinion for International Patent Application No. PCT/US2017/014126, dated Apr. 20, 2017, 13 pages.
International Search Report and Written Opinion for International Patent Application No. PCT/US2017/023632, dated May 31, 2017, 11 pages.
Notice of Reasons for Rejection for Japanese Patent Application No. 2014-561017, dated Mar. 21, 2017, 10 pages.
International Search Report and Written Opinion for PCT/US2013/029022, dated Jun. 26, 2013, 13 pages.
International Preliminary Report on Patentability for PCT/US2013/029022 dated Sep. 18, 2014, 9 pages.
International Search Report and Written Opinion for International Patent Application No. PCT/US2015/036082, dated Aug. 27, 2015, 15 pages.
International Preliminary Report on Patentability for International Patent Application No. PCT/US2015/036082, dated Dec. 29, 2016, 12 pages.
International Search Report and Written Opinion for International Patent Application No. PCT/US2015/061400, dated Mar. 29, 2016, 20 pages.
Invitation to Pay Additional Fees for International Patent Application No. PCT/US2016/067468, dated Feb. 13, 2017, 2 pages.
Conway, B. E., "Chapter 2: Similarities and Differences between Supercapacitors and Batteries for Storing Electrical Energy," Elec-

(56) References Cited

OTHER PUBLICATIONS trochemical Supercapacitors: Scientific Fundamentals and Technological Applications (book), 1999, New York, Springer Science + Business Media, pp. 11-12.

Conway, B. E., "Chapter 3: Energetics and Elements of the Kinetics of Electrode Processes," Electrochemical Supercapacitors: Scientific Fundamentals and Technological Applications (book), 1999, New York, Springer Science + Business Media, pp. 33-34.

Ozawa, Kazunori, "Lithium-Cell System—Nonaqueous Electrolyte System," Lithium Ion Rechargeable Batteries (book), Chapter 1: General Concepts, Section 1.1.2, 2009, Wiley-VCH Verlag GmbH & Co. KGaA, 5 pages.

Root, Michael, "Electric Vehicles," The TAB™ Battery Book: An In-Depth Guide to Construction, Design, and Use (book), Chapter 2: The Many Uses of Batteries, 2011, The McGraw-Hill Companies, 4 pages.

Kaewsongpol, Tanon et al., "High-performance supercapacitor of electrodeposited porous 3Dpolyaniline nanorods on functionalized carbon fiber paper: Effects of hydrophobic and hydrophilic surfaces of conductive carbon paper substrates," Materials Today Communications, vol. 4, Aug. 19, 2015, Elsevier Ltd., pp. 176-185.

Yan, Jun et al., "Preparation of graphene nanosheet/carbon nanotube/polyaniline composite as electrode material for supercapacitors," Journal of Power Sources, vol. 195, Issue 9, Nov. 11, 2009, Elsevier B.V., pp. 3041-3045.

Examination Report for European Patent Application No. 12874989.2, dated Jul. 24, 2017, 5 pages.

Communication pursuant to Article 94(3) EPC for European Patent Application No. 13757195.6, dated Jul. 6, 2017, 3 pages.

International Search Report and Written Opinion for International Patent Application No. PCT/US2017/024716, dated Jun. 20, 2017, 13 pages.

Non-Final Office Action for U.S. Appl. No. 13/725,073, dated Aug. 28, 2017, 41 pages.

Second Office Action for Chinese Patent Application No. 201380023699.7, dated Aug. 9, 2017, 8 pages.

International Search Report and Written Opinion for International Patent Application No. PCT/US2017/038992, dated Sep. 21, 2017, 12 pages.

Luo, Zhi-Jia et al., "A timesaving, low-cost, high-yield method for the synthesis of ultrasmall uniform graphene oxide nanosheets and their application in surfactants," Nanotechnology, vol. 27, Issue 5, Dec. 16, 2015, IOP Publishing Ltd, pp. 1-8.

Maiti, Sandipan et al., "Interconnected Network of $MnO_2$ Nanowires with a "Cocoonlike" Morphology: Redox Couple-Mediated Performance Enhancement in Symmetric Aqueous Supercapacitor," ACS Applied Materials & Interfaces, vol. 6, Issue 13, Jun. 16, 2014, American Chemical Society, pp. 10754-10762.

Maiti, Uday Narayan et al., "Three-Dimensional Shape Engineered, Interfacial Gelation of Reduced Graphene Oxide for High Rate, Large Capacity Supercapacitors," vol. 26, Issue 4, Jan. 29, 2014, Wiley-VCH Verlag GmbH & Co., pp. 615-619.

Mao, Lu et al., "Surfactant-stabilized graphene/polyaniline nanofiber composites for high performance supercapacitor electrode," Journal of Materials Chemistry, vol. 22, Issue 1, Oct. 12, 2011, The Royal Society of Chemistry, pp. 80-85.

Marcano, Daniela C. et al., "Improved Synthesis of Graphene Oxide," ACS Nano, vol. 4, Issue 8, Jul. 22, 2010, American Chemical Society, pp. 4806-4814.

Miller, John R. et al., "Electrochemical Capacitors for Energy Management," Materials Science, vol. 321, Aug. 1, 2008, AAAS, pp. 651-652.

Moosavifard, Seyyed E. et al., "Designing 3D highly ordered nanoporous CuO electrodes for high-performance asymmetric supercapacitors," ACS Applied Materials & Interfaces, vol. 7, Issue 8, American Chemical Society, 13 pages.

Moussa, Mahmoud et al, "Free-Standing Composite Hydrogel Film for Superior Volumetric Capacitance," Journal of Materials Chemistry A, vol. 3, Issue 30, Jun. 19, 2015, The Royal Society of Chemistry, pp. 1-8.

Naoi, Katsuhiko et al., "Second generation 'nanohybrid supercapacitor': Evolution of capacitive energy storage devices," Energy & Environmental Science, vol. 5, Issue 11, Sep. 14, 2012, The Royal Society of Chemistry, pp. 9363-9373.

Nathan, Arokia et al., "Flexible Electronics: The Next Ubiquitous Platform," Proceedings of the IEEE, vol. 100, Special Centennial Issue, May 13, 2012, IEEE, pp. 1486-1517.

Niu, Zhiqiang et al., "A Leavening Strategy to Prepare Reduced Graphene Oxide Foams," Advanced Materials, vol. 24, Issue 30, Aug. 8, 2012, Wiley-VCH Verlag GmbH & Co., pp. 1-7.

Oudenhoven, Jos F. M. et al., "All-Solid-State Lithium-Ion Microbatteries: A Review of Various Three-Dimensional Concepts," Advanced Energy Matterials, vol. 1, Issue 1, Wiley-VCH Verlag GmbH & Co. KGaA, Weinheim, pp. 10-33.

Paravannoor, Anjali et al., "High voltage supercapacitors based on carbon-grafted NiO nanowires interfaced with an aprotic ionic liquid," Chemical Communications, vol. 51, Issue 28, Feb. 26, 2015, The Royal Society of chemistry, pp. 1-4.

Patel, Mehul N. et al., "Hybrid $MnO_2$-disordered mesoporous carbon nanocomposites: synthesis and characterization as electrochemical pseudocapacitor electrodes," Journal of Materials Chemistry, vol. 20, Issue 2, Nov. 11, 2009, The Royal Society of Chemistry, pp. 390-398.

Pech, David et al, "Ultrahigh-power micrometre-sized supercapacitors based on onion-like carbon," Nature Nanotechnology, vol. 5, Sep. 2010, Macmillan Publishers Limited, 10 pages.

Pendashteh, Afshin et al., "Fabrication of anchored copper oxide nanoparticles on graphene oxide nanosheets via an electrostatic coprecipitation and its application as supercapacitor," Electrochimica Acta, vol. 88, Oct. 29, 2012, Elsevier Ltd., pp. 347-357.

Pendashteh, Afshin et al., "Facile synthesis of nanostructured $CuCo_2O_4$ as a novel electrode material for high-rate supercapacitors," vol. 50, Issue 16, Dec. 17, 2013, The Royal Society of Chemistry, 4 pages.

Pendashteh, Afshin et al., "Highly Ordered Mesoporous $CuCo_2O_4$ Nanowires, a Promising Solution for High-Performance Supercapacitors," Chemistry of Materials, vol. 27, Issue 11, Apr. 20, 2015, American Chemical Society, pp. 1-11.

Qing, Xutang et al., "P/N/O co-doped carbonaceous materials based supercapacitor with voltage up to 1.9 V in the aqueous electrolyte," RSC Advances, vol. 4, Issue 99, Oct. 21, 2014, Royal Society of Chemistry, pp. 1-22.

Qiu, Ling et al., "Controllable Corrugation of Chemically Converted Graphene Sheets in Water and Potential Application for Nanofiltration," Chemical Communications, vol. 47, 2011, pp. 5810-5812.

Qu, Qunting et al., "Core-Shell Structure of Polypyrrole Grown on $V_2O_3$ Nanoribbon as High Performance Anode Material for Supercapacitors," Advanced Energy Materials, vol. 2, Issue 8, 2012, Wiley-VCH Verlag GmbH & Co., pp. 1-6.

Raccichini, Rinaldo et al., "The role of graphene for electrochemical energy storage," Nature Materials, vol. 14, Issue 3, Dec. 22, 2014, Macmillan Publishers Limited, pp. 1-9.

Samitsu, Sadaki et al., "Flash freezing route to mesoporous polymer nanofibre networks," Nature Communications, vol. 4, Issue 2653, Oct. 22, 2013, Macmillan Publishers Limited, pp. 1-7.

Shae, Yuanlong et al., "Fabrication of large-area and high-crystallinity photoreduced graphene oxide films via reconstructed two-dimensional multilayer structures," NPG Asia Materials, vol. 6, Issue 8, e119, Aug. 15, 2014, Nature Publishing Group, pp. 1-9.

Shao, Yuanlong et al., "Graphene-based materials for flexible supercapacitors," Chemical Society Review, vol. 14, Issue 11, Apr. 22, 2015, The Royal Society of Chemistry, 27 pages.

Shao, Yuanlong et al., "High-performance flexible asymmetric supercapacitors based on 3D porous graphene/$MnO_2$ nanorod and graphene/Ag hybrid thin-film electrodes," Journal of Materials Chemistry C, vol. 1, Dec. 5, 2012, The Royal Society of Chemistry, pp. 1245-1251.

Sheats, James R., "Manufacturing and commercialization issues in organic electronics," Journal of Materials Research, vol. 19, Issue 7, Jul. 2004, Materials Research Society, pp. 1974-1989.

(56) References Cited

OTHER PUBLICATIONS

Shen, Caiwei et al., "A high-energy-density micro supercapacitor of asymmetric MnO$_2$-carbon configuration by using micro-fabrication technologies," Journal of Power Sources, vol. 234, Feb. 9, 2013, Elsevier B.V., pp. 302-309.
Shen, Jiali et al., "High-Performance Asymmetric Supercapacitor Based on Nano-architectured Polyaniline/Graphene/Carbon Nanotube and Activated Graphene Electrodes," ACS Applied Materials & Interfaces, vol. 5, Issue 17, Aug. 9, 2013, American Chemical Society, 36 pages.
Shown, Indrajit et al., "Conducting polymer-based flexible supercapacitor," Energy Science & Engineering, vol. 3, Issue 1, Nov. 19, 2014, Society of Chemical Industry and John Wiley & Sons Ltd., pp. 1-25.
Simon, P. et al., "Capacitive Energy Storage in Nanostructured Carbon-Electrolyte Systems," Accounts of Chemical Research, vol. 46, Issue 5, Jun. 6, 2012, American Chemical Society, 10 pages.
Simon, Patrice et al., "Materials for electrochemical capacitors," Nature Materials, vol. 7, Issue 11, Nov. 2008, Macmillan Publishers Limited, pp. 845-854.
Simon, Patrice et al., "Where Do Batteries End and Supercapacitors Begin?" Science, vol. 343, Issue 6176, Mar. 14, 2014, American Association for the Advancement of Science, 3 pages.
Snook, Graeme A. et al., "Conducting-polymer-based supercapacitor devices and electrodes," Journal of Power Sources, vol. 196, Jul. 15, 2010, Elsevier B.V., pp. 1-12.
Stoller, Meryl D. et al., "Graphene-Based Ultracapacitors," Nano Letters, vol. 8, Issue 10, Sep. 13, 2008, American Chemical Society, pp. 3498-3502.
Strong, Veronica et al., "Patterning and Electronic Tuning of Laser Scribed Graphene for Flexible All-Carbon Devices," ACS Nano, vol. 6, Issue 2, Jan. 13, 2012, American Chemical Society, p. 1395-1403.
Su, Zijin et al., "Scalable fabrication of MnO$_2$ nanostructure deposited on free-standing Ni nanocone arrays for ultrathin, flexible, high-performance micro-supercapacitor," Energy and Environmental Science, vol. 7, May 28, 2014, The Royal Society of Chemistry, pp. 2652-2659.
Sumboja, Afriyanti et al., "Large Areal Mass, Flexible and Free-Standing Reduced Graphene Oxide/Manganese Dioxide Paper for Asymmetric Supercapacitor Device," Advanced Materials, vol. 25, Issue 20, May 28, 2013, Wiley-VCH Verlag GmbH & Co. KGaA, Weinheim, pp. 2809-2815.
Tian, Yuyu et al., "Synergy of $W_{18}O_{49}$ and Polyaniline for Smart Supercapacitor Electrode Integrated with Energy Level Indicating Functionality," Nano Letters, vol. 14, Issue 4, Mar. 4, 2014, American Chemical Society, pp. 2150-2156.
Toupin, Mathieu et al., "Charge Storage Mechanism of MnO$_2$ Electrode Used in Aqueous Electrochemical Capacitor," Chemistry of Materials, vol. 16, Issue 16, Jul. 16, 2004, American Chemical Society, pp. 3184-3190.
Tran, Henry D. et al., "The oxidation of aniline to produce "polyaniline": a process yielding many different nanoscale structures," Journal of Materials Chemistry, vol. 21, Issue 11, Nov. 25, 2010, The Royal Society of chemistry, pp. 3534-3550.
Viculis, Lisa M. et al., "A Chemical Route to Carbon Nanoscrolls," Science, vol. 299, Issue 5611, Feb. 28, 2003, American Association for the Advancement of Science, 2 pages.
Vonlanthen, David et al., "A Stable Polyaniline-Benzoquinone-Hydroquinone Supercapacitor," Advanced Materials, vol. 26, Issue 30, Jun. 13, 2014, Wiley-VCH Verlag GmbH & Co., pp. 1-6.
Wallace, Gordon G. et al., "Processable aqueous dispersions of graphene nanosheets," Nature Nanotechnology, vol. 3, Issue 2, 2008, Nature Publishing Group, pp. 101-105.
Wang, Gongkai et al., "Flexible Pillared Graphene-Paper Electrodes for High-Performance Electrochemical Supercapacitors," Small, vol. 8, Issue 3, Dec. 8, 2011, pp. 452-459.
Wang, Guoping et al, "A review of electrode materials for electrochemical supercapacitors," Chemical Society Reviews, vol. 41, Jul. 21, 2011, The Royal Society of Chemistry, pp. 797-828.
Wang, Guoxiu et al., "Graphene nanosheets for enhanced lithium storage in lithium ion batteries," Carbon, vol. 47, Issue 8, Apr. 1, 2009, Elsevier Ltd., pp. 2049-2053.
Wang, Hailiang et al., "Mn$_3$O$_4$ Graphene Hybrid as a High-Capacity Anode Material for Lithium Ion Batteries," Journal of the American Chemical Society, vol. 132, Issue 40, Oct. 13, 2010, American Chemical Society, pp. 13978-13980.
Wang, Huanlei et al., "Graphene—Nickel Cobaltite Nanocomposite Asymmetrical Supercapacitor with Commercial Level Mass Loading," Nano Research, vol. 5, Issue 9, Sep. 2012, Tsinghua University Press and Springer-Verlag Berlin Heidelberg, pp. 605-617.
Wang, Kai et al., "Flexible supercapacitors based on cloth-supported electrodes of conducting polymer nanowire array/SWCNT composites," Journal of Materials Chemistry, vol. 21, Issue 41, Sep. 20, 2011, The Royal Society of Chemistry, pp. 16373-16378.
Acerce, Muharrem et al., "Metallic 1T phase MoS$_2$ nanosheets as supercapacitor electrode materials," Nature Nanotechnology, vol. 10, Mar. 23, 2015, Macmillan Publishers Limited, pp. 1-6.
Allen, Matthew J. et al., "Honeycomb Carbon: A Review of Graphene," Chemical Reviews, vol. 110, Issue 1, Jul. 17, 2009, American Chemical Society, pp. 132-145.
Augustyn, Veronica et al., "High-rate electrochemical energy storage through Li$^+$ intercalation pseudocapacitance," Nature Materials, vol. 12, Jun. 2013, www.nature.com/naturematerials, Macmillan Publishers Limited, pp. 518-522.
Author Unknown, "125 Volt Transportation Module," Maxwell Technologies, retrieved Apr. 13, 2016, website last modified Mar. 14, 2013, www.maxwell.com/products/ultracapacitors/125v-tranmodules, Maxwell Technologies, Inc., 2 pages.
Author Unknown, "ELTON: Super Capactiors," www.elton-cap.com/, Retrieved Apr. 15, 2016, ELTON, 1 page.
Author Unknown, "ELTON: Products and Technology," https://web.archive.org/web/20160306044847/http:/www.elton-cap.com/products/, dated Mar. 6, 2016, retrieved Mar. 15, 2017, ELTON, 2 pages.
Author Unknown, "Monthly battery sales statistics," Battery Association of Japan (BAJ), retrieved Apr. 13, 2016, website last modified Dec. 2010, web.archive.org/web/20110311224259/http://www.baj.or.jp/e/statistics/02.php, Battery Association of Japan, 1 page.
Author Unknown, "Turnigy Graphene Batteries," Batteries & Accessories, https://hobbyking.com/en_us/batteries-accessories/tumigy-graphene-2.html, retrieved Apr. 3, 2017, HobbyKing, 39 pages.
Arthur, Timothy, S. et al., "Three-dimensional electrodes and battery architectures," MRS Bulletin, vol. 36, Jul. 2011, Materials Research Society, pp. 523-531.
Bai, Ming-Hua et al., "Electrodeposition of vanadium oxide—polyaniline composite nanowire electrodes for high energy density supercapacitors," Journal of Materials Chemistry A, vol. 2, Issue 28, Jan. 29, 2014, The Royal Society of Chemistry, pp. 10882-10888.
Beidaghi, Majid, et al., "Capacitive energy storage in micro-scale devices: recent advances in design and fabrication of micro-supercapacitors," Energy and Environmental Science, vol. 7, Issue 3, Jan. 2, 2014, Royal Society of Chemistry, pp. 867-884.
Beidaghi, Majid et al., "Micro-Supercapacitors Based on Interdigital Electrodes of Reduced Graphene Oxide and carbon Nanotube Composites with Ultra high Power Handling Performance," Advanced Functional Materials, vol. 22, Issue 21, Nov. 2, 2012, Wiley-VCH Verlag GmbH & Co. KGaA, Weinheim, pp. 4501-4510.
Beidaghi, Majid et aL.,"Micro-supercapacitors based on three dimensional interdigital polypyrrole/C-MEMS electrodes," Electrochimica Acta, vol. 56, Issue 25, Oct. 30, 2011, Elsevier Ltd., pp. 9508-9514.
Bélanger, Daniel et al., "Manganese Oxides: Battery Materials Make the Leap to Electrochemical Capacitors," Electrochemical Society Interface, vol. 17, Issue 1, Spring 2008, The Electrochemical Society, pp. 49-52.
Bian, Li-Jun et al., "Self-doped polyaniline on functionalized carbon cloth as electroactive materials for supercapacitor," Electrochimica Acta, vol. 64, Dec. 29, 2011, Elsevier Ltd., pp. 17-22.
Bouville, Florian et al., "Strong, tough and stiff bioinspired ceramics from brittle constituents," Nature Materials, vol. 13, Issue 5, Mar. 23, 2014, Macmillan Publishers Limited, pp. 1-7.

(56) References Cited

OTHER PUBLICATIONS

Brain, Marshall et al., "How Batteries Work," Battery Arrangement and Power—HowStuffWorks, http://electronics.howstuffworks.com/everyday-tech/battery6.htm/printable, accessed Dec. 14, 2015, HowStuffWorks, 4 pages.

Brodie, B.C., "Ueber das Atomgewicht des Graphits," Justus Liebigs Annalen der Chemie, vol. 114, Issue 1, 1860, Wiley-VCH Verlag GmbH & Co. KGaA, Weinheim, pp. 6-24.

Burke, Andrew, "R&D considerations for the performance and application of electrochemical capacitors," Electrochimica Acta, vol. 53, Jan. 26, 2007, Elsevier Ltd., pp. 1083-1091.

Cao, Liujun et al., "Direct Laser-Patterned Micro-Supercapacitors from Paintable $MoS_2$ Films," Small, vol. 9, Issue 17, Apr. 16, 2013, Wiley-VCH Verlag GmbH & Co. KGaA, Weinheim, pp. 2905-2910.

Chan, Candace K. et al, "High-performance lithium battery anodes using silicon nanowires," Nature Nanotechnology, vol. 3, Issue 1, Jan. 2008, Nature Publishing Group, pp. 31-35.

Chen, Cheng-Meng et al., "Macroporous 'bubble' graphene film via template-directed ordered-assembly for high rate supercapacitors," Chemical Communications, vol. 48, Issue 57, May 15, 2012, The Royal Society of Chemistry, pp. 1-3.

Chen, Ji et al., "High-yield preparation of graphene oxide from small graphite flakes via an improved Hummers method with a simple purification process," Carbon, vol. 81, Jan. 2015, Elsevier Ltd., pp. 1-9.

Chen, L. Y. et al., "Toward the Theoretical Capacitance of $RuO_2$ Reinforced by Highly Conductive Nanoporous Gold," Advanced Energy Materials, vol. 3, Issue 7, Jul. 2014, Wiley-VCH Verlag GmbH & Co. KGaA, Weinheim, pp. 351-856.

Chen, Wei et al., "High-Performance Nanostructured Supercapacitors on a Sponge," Nano Letters, vol. 11, Issue 12, Sep. 16, 2011, American Chemical Society, 22 pages.

Chen, Zongping et al, "Three-dimensional flexible and conductive interconnected graphene networks grown by chemical vapour deposition," Nature Materials, vol. 10, Issue 6, Jun. 2011, Macmillan Publishers Limited, pp. 424-428.

Cheng, Yingwen et al., "Synergistic Effects from Graphene and Carbon Nanotubes EnableFlexible and Robust Electrodes for High-PerformanceSupercapacitors," Nano Letters, vol. 12, Issue 8, Jul. 23, 2012, American Chemical Society, pp. 4206-4211.

Chi, Kai et al., "Freestanding Graphene Paper Supported Three-Dimensional Porous Graphene-Polyaniline Nanocomposite Synthesized by Inkjet Printing and in Flexible All-Solid-State Supercapacitor," ACS Applied Materials & Interfaces, vol. 6, Issue 18, Sep. 10, 2014, American Chemical Society, 8 pages.

Chmiola, John et al., "Monolithic Carbide-Derived Carbon Films for Micro-Supercapacitors," Science, vol. 328, Issue 5977, Apr. 2010, American Association for the Advancement of Science, 4 pages.

Choi, Bong Gill et al., "3D Macroporous Graphene Frameworks for Supercapacitors with High Energy and Power Densities," ACS Nano, vol. 6, Issue 5, Apr. 23, 2012, American Chemical Society, pp. 4020-4028.

Cooper, A. et al., "The UltraBattery—A new battery design for a new beginning in hybrid electric vehicle energy storage," Journal of Power Sources, vol. 188, Issue 2, Dec. 6, 2008, Elsevier B.V. pp. 642-649.

Deville, Sylvain, "Freeze-Casting of Porous Ceramics: A Review of Current Achievements and Issues," Advanced Engineering Materials, vol. 10, Issue 3, Mar. 20, 2008, Wiley-VCH Verlag GmbH & Co., pp. 155-169.

Deville, Sylvain, "Metastable and unstable cellular solidification of colloidal suspensions," Nature Materials, vol. 8, Dec. 2009, Macmillan Publishers Limited, pp. 966-972.

De Volder, Michaël et al., "Corrugated Carbon Nanotube Microstructures with Geometrically Tunable Compliance," ACS Nano, vol. 5, Issue 9, Aug. 1, 2011, pp. 7310-7317.

Dunn, Bruce et al., "Electrical Energy Storage for the Grid: A Battery of Choices," Science, vol. 334, Issue 928, Nov. 18, 2011, American Association for the Advancement of Science, pp. 928-935.

Eda, Goki et al., "Chemically Derived Graphene Oxide: Towards Large-Area Thin-Film Electronics and Optoelectronics," Advanced Materials, vol. 22, Issue 22, Apr. 28, 2010, Wiley-VCH Verlag GmbH & Co., pp. 2392-2415.

El-Kady, Maher F. et al., "Engineering Three-Dimensional Hybrid Supercapacitors and Micro-Supercapacitors for High-Performance Integrated Energy Storage," Proceedings of the National Academy of Sciences of the United States of America, vol. 112, Issue 14, Apr. 7, 2015, National Academy of Sciences, pp. 4233-4238.

El-Kady, Maher F. et al., "Laser Scribing of High-Performance and Flexible Graphene-Based Electrochemical Capacitors," Science Magazine, Mar. 16, 2012, vol. 335, No. 6074, 6 pages.

El-Kady, Maher F. et al., "Laser Scribing of High-Performance and Flexibile Graphene-Based Electrochemical capacitors," Science, vol. 335, Issue 6074, Mar. 16, 2012, www.sciencemag.org/cgi/content/full/335/6074/1326/DC1, American Association for the Advancement of Science, 25 pages.

El-Kady, Maher F. et al., "Scalable Fabrication of High-Power Graphene Micro-Supercapacitors for Flexible and On-Chip Energy Storage," Nature Communications, vol. 4, Issue 1475, Feb. 12, 2013, Macmillan Publishers Limited, pp. 1-9.

El-Kady, Maher F. et al., "Supplementary Information: Scalable Fabrication of High-Power Graphene Micro-Supercapacitors for Flexible and On-Chip Energy Storage", Nature Communications, Submitted for Publication: Oct. 1, 2012, 23 pages.

Fan, Zhuangjun et al., "Asymmetric Supercapacitors Based on Graphene/$MnO_2$ and Activated Carbon Nanofiber Electrodes with High Power and Energy Density," Advanced Functional Materials, vol. 21, Issue 12, Jun. 21, 2011, Wiley-VCH Verlag GmbH & Co. KGaA, Weinheim, pp. 2366-2375.

Feng, Jun et al., "Metallic Few-Layered $VS_2$ Ultrathin Nanosheets: High Two-Dimensional Conductivity for In-Plane Supercapacitors," Journal of the American Chemical Society, vol. 133, Issue 44, Sep. 27, 2011, American Chemical Society, pp. 17832-17838.

Fischer, Anne E. et al., "Incorporation of Homogeneous, Nanoscale $MnO_2$ within Ultraporous Carbon Structures via Self-Limiting Electroless Deposition: Implications for Electrochemical Capacitors," Nano Letters, vol. 7, Issue 2, Jan. 13, 2007, American Chemical Society, pp. 281-286.

Foo, Ce Yao et al., "Flexible and Highly Scalable $V_3O_5$-rGO Electrodes in an Organic Electrolyte for Supercapacitor Devices," Advanced Energy Materials, vol. 4, Issue 12, Aug. 26, 2014, Wiley-VCH Verlag GmbH & Co. KGaA, Weinheim, pp. 1-7.

Gan, Shiyu et al., "Spontaneous and Fast Growth of Large-Area Graphene Nanofilms Facilitated by Oil/Water Interfaces," Advanced Materials, vol. 24, Issue 29, Jun. 12, 2012, Wiley-VCH Verlag GmbH & Co, pp. 3958-3964.

Gao, Wei et al., "Direct laser writing of micro-supercapacitors on hydrated graphite oxide films," Nature Nanotechnology, vol. 6, Issue 8, Jul. 2011, Macmillan Publishers Limited, p. 496-500.

Gao, Wei et al., "Direct laser writing of micro-supercapacitors on hydrated graphite oxide films," Supplementary Information, Nature Nanotechnology, vol. 6, Issue 8, Jul. 2011, Macmillan Publishers Limited, 15 pages.

Gao, Hongcai et al., "Flexible All-Solid-State Asymmetric Supercapacitors Based on Free-Standing Carbon Nanotube/Graphene and $Mn_3O_4$ Nanoparticle/Graphene Paper Electrodes," Applied Materials & Interfaces, vol. 4, Issue 12, Nov. 20, 2012, American Chemical Society, pp. 7020-7026.

Gao, Hongcai et al., "High-Performance Asymmetric Supercapacitor Based on Graphene Hydrogel and Nanostructured $MnO_2$," ACS Applied Materials and Interfaces, vol. 4, Issue 5, Apr. 30, 2012, American Chemical Society, pp. 2801-2810.

International Search Report and Written Opinion for International Patent Application No. PCT/US2017/048883, dated Dec. 26, 2017, 10 pages.

Non-Final Office Action for U.S. Appl. No. 14/945,232, dated Jan. 29, 2018, 9 pages.

(56) References Cited

OTHER PUBLICATIONS

Extended European Search Report for European Patent Application No. 15809519.0, dated Feb. 5, 2018, 10 pages.
Decision on Rejection for Chinese Patent Application No. 201280070343.4, dated Jan. 5, 2018, 18 pages.
Non-Final Office Action for U.S. Appl. No. 15/612,405, dated Feb. 9, 2018, 9 pages.
Decision to Grant a Patent for Japanese Patent Application No. 2014-561017, dated Mar. 13, 2018, 4 pages.
First Office Action for Canadian Patent Application No. 2,862,806, dated Nov. 22, 2018, 5 pages.
Notification of the First Office Action for Chinese Patent Application No. 201580043429.1, dated Oct. 29, 2018, 19 pages.
International Search Report and Written Opinion for International Patent Application No. PCT/US2018/041728, dated Nov. 9, 2018, 10 pages.
Corrected Notice of Allowability for U.S. Appl. No. 15/319,286, dated Nov. 30, 2018, 5 pages.
Examination Report for European Patent Application No. 13757195.6, dated Jun. 13, 2018, 7 pages.
Partial Supplementary European Search Report for European Patent Application No. 15861794.4, dated Jun. 28, 2018, 16 pages.
International Preliminary Report on Patentability for International Patent Application No. PCT/US2016/067468, dated Jul. 5, 2018, 7 pages.
Non-Final Office Action for U.S. Appl. No. 15/319,286, dated Jun. 27, 2018, 9 pages.
Non-Final Office Action for U.S. Appl. No. 15/382,871, dated Jun. 27, 2018, 11 pages.
Non-Final Office Action for U.S. Appl. No. 15/472,409, dated Jun. 29, 2018, 11 pages.
Park, S. et al., "Colloidal Suspensions of Highly Reduced Graphene Oxide in a Wide Variety of Organic Solvents," Nano Letters, vol. 9, No. 4, 2009, American Chemical Society, pp. 1593-1597.
Applicant-Initiated Interview Summary for U.S. Appl. No. 15/427,210, dated May 29, 2019, 3 pages.
Notice of Reexamination for Chinese Patent Application No. 201280070343.4, dated Jun. 27, 2019, 14 pages.
Applicant-Initiated Interview Summary for U.S. Appl. No. 16/029,930, dated Jul. 29, 2019, 4 pages.
Non-Final Office Action for U.S. Appl. No. 15/612,405, dated Jun. 18, 2019, 12 pages.
Notification of the Second Office Action for Chinese Patent Application No. 201580043429.1, dated Jun. 20, 2019, 9 pages.
Final Office Action for U.S. Appl. No. 14/945,232, dated Jul. 17, 2019, 8 pages.
Notice of Acceptance for Australian Patent Application No. 2015349949, dated Jul. 12, 2019, 3 pages.
Notice of Allowance for U.S. Appl. No. 15/382,871, dated May 17, 2019, 10 pages.
Extended European Search Report for European Patent Application No. 16879927.8, dated Jul. 9, 2019, 14 pages.
Partial Supplementary European Search Report for European Patent Application No. 17741923.1, dated Jul. 23, 2019, 13 pages.
Non-Final Office Action for U.S. Appl. No. 15/472,409, dated May 31, 2019, 12 pages.
Non-Final Office Action for U.S. Appl. No. 15/410,404, dated May 24, 2019, 9 pages.
Vranes, M. et al., "Physicochemical Characterization of 1-Butyl-3-methylimidazolium and 1-Butyl-1-methylpyrrolidinium Bis{trifluoromethylsulfonyl}imide," Journal of Chemical & Engineering Data, vol. 57, Mar. 7, 2012, American Chemical Society, pp. 1072-1077.
Notice of Allowance for U.S. Appl. No. 15/427,210, dated Dec. 18, 2019, 9 pages.
Final Office Action for U.S. Appl. No. 15/612,405, dated Dec. 27, 2019, 17 pages.
Notice of Allowance for U.S. Appl. No. 14/945,232, dated Dec. 20, 2019, 9 pages.
Applicant-Initiated Interview Summary for U.S. Appl. No. 15/382,871, dated Dec. 31, 2019, 5 pages.
Corrected Notice of Allowability for U.S. Appl. No. 15/410,404, dated Dec. 3, 2019, 6 pages.
Non-Final Office Action for U.S. Appl. No. 16/692,123, dated Dec. 27, 2019, 11 pages.
Notice of Allowance for U.S. Appl. No. 15/472,409, dated Dec. 11, 2019, 11 pages.
Gao, C. et al., "Superior Cycling Performance of SiOx/C Composite with Arrayed Mesoporous Architecture as Anode Material for Lithium-Ion Batteries," Journal of the Electrochemical Society, vol. 161, No. 14, 2014, The Electrochemical Society, pp. A2216-A2221.
Grant of Patent for Korean Patent Application No. 10-2014-7020353, dated Oct. 29, 2019, 3 pages.
Office Action for Canadian Patent Application No. 2,866,250, dated Dec. 17, 2019, 3 pages.
Examination Report for European Patent Application No. 15809519.0, dated Dec. 9, 2019, 7 pages.
Official Action for Eurasian Patent Application No. 201791078, dated Nov. 6, 2019, 4 pages.
Official Action for Eurasian Patent Application No. 201892199, dated Nov. 28, 2019, 6 pages.
Extended European Search Report for European Paetnt Application No. 17816292.1, dated Jan. 7, 2020, 9 pages.
Examination Report for Indian Patent Application No. 201817044642, dated Nov. 26, 2019, 7 pages.
Official Action for Eurasian Patent Application No. 201892118, dated Nov. 28, 2019, 4 pages.
Notice of Preliminary Rejection for Korean Patent Application No. 10-2014-7028084, dated Aug. 22, 2019, 30 pages.
Notification of Reasons for Rejection for Japanese Patent Application No. 2017-526533, dated Aug. 20, 2019, 4 pages.
Notice of Acceptance for Australian Patent Application No. 2015277264, dated Jul. 31, 2019, 3 pages.
Notification of the Third Office Action for Chinese Patent Application No. 2015800725403, dated Jul. 17, 2019, 9 pages.
Fernandez-Merino, M.J. et al., "Vitamin C Is an Ideal Substitute for Hydrazine in the Reduction of Graphene Oxide Suspensions," The Journal of Physical Chemistry C, vol. 114, No. 14, Mar. 4, 2010, American Chemical Society, pp. 6426-6432.
Lu, J. et al., "Advanced applications of ionic liquids in polymer science," Progress in Polymer Science, vol. 34, 2009, Elsevier Ltd., pp. 431-448.
Yan, Jun et al., "High-performance supercapacitor electrodes based on highly corrugated graphene sheets," Carbon, vol. 50, 2012, Elsevier Ltd., pp. 2179-2188.
Final Office Action for U.S. Appl. No. 16/029,930, dated Nov. 15, 2019, 16 pages.
Notice of Allowance and Examiner-Initiated Interview Summary for U.S. Appl. No. 15/410,404, dated Oct. 25, 2019, 11 pages.
Final Office Action for U.S. Appl. No. 15/688,342, dated Oct. 17, 2019, 11 pages.
Non-Final Office Action for U.S. Appl. No. 15/630,758, dated Oct. 11, 2019, 11 pages.
Cannarella et al., "Mechanical Properties of a Battery Separator under Compression and Tension," Journal of the Electrochemical Society, vol. 161, No. 11, Sep. 26, 2014, pp. F3117-F3122.
Non-Final Office Action for U.S. Appl. No. 15/427,210, dated Sep. 3, 2019, 16 pages.
Non-Final Office Action for U.S. Appl. No. 14/945,232, dated Sep. 3, 2019, 8 pages.
Non-Final Office Action for U.S. Appl. No. 15/382,871, dated Sep. 16, 2019, 9 pages.
Non-Final Office Action for U.S. Appl. No. 16/428,409, dated Sep. 16, 2019, 12 pages.
Office Action for Canadian Patent Application No. 2,862,806, dated Sep. 30, 2019, 3 pages.
Decision of Rejection for Japanese Patent Application No. 2016-573846, dated Oct. 29, 2019, 9 pages.
First Office Action for Chinese Patent Application No. 2016800753323, dated Aug. 27, 2019, 15 pages.
Extended European Search Report for European Patent Application No. 17741923.1, dated Nov. 15, 2019, 18 pages.

(56) References Cited

OTHER PUBLICATIONS

Extended European Search Report for European Patent Application No. 17776536.9, dated Oct. 30, 2019, 8 pages.
Extended European Search Report for European Patent Application No. 17771081.1, dated Oct. 22, 2019, 6 pages.
Office Action for Eurasian Patent Application No. 201790003, dated Feb. 26, 2020, 6 pages.
Examination Report No. 1 for Australian Patent Application No. 2019250120, dated Apr. 24, 2020, 4 pages.
Partial Supplemental European Search Report for European Patent Application No. 17847303.9, dated Apr. 3, 2020, 10 pages.
Decision of Rejection for Chinese Patent Application No. 201580072540.3, dated Apr. 22, 2020, 8 pages.
Author Unknown, "Sulfuric Acid—Density," The Engineering Toolbox, accessed Apr. 10, 2020 at https://www.engineeringtoolbox.com/indsulfuric-acid-density-d_2163.html, 6 pages.
Garg, R. et al., "Nanowire Mesh Templated Growth of Out-of-Plane Three-Dimensional Fuzzy Graphene," ACS Nano, vol. 11, 2017, American Chemical Society, pp. 6301-6311.
Kang, J.H. et al., "Hidden Second Oxidation Step of Hummers Method," Chemistry of Materials, vol. 28, 2016, American Chemical Society, pp. 756-764.
Li, Qintao et al., "Carbon nanotubes coated by carbon nanoparticles of turbostratic stacked graphenes," Carbon, vol. 46, 2008, Elsevier Ltd., pp. 434-439.
Non-Final Office Action for U.S. Appl. No. 15/688,342, dated Apr. 9, 2020, 10 pages.
Final Office Action for U.S. Appl. No. 15/630,758, dated Apr. 15, 2020, 13 pages.
Non-Final Office Action for U.S. Appl. No. 16/033,266, dated Apr. 29, 2020, 12 pages.
Advisory Action for U.S. Appl. No. 15/612,405, dated Jun. 24, 2020, 3 pages.
Non-Final Office Action for U.S. Appl. No. 16/029,930, dated Jun. 24, 2020, 16 pages.
Final Office Action for U.S. Appl. No. 16/428,409, dated Jun. 23, 2020, 16 pages.
Supplemental Notice of Allowability for U.S. Appl. No. 14/945,232, dated Feb. 26, 2020, 5 pages.
Examination Report for European Patent Application No. 13757195.6, dated Jan. 29, 2020, 4 pages.
Office Action for Brazilian Patent Application No. 112016029468, dated Jan. 21, 2020, 6 pages.
Third Office Action for Chinese Patent Application No. 201580043429.1, dated Jan. 3, 2020, 20 pages.
Office Action for Israeli Patent Application No. 249506, dated Dec. 3, 2019, 8 pages.
Office Action for Brazilian Patent Application No. 112017010257, dated Jan. 28, 2020, 7 pages.
First Office Action for Chinese Patent Application No. 2017800076125, dated Nov. 28, 2019, 20 pages.
International Preliminary Report on Patentability for International Patent Application No. PCT/US2018/041728, dated Jan. 23, 2020, 7 pages.
Supplemental Notice of Allowability for U.S. Appl. No. 14/945,232, dated Feb. 12, 2020, 5 pages.
Office Action for Eurasian Patent Application No. 201990587/31, dated Mar. 26, 2020, 4 pages.
Notice of Preliminary Rejection for Korean Patent Application No. 10-2014-7028084, dated Feb. 17, 2020, 5 pages.
Examination Report for Indian Patent Application No. 201617042976, dated Mar. 13, 2020, 7 pages.
Office Action for Mexican Patent Application No. MX/a/2016/016239, dated Feb. 26, 2020, 5 pages.
Notification of Reasons for Rejection for Japanese Patent Application No. 2017-526533, dated Mar. 16, 2020, 7 pages.
Second Office Action for Chinese Patent Application No. 2016800753323, dated Mar. 5, 2020, 15 pages.
First Office Action for Chinese Patent Application No. 2017800249783, dated Jan. 6, 2020, 15 pages.

Notice of Reexamination for Chinese Patent Application No. 201280070343.4, dated Feb. 3, 2020, 7 pages.
Office Action for Vietnamese Patent Application No. 1-2016-05086, dated May 29, 2020, 2 pages.
First Office Action and Search Report for Chinese Patent Application No. 201811438766.2, dated Mar. 31, 2020, 32 pages.
Non-Final Office Action for U.S. Appl. No. 16/791,504, dated Nov. 18, 2020, 16 pages.
Zhang, Luojiang, et al., "3D porous layered double hydroxides grown on graphene as advanced electrochemical pseudocapacitor materials," Journal of Materials Chemistry A, vol. 1, 2013, pp. 9046-9053.
Notice of Acceptance for Australian Patent Application No. 2019250120, dated Nov. 11, 2020, 3 pages.
Notification of Decision of Rejection for Japanese Patent Application No. 2017-526533, dated Nov. 17, 2020, 6 pages.
Official Notification for Eurasion Patent Application No. 20182199, dated Dec. 11, 2020, 6 pages.
Notification of the Second Office Action for Chinese Patent Application No. 2017800249783, dated Dec. 2, 2020, 9 pages.
Official Action for Eurasion Patent Application No. 201892118, dated Dec. 11, 2020, 6 pages.
Invitation to Pay Additional Fees and Partial Search for International Patent Application No. PCT/US2020/052618, dated Nov. 30, 2020, 2 pages.
Reexamination Decision for Chinese Patent Application No. 201280070343.4, dated Aug. 31, 2020, 19 pages.
Examination Report for Taiwanese Patent Application No. 106111115, dated Aug. 25, 2020, 17 pages.
Author Unknown, "Sulfuric Acid—Density," The Engineering ToolBox, www.engineeringtoolbox.com/indsulfuric-acid-density-d_2163.html, accessed Oct. 2, 2020, 3 pages.
Notice of Allowance and Examiner-Initiated Interview Summary for U.S. Appl. No. 16/784,578, dated Oct. 15, 2020, 9 pages.
Notice of Allowability for U.S. Appl. No. 16/223,869, dated Sep. 15, 2020, 5 pages.
Non-Final Office Action for U.S. Appl. No. 16/428,409, dated Oct. 1, 2020, 14 pages.
Notice of Allowance for U.S. Appl. No. 16/692,123, dated Oct. 21, 2020, 8 pages.
Non-Final Office Action for U.S. Appl. No. 15/630,758, dated Oct. 1, 2020, 14 pages.
Notice of Allowance for U.S. Appl. No. 15/612,405, dated Dec. 17, 2020, 8 pages.
Non-Final Office Action for U.S. Appl. No. 16/029,930, dated Jan. 6, 2021, 15 pages.
Final Office Action for U.S. Appl. No. 16/033,266, dated Jan. 6, 2021, 10 pages.
Second Office Action for Chinese Patent Application No. 201811438766.2, dated Oct. 28, 2020, 10 pages.
Notification of Reexamination for Chinese Patent Application No. 2015800725403, dated Oct. 12, 2020, 9 pages.
Office Action for Israeli Patent Application No. 252320, dated Sep. 17, 2020, 11 pages.
Examination Report for Australian Patent Application No. 2016378400, dated Sep. 22, 2020, 5 pages.
Examination Report for Taiwanese Patent Application No. 105142233, dated Sep. 25, 2020, 19 pages.
Examination Report for Australian Patent Application No. 2017209117, dated Oct. 5, 2020, 5 pages.
Examination Report for Taiwanese Patent Application No. 106109733, dated Oct. 20, 2020, 11 pages.
Yang, Wanlu, et al., "Solvothermal One-Step Synthesis of Ni—Al Layered Double Hydroxide/Carbon Nanotube/Reduced Graphene Oxide Sheet Ternary Nanocomposite with Ultrahigh Capacitance for Supercapacitors," Applied Materials and Interfaces, vol. 5, 2013, American Chemical Society, pp. 5443-5454.
Decision of Reexamination for Chinese Patent Application No. 201580072540.3, dated Feb. 2, 2021, 18 pages.
Notification of Reasons for Rejection for Japanese Patent Application No. 2018-532233, dated Dec. 15, 2020, 8 pages.
Examination Report for Australian Patent Application No. 185870, dated Jan. 28, 2021, 5 pages.

(56) References Cited

OTHER PUBLICATIONS

Official Notification for Eurasian Patent Application No. 201990068, dated Jan. 14, 2021, 6 pages.
Notice of Preliminary Rejection for Korean Patent Application No. 10-2018-7029515, dated Jan. 21, 2021, 9 pages.
International Search Report and Written Opinion for International Patent Application No. PCT/US2020/052618, dated Feb. 17, 2021, 19 pages.
Wikipedia, "Ferromagnetism," Feb. 13, 2017, Retrieved Aug. 7, 2018 from https://en.wikipedia.org/w/index.php?title=Ferromagnetism&oldid=765289868, 1 page.
Grosu, Yaroslav et al., "Natural Magnetite for thermal energy storage: Excellent thermophysical properties, reversible latent heat transition and controlled thermal conductivity," Solar Energy Materials & Solar Cells, vol. 161, Available online Dec. 6, 2016, Elsevier B.V., pp. 170-176.
Hwang, J. Y., et al., "Boosting the Capacitance and Voltage of Aqueous Supercapacitors via Redox Charge contribution from both Electrode and Electrolyte," Nano Today, vol. 15, Available online Jul. 22, 2017, pp. 15-25.
Karami, Hassan et al., "Sodium Sulfate Effects on the Electrochemical Behaviors of Nanostructured Lead Dioxide and Commercial Positive Plates of Lead-Acid Batteries," International Journal of Electrochemical Science, vol. 5, 2010, ESG, pp. 1046-1059.
Lee, Juhan, et al., "High Performance Hybrid Energy Storage with Potassium Ferricyanide Redox Electrolyte," Applications of Materials and Interfaces, vol. 8, Aug. 2016, ACS, pp. 23676-23687.
Notice of Allowance for U.S. Appl. No. 15/612,405, dated Sep. 8, 2020, 7 pages.
Examination Report for Indian Patent Application No. 201817023184, dated Aug. 13, 2020, 6 pages.
Examination Report for Indian Patent Application No. 201817034180, dated Aug. 13, 2020, 6 pages.
Examination Report for European Patent Application No. 17816292.1, dated Aug. 24, 2020, 4 pages.
Examination Report for Indian Patent Application No. 201817033309, dated Aug. 28, 2020, 6 pages.
Invitation to Pay Additional Fees for International Patent Application No. PCT/US2018/036846, dated Aug. 24, 2018, 2 pages.
International Search Report and Written Opinion for International Patent Application No. PCT/US2018/036846, dated Nov. 9, 2018, 14 pages.
International Preliminary Report on Patentability for International Patent Application No. PCT/US2018/036846, dated Dec. 26, 2019, 10 pages.
Non-Final Office Action for U.S. Appl. No. 16/0004,818, dated Jun. 24, 2020, 18 pages.
Notice of Allowance for U.S. Appl. No. 16/223,869, dated Jul. 9, 2020, 9 pages.
Official Action for Eurasian Patent Application No. 201791078, dated Jun. 23, 2020, 4 pages.
Examination Report for Indian Patent Application No. 201717016755, dated Jul. 2, 2020, 6 pages.
Examination Report for Indian Patent Application No. 201817020826, dated Jul. 13, 2020, 7 pages.
Notice of Allowance for U.S. Patent Application No. 16/692,123, dated Jul. 15, 2020, 9 pages.
First Office Action and Search Report for Chinese Patent Application No. 2017800273161, dated Jun. 5, 2020, 15 pages.
Extended European Search Report for European Patent Application No. 17847303.9, dated Jul. 13, 2020, 9 pages.
Official Notification for Eurasian Patent Application No. 201990068, dated Jun. 23, 2020, 5 pages.
Advisory Action for U.S. Appl. No. 15/466,425, dated Jul. 7, 2020, 3 pages.
Parker, J. F., et al. "Rechargeable nickel-3D zinc batteries: An energy-dense, safer alternative to lithium-ion," Science, vol. 356, No. 6336, 2017, American Association for the Advancement of Science, pp. 415-418.
Dubal, D. P., et al., "Hybrid energy storage: the merging of battery and supercapacitor chemistries," Chemical Societ Review, vol. 44, No. 7, 2015, pp. 1777-1790.
Gong, M., et al., "Ultrafast high-capacity NiZn battery with NiAlCo-layered double hydroxide," Energy & Environmental Science, vol. 7, No. 6, 2014, pp. 2025-2032.
Humble, P. H., et al., "Microscopic nickel-zinc batteries for use in autonomous microsystems," Journal of the electrochemical Society, vol. 148, No. 12, 2001, pp. A1357-A1361.
Mishra, G., et al., "Layered double hydroxides: A brief review from fundamentals to application as evolving biomaterials," Applied Clay Science, vol. 153, 2018, Elsevier B.V., pp. 172-186.
Final Office Action for U.S. Appl. No. 16/004,818, dated Feb. 25, 2021, 24 pages.
Notification of Reasons for Rejection for Japanese Patent Application No. 2018-538110, dated Jan. 20, 2021, 9 pages.
Notification of Reasons for Rejection for Japanese Patent Application No. 2018-550836, dated Feb. 12, 2021, 6 pages.
Examination Report for Taiwanese Patent Application No. 106121056, dated Feb. 3, 2021, 10 pages.
Non-Final Office Action for U.S. Appl. No. 16/791,517, dated Apr. 1, 2021, 16 pages.
Applicant-Initiated Interview Summary for U.S. Appl. No. 16/428,409, dated Mar. 19, 2021, 2 pages.
Applicant-Initiated Interview Summary for U.S. Appl. No. 16/033,266, dated Apr. 8, 2021, 3 pages.
Notice of Preliminary Rejection for Korean Patent Application No. 10-2018-7030385, dated Mar. 13, 2021, 10 pages.
Notice of Reasons for Rejection for Japanese Patent Application No. 2018-549538, dated Feb. 15, 2021, 6 pages.
Partial Supplementary European Search Report for European Patent Application No. 18832324.0, dated Mar. 12, 2021, 15 pages.
Shao, et al., "3D Freeze-Casting of Cellular Graphene Films for Ultrahigh-Power-Density Supercapacitors," Advanced Materials, vol. 28, 2016, 8 pages.
Notice of Allowance for U.S. Appl. No. 16/428,409, dated May 14, 2021, 10 pages.
Notice of Allowance for U.S. Appl. No. 15/630,758, dated May 14, 2021, 11 pages.
Final Office Action for U.S. Appl. No. 16/791,504, dated May 27, 2021, 16 pages.
Examination Report for European Patent Application No. 15861794.4, dated Apr. 14, 2021, 4 pages.
Examination Report for Australian Patent Application No. 2017245151, dated Mar. 25, 2021, 5 pages.
Second Office Action for Chinese Patent Application No. 2017800273161, dated Apr. 6, 2021, 8 pages.
Notification of Reasons for Rejection for Japanese Patent Application No. 2018-567030, dated Apr. 5, 2021, 8 pages.
Examination Report for Australian Patent Application No. 2017238201, dated Mar. 17, 2021, 4 pages.

* cited by examiner

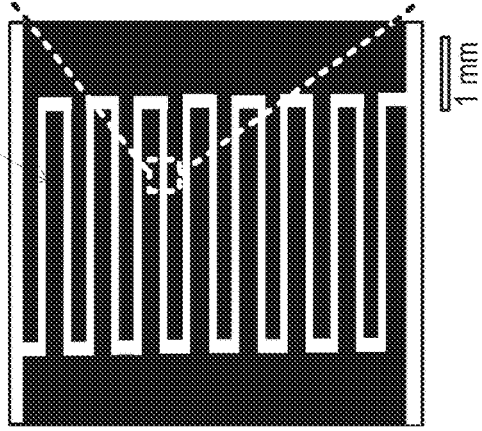
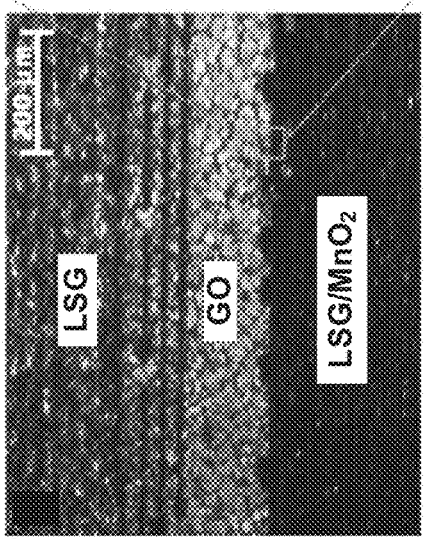
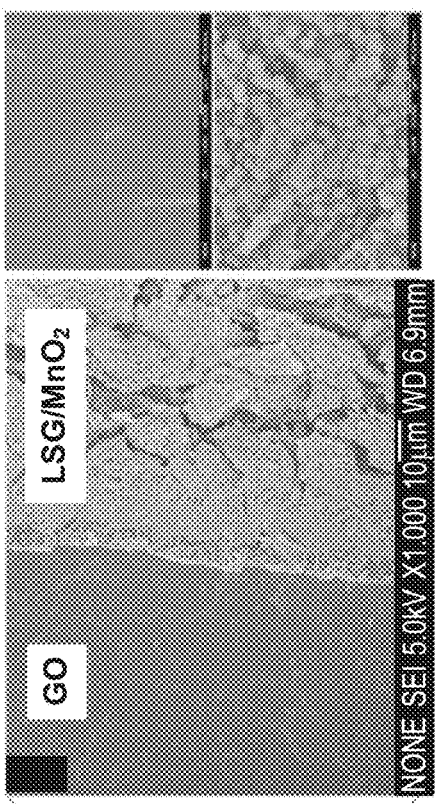
FIG. 6D
FIG. 6E
FIG. 6F

Sun Light

Night

DEVICES AND METHODS FOR HIGH VOLTAGE AND SOLAR APPLICATIONS

CROSS-REFERENCE

This application claims the benefit of U.S. Provisional Application No. 62/312,408 filed Mar. 23, 2016, and U.S. Provisional Application No. 62/421,920 filed Nov. 14, 2016, which applications are incorporated herein in their entirety by reference.

BACKGROUND

As a result of the rapidly growing energy needs of modern life, the development of high performance energy storage devices has gained significant attention.

Supercapacitors are promising energy storage devices with properties intermediate between those of batteries and traditional capacitors, but they are being improved more rapidly than either. Over the past couple of decades, supercapacitors have become key components of everyday products by replacing batteries and capacitors in an increasing number of applications. Their high power density and excellent low temperature performance have made them the technology of choice for application in back-up power, cold starting, flash cameras, regenerative braking, and hybrid electric vehicles. The future growth of this technology depends on further improvements in many areas, including energy density, power density, calendar life, cycle life, and production cost.

SUMMARY

The instant inventors have recognized a need for improved design and integration of hybrid materials into microsupercapacitors (e.g., due to complicated microfabrication techniques that may involve building 3D microelectrodes with micrometer separations).

The present disclosure provides a simple, yet versatile, technique for the fabrication of microdevices such as, for example, 3D hybrid microsupercapacitors. In some embodiments, such 3D hybrid microsupercapacitors are based on interconnected corrugated carbon-based network (ICCN) and $MnO_2$. In some embodiments, the microdevices herein enable a capacitance per footprint (e.g., an ultrahigh capacitance per footprint) approaching about 400 $mF/cm^2$. In some embodiments, microdevices herein provide an energy density of up to about 22 Wh/L (e.g., more than two times that of lithium thin film batteries). These developments are promising, among other examples, for microelectronic devices such as biomedical sensors and radio frequency identification (RFID) tags (e.g., where high capacity per footprint is crucial).

The present disclosure provides a method for the preparation and/or integration of microdevices for high voltage applications. In some embodiments, the present disclosure provides a method for the direct preparation and integration of asymmetric microsupercapacitors for high voltage applications. The microsupercapacitors may comprise an array of separate electrochemical cells. In some embodiments, the array of separate electrochemical cells can be directly fabricated in the same plane and in one step. This configuration may provide very good control over the voltage and current output. In some embodiments, the array can be integrated with solar cells for efficient solar energy harvesting and storage. In some embodiments, the devices are integrated microsupercapacitors for high voltage applications. In certain embodiments, the devices are asymmetric microsupercapacitors for high voltage applications (high voltage asymmetric microsupercapacitors). In some embodiments, the array comprises one or more electrochemical cells with at least one $ICCN/MnO_2$ hybrid electrode.

An aspect of the present disclosure provides an approach for fabrication of hybrid laser-scribed graphene (LSG)-$MnO_2$ 3D supercapacitors and microsupercapacitors. In some embodiments, the supercapacitors and/or microsupercapacitors can be compact, reliable, energy dense, or any combination thereof. In other embodiments, the supercapacitors and/or microsupercapacitors can charge quickly, possess long lifetime, or any combination thereof. Given the use of $MnO_2$ in alkaline batteries (selling approximately 10 billion units per year) and the scalability of graphene-based materials, graphene/$MnO_2$ hybrid electrodes may offer promise for real world applications.

An aspect of the present disclosure provides an electrochemical system comprising a plurality of interconnected electrochemical cells, each electrochemical cell comprising a first electrode and a second electrode, wherein at least one of the first electrode and the second electrode comprises an interconnected corrugated carbon-based network (ICCN). In some embodiments, the electrochemical system is capable of outputting a voltage of about 5 V to about 500 V. In some embodiments, the electrochemical system is capable of outputting a voltage of at least about 5 V. In some embodiments, the electrochemical system is capable of outputting a voltage of at least about 100 V. In some embodiments, the electrochemical system is capable of outputting a voltage of about 5 V to about 10 V, about 5 V to about 50 V, about 5 V to about 100 V, about 5 V to about 200 V, about 5 V to about 300 V, about 5 V to about 400 V, about 5 V to about 500 V, about 10 V to about 50 V, about 10 V to about 100 V, about 10 V to about 200 V, about 10 V to about 300 V, about 10 V to about 400 V, about 10 V to about 500 V, about 50 V to about 100 V, about 50 V to about 200 V, about 50 V to about 300 V, about 50 V to about 400 V, about 50 V to about 500 V, about 100 V to about 200 V, about 100 V to about 300 V, about 100 V to about 400 V, about 100 V to about 500 V, about 200 V to about 300 V, about 200 V to about 400 V, about 200 V to about 500 V, about 300 V to about 400 V, about 300 V to about 500 V, or about 400 V to about 500 V.

In some embodiments, the plurality of interconnected electrochemical cells comprises at least one hybrid supercapacitor cell. In some embodiments, the plurality of interconnected electrochemical cells is an array of hybrid microsupercapacitors. In some embodiments, the plurality of interconnected electrochemical cells is an array of microsupercapacitors fabricated by light scribing.

In some embodiments, the electrochemical system further comprises an electrolyte disposed between the first electrode and the second electrode. In some embodiments, the electrolyte is an aqueous electrolyte. In some embodiments, the system further comprises a solar cell in electrical communication with the plurality of interconnected electrochemical cells. In some embodiments, the solar cell is a copper indium gallium selenide (CIGS) cell or an organic photovoltaic cell.

In some embodiments, the electrochemical system comprises a planar array of interconnected electrochemical cells, wherein each electrochemical cell comprises at least two electrodes, wherein each electrode comprises a carbonaceous material, wherein at least one electrode further comprises a pseudocapacitive material. In some embodiments, the carbonaceous material comprises an interconnected corrugated carbon-based network (ICCN), a laser scribed graphene (LSG) or any combination thereof. In some embodiments, each electrochemical cell comprises two electrodes, and wherein each electrode comprises a carbonaceous material and a pseudocapacitive material. In some embodiments, the pseudocapacitive material comprises $MnO_2$, $RuO_2$, $Co_3O_4$, $NiO$, $Fe_2O_3$, $CuO$, $MoO_3$, $V_2O_5$, $Ni(OH)_2$, or any combination thereof. In some embodiments, the array of electrochemical cells is arranged in an interdigitated structure. In some embodiments, the electrochemical system further comprises an electrolyte disposed between the first electrode and the second electrode. In some embodiments, the electrochemical system further comprises a current collector attached to an electrode. In some embodiments, at least one electrochemical cell is capable of outputting a voltage of at least about 5 volts. In some embodiments, the electrochemical system is capable of outputting a voltage of at least 100 volts. In some embodiments, an electrochemical cell has an energy density of at least about 22 watt-hours per liter (Wh/L). In some embodiments, the array of electrochemical cells has a capacitance per footprint of at least about 380 millifarads per square centimeter ($mF/cm^2$). In some embodiments, the array of electrochemical cells has a volumetric capacitance of at least about 1,100 farads per cubic centimeter ($F/cm^3$).

Another aspect of the present disclosure provides a supercapacitor comprising an array of supercapacitor cells. In some embodiments, the array of supercapacitor cells comprises at least one hybrid supercapacitor cell. In some embodiments, the array of supercapacitor cells is an array of hybrid supercapacitor cells.

In some embodiments, the array of supercapacitor cells is capable of outputting a voltage of about 5 V to about 100 V. In some embodiments, the array of supercapacitor cells is capable of outputting a voltage of at least about 5 V. In some embodiments, the array of supercapacitor cells is capable of outputting a voltage of about 5 V to about 10 V, about 5 V to about 20 V, about 5 V to about 30 V, about 5 V to about 40 V, about 5 V to about 50 V, about 5 V to about 60 V, about 5 V to about 70 V, about 5 V to about 80 V, about 5 V to about 90 V, about 5 V to about 100 V, about 10 V to about 20 V, about 10 V to about 30 V, about 10 V to about 40 V, about 10 V to about 50 V, about 10 V to about 60 V, about 10 V to about 70 V, about 10 V to about 80 V, about 10 V to about 90 V, about 10 V to about 100 V, about 20 V to about 30 V, about 20 V to about 40 V, about 20 V to about 50 V, about 20 V to about 60 V, about 20 V to about 70 V, about 20 V to about 80 V, about 20 V to about 90 V, about 20 V to about 100 V, about 30 V to about 40 V, about 30 V to about 50 V, about 30 V to about 60 V, about 30 V to about 70 V, about 30 V to about 80 V, about 30 V to about 90 V, about 30 V to about 100 V, about 40 V to about 50 V, about 40 V to about 60 V, about 40 V to about 70 V, about 40 V to about 80 V, about 40 V to about 90 V, about 40 V to about 100 V, about 50 V to about 60 V, about 50 V to about 70 V, about 50 V to about 80 V, about 50 V to about 90 V, about 50 V to about 100 V, about 60 V to about 70 V, about 60 V to about 80 V, about 60 V to about 90 V, about 60 V to about 100 V, about 70 V to about 80 V, about 70 V to about 90 V, about 70 V to about 100 V, about 80 V to about 90 V, about 80 V to about 100 V, or about 90 V to about 100 V.

In some embodiments, the supercapacitor has an energy density of about 10 Wh/L to about 80 Wh/L. In some embodiments, the supercapacitor has an energy density of at least about 10 Wh/L. In some embodiments, the supercapacitor has an energy density of about 10 Wh/L to about 20 Wh/L, about 10 Wh/L to about 30 Wh/L, about 10 Wh/L to about 40 Wh/L, about 10 Wh/L to about 50 Wh/L, about 10 Wh/L to about 60 Wh/L, about 10 Wh/L to about 70 Wh/L, about 10 Wh/L to about 80 Wh/L, about 20 Wh/L to about 30 Wh/L, about 20 Wh/L to about 40 Wh/L, about 20 Wh/L to about 50 Wh/L, about 20 Wh/L to about 60 Wh/L, about 20 Wh/L to about 70 Wh/L, about 20 Wh/L to about 80 Wh/L, about 30 Wh/L to about 40 Wh/L, about 30 Wh/L to about 50 Wh/L, about 30 Wh/L to about 60 Wh/L, about 30 Wh/L to about 70 Wh/L, about 30 Wh/L to about 80 Wh/L, about 40 Wh/L to about 50 Wh/L, about 40 Wh/L to about 60 Wh/L, about 40 Wh/L to about 70 Wh/L, about 40 Wh/L to about 80 Wh/L, about 50 Wh/L to about 60 Wh/L, about 50 Wh/L to about 70 Wh/L, about 50 Wh/L to about 80 Wh/L, about 60 Wh/L to about 70 Wh/L, about 60 Wh/L to about 80 Wh/L, or about 70 Wh/L to about 80 Wh/L.

In some embodiments, the at least one supercapacitor cell has an energy density at least about 6 times greater than an energy density of a carbon-based non-hybrid supercapacitor cell. In some embodiments, the at least one hybrid supercapacitor cell comprises at least one electrode comprising (i) a carbonaceous material and (ii) a pseudocapacitive metal or metal oxide material. In some embodiments, the at least one hybrid supercapacitor cell comprises at least one electrode comprising an interconnected corrugated carbon-based network (ICCN) and $MnO_2$. In some embodiments, the at least one hybrid supercapacitor cell comprises symmetric or asymmetric electrodes.

In some embodiments, the array of supercapacitor cells is arranged in an interdigitated structure. In some embodiments, the array of supercapacitors has a capacitance per footprint of about 250 $mF/cm^2$ to about 600 $mF/cm^2$. In some embodiments, the array of supercapacitors has a capacitance per footprint of at least about 250 $mF/cm^2$. In some embodiments, the array of supercapacitors has a capacitance per footprint of about 250 $mF/cm^2$ to about 300 $mF/cm^2$, about 250 $mF/cm^2$ to about 350 $mF/cm^2$, about 250 $mF/cm^2$ to about 400 $mF/cm^2$, about 250 $mF/cm^2$ to about 450 $mF/cm^2$, about 250 $mF/cm^2$ to about 500 $mF/cm^2$, about 250 $mF/cm^2$ to about 550 $mF/cm^2$, about 250 $mF/cm^2$ to about 600 $mF/cm^2$, about 300 $mF/cm^2$ to about 350 $mF/cm^2$, about 300 $mF/cm^2$ to about 400 $mF/cm^2$, about 300 $mF/cm^2$ to about 450 $mF/cm^2$, about 300 $mF/cm^2$ to about 500 $mF/cm^2$, about 300 $mF/cm^2$ to about 550 $mF/cm^2$, about 300 $mF/cm^2$ to about 600 $mF/cm^2$, about 350 $mF/cm^2$ to about 400 $mF/cm^2$, about 350 $mF/cm^2$ to about 450 $mF/cm^2$, about 350 $mF/cm^2$ to about 500 $mF/cm^2$, about 350 $mF/cm^2$ to about 550 $mF/cm^2$, about 350 $mF/cm^2$ to about 600 $mF/cm^2$, about 400 $mF/cm^2$ to about 450 $mF/cm^2$, about 400 $mF/cm^2$ to about 500 $mF/cm^2$, about 400 $mF/cm^2$ to about 550 $mF/cm^2$, about 400 $mF/cm^2$ to about 600 $mF/cm^2$, about 450 $mF/cm^2$ to about 500 $mF/cm^2$, about 450 $mF/cm^2$ to about 550 $mF/cm^2$, about 450 $mF/cm^2$ to about 600 $mF/cm^2$, about 500 $mF/cm^2$ to about 550 $mF/cm^2$, about 500 $mF/cm^2$ to about 600 $mF/cm^2$, or about 550 $mF/cm^2$ to about 600 $mF/cm^2$.

In some embodiments, the array of supercapacitors maintains the capacitance even at high charge-discharge rates. In some embodiments, the array of supercapacitors maintains the capacitance at a charge-discharge rate corresponding to a current density of about 5,000 $mA/cm^3$ to about 20,000 $mA/cm^3$. In some embodiments, the array of supercapacitors maintains the capacitance at a charge-discharge rate corresponding to a current density of at least about 5,000 $mA/cm^3$. In some embodiments, the array of supercapacitors maintains the capacitance at a charge-discharge rate corresponding to a current density of about 5,000 $mA/cm^3$ to about 7,500 $mA/cm^3$, about 5,000 $mA/cm^3$ to about 10,000 $mA/cm^3$, about 5,000 $mA/cm^3$ to about 12,500 $mA/cm^3$, about 5,000 mA/cm$^3$ to about 15,000 mA/cm$^3$, about 5,000 mA/cm$^3$ to about 17,500 mA/cm$^3$, about 5,000 mA/cm$^3$ to about 20,000 mA/cm$^3$, about 7,500 mA/cm$^3$ to about 10,000 mA/cm$^3$, about 7,500 mA/cm$^3$ to about 12,500 mA/cm$^3$, about 7,500 mA/cm$^3$ to about 15,000 mA/cm$^3$, about 7,500 mA/cm$^3$ to about 17,500 mA/cm$^3$, about 7,500 mA/cm$^3$ to about 20,000 mA/cm$^3$, about 10,000 mA/cm$^3$ to about 12,500 mA/cm$^3$, about 10,000 mA/cm$^3$ to about 15,000 mA/cm$^3$, about 10,000 mA/cm$^3$ to about 17,500 mA/cm$^3$, about 10,000 mA/cm$^3$ to about 20,000 mA/cm$^3$, about 12,500 mA/cm$^3$ to about 15,000 mA/cm$^3$, about 12,500 mA/cm$^3$ to about 17,500 mA/cm$^3$, about 12,500 mA/cm$^3$ to about 20,000 mA/cm$^3$, about 15,000 mA/cm$^3$ to about 17,500 mA/cm$^3$, about 15,000 mA/cm$^3$ to about 20,000 mA/cm$^3$, or about 17,500 mA/cm$^3$ to about 20,000 mA/cm$^3$.

In some embodiments, the array of supercapacitors maintains the capacitance at a charge-discharge rate corresponding to a scan rate of about 5,000 mV/s to about 20,000 mV/s. In some embodiments, the array of supercapacitors maintains the capacitance at a charge-discharge rate corresponding to a scan rate of at least about 5,000 mV/s. In some embodiments, the array of supercapacitors maintains the capacitance at a charge-discharge rate corresponding to a scan rate of about 5,000 mV/s to about 6,250 mV/s, about 5,000 mV/s to about 7,500 mV/s, about 5,000 mV/s to about 10,000 mV/s, about 5,000 mV/s to about 11,250 mV/s, about 5,000 mV/s to about 12,500 mV/s, about 5,000 mV/s to about 15,000 mV/s, about 5,000 mV/s to about 16,250 mV/s, about 5,000 mV/s to about 17,500 mV/s, about 5,000 mV/s to about 20,000 mV/s, about 6,250 mV/s to about 7,500 mV/s, about 6,250 mV/s to about 10,000 mV/s, about 6,250 mV/s to about 11,250 mV/s, about 6,250 mV/s to about 12,500 mV/s, about 6,250 mV/s to about 15,000 mV/s, about 6,250 mV/s to about 16,250 mV/s, about 6,250 mV/s to about 17,500 mV/s, about 6,250 mV/s to about 20,000 mV/s, about 7,500 mV/s to about 10,000 mV/s, about 7,500 mV/s to about 11,250 mV/s, about 7,500 mV/s to about 12,500 mV/s, about 7,500 mV/s to about 15,000 mV/s, about 7,500 mV/s to about 16,250 mV/s, about 7,500 mV/s to about 17,500 mV/s, about 7,500 mV/s to about 20,000 mV/s, about 10,000 mV/s to about 11,250 mV/s, about 10,000 mV/s to about 12,500 mV/s, about 10,000 mV/s to about 15,000 mV/s, about 10,000 mV/s to about 16,250 mV/s, about 10,000 mV/s to about 17,500 mV/s, about 10,000 mV/s to about 20,000 mV/s, about 11,250 mV/s to about 12,500 mV/s, about 11,250 mV/s to about 15,000 mV/s, about 11,250 mV/s to about 16,250 mV/s, about 11,250 mV/s to about 17,500 mV/s, about 11,250 mV/s to about 20,000 mV/s, about 12,500 mV/s to about 15,000 mV/s, about 12,500 mV/s to about 16,250 mV/s, about 12,500 mV/s to about 17,500 mV/s, about 12,500 mV/s to about 20,000 mV/s, about 15,000 mV/s to about 16,250 mV/s, about 15,000 mV/s to about 17,500 mV/s, about 15,000 mV/s to about 20,000 mV/s, about 16,250 mV/s to about 17,500 mV/s, about 16,250 mV/s to about 20,000 mV/s, or about 17,500 mV/s to about 20,000 mV/s.

Some aspects provide a system comprising the supercapacitor, wherein the array of supercapacitor cells is in electrical communication with at least one solar cell, and wherein the at least one solar cell includes a copper indium gallium selenide (CIGS) cell, an organic photovoltaic cell, or a combination thereof.

Another aspect of the present disclosure provides a method for fabricating a supercapacitor comprising forming electrodes comprising laser scribing. In some embodiments, the method comprises forming electrodes comprising Light-Scribe writing on a film, wherein at least one of the electrodes is configured to store charge via one or more non-Faradaic processes, wherein at least one of the electrodes comprises a pseudocapacitive material configured to store charge via one or more Faradaic processes.

In some embodiments, the supercapacitor is capable of outputting a voltage of about 5 V to about 100 V. In some embodiments, the supercapacitor is capable of outputting a voltage of at least about 5 V. In some embodiments, the supercapacitor is capable of outputting a voltage of about 5 V to about 10 V, about 5 V to about 20 V, about 5 V to about 30 V, about 5 V to about 40 V, about 5 V to about 50 V, about 5 V to about 60 V, about 5 V to about 70 V, about 5 V to about 80 V, about 5 V to about 90 V, about 5 V to about 100 V, about 10 V to about 20 V, about 10 V to about 30 V, about 10 V to about 40 V, about 10 V to about 50 V, about 10 V to about 60 V, about 10 V to about 70 V, about 10 V to about 80 V, about 10 V to about 90 V, about 10 V to about 100 V, about 20 V to about 30 V, about 20 V to about 40 V, about 20 V to about 50 V, about 20 V to about 60 V, about 20 V to about 70 V, about 20 V to about 80 V, about 20 V to about 90 V, about 20 V to about 100 V, about 30 V to about 40 V, about 30 V to about 50 V, about 30 V to about 60 V, about 30 V to about 70 V, about 30 V to about 80 V, about 30 V to about 90 V, about 30 V to about 100 V, about 40 V to about 50 V, about 40 V to about 60 V, about 40 V to about 70 V, about 40 V to about 80 V, about 40 V to about 90 V, about 40 V to about 100 V, about 50 V to about 60 V, about 50 V to about 70 V, about 50 V to about 80 V, about 50 V to about 90 V, about 50 V to about 100 V, about 60 V to about 70 V, about 60 V to about 80 V, about 60 V to about 90 V, about 60 V to about 100 V, about 70 V to about 80 V, about 70 V to about 90 V, about 70 V to about 100 V, about 80 V to about 90 V, about 80 V to about 100 V, or about 90 V to about 100 V.

In some embodiments, the method further comprises selectively electrodepositing the pseudocapacitive material on at least one of the electrodes. In some embodiments, the method further comprises forming the electrodes by laser scribing graphite oxide films. In some embodiments, the method further comprises forming a porous interconnected corrugated carbon-based network (ICCN), wherein the porous ICCN comprises a plurality of carbon layers that are interconnected and expanded apart from one another to form a plurality of pores. In some embodiments, the method further comprises electrodepositing metallic nanoparticles within the plurality of pores. In some embodiments, the method further comprises forming the electrodes in an interdigitated pattern. In some embodiments, the pseudocapacitive material comprises MnO$_2$ nanoflowers. In some embodiments, a supercapacitor cell comprises (i) a first electrode comprising an ICCN and the pseudocapacitive material and (ii) a second electrode comprising the ICCN, thereby forming a supercapacitor cell with asymmetric electrodes. In some embodiments, a supercapacitor cell comprises (i) a first electrode comprising an ICCN and the pseudocapacitive material and (ii) a second electrode comprising the ICCN and the pseudocapacitive material, thereby forming a supercapacitor cell with symmetric electrodes. In some embodiments, the method further comprises directly fabricating an array of separate supercapacitor cells in the same plane and in one step.

In some embodiments, a method for fabricating an electrochemical system, comprises: forming a carbonaceous film; forming a carbonaceous framework from the carbonaceous film; patterning the carbonaceous framework to form a planar array of two or more cells, wherein each cell comprises at least two electrodes, and electrodepositing a pseudocapacitive material onto a portion of the planar array. In some embodiments, the carbonaceous film comprises graphene oxide (GO). In some embodiments, the carbonaceous film comprises a three dimensional carbon framework comprising an interconnected corrugated carbon-based network (ICCN), a laser scribed graphene (LSG), or any combination thereof. In some embodiments, the forming of the carbonaceous framework from the carbonaceous film comprises light scribing. In some embodiments, the patterning the carbonaceous framework comprises light scribing. In some embodiments, the patterning the carbonaceous framework forms two or more interdigitated electrodes. In some embodiments, the array is a planar array. In some embodiments, the pseudocapacitive material comprises $MnO_2$, $RuO_2$, $Co_3O_4$, NiO, $Fe_2O_3$, CuO, $MoO_3$, $V_2O_5$, $Ni(OH)_2$, or any combination thereof. Some embodiments further comprise depositing an electrolyte on the carbonaceous framework. Some embodiments further comprise connecting the two or more cells.

In some embodiments, the laser scribing is performed by a LightScribe DVD labeler through direct writing. In some embodiments, the light scribing is performed by a light beam whose frequency is about $1\times10^8$ MHz to about $18\times10^8$ MHz.

In some embodiments, the light scribing is performed by a light beam whose wavelength is about 350 nanometers (nm) to about 1,450 nanometers. In some embodiments, the light scribing is performed by a light whose wavelength is at least about 350 nanometers. In some embodiments, the light scribing is performed by a light whose wavelength is at most about 1,450 nanometers. In some embodiments, the light scribing is performed by a light whose wavelength is about 350 nanometers to about 450 nanometers, about 350 nanometers to about 550 nanometers, about 350 nanometers to about 650 nanometers, about 350 nanometers to about 750 nanometers, about 350 nanometers to about 850 nanometers, about 350 nanometers to about 950 nanometers, about 350 nanometers to about 1,050 nanometers, about 350 nanometers to about 1,150 nanometers, about 350 nanometers to about 1,250 nanometers, about 350 nanometers to about 1,350 nanometers, about 350 nanometers to about 1,450 nanometers, about 450 nanometers to about 550 nanometers, about 450 nanometers to about 650 nanometers, about 450 nanometers to about 750 nanometers, about 450 nanometers to about 850 nanometers, about 450 nanometers to about 950 nanometers, about 450 nanometers to about 1,050 nanometers, about 450 nanometers to about 1,150 nanometers, about 450 nanometers to about 1,250 nanometers, about 450 nanometers to about 1,350 nanometers, about 450 nanometers to about 1,450 nanometers, about 550 nanometers to about 650 nanometers, about 550 nanometers to about 750 nanometers, about 550 nanometers to about 850 nanometers, about 550 nanometers to about 950 nanometers, about 550 nanometers to about 1,050 nanometers, about 550 nanometers to about 1,150 nanometers, about 550 nanometers to about 1,250 nanometers, about 550 nanometers to about 1,350 nanometers, about 550 nanometers to about 1,450 nanometers, about 650 nanometers to about 750 nanometers, about 650 nanometers to about 850 nanometers, about 650 nanometers to about 950 nanometers, about 650 nanometers to about 1,050 nanometers, about 650 nanometers to about 1,150 nanometers, about 650 nanometers to about 1,250 nanometers, about 650 nanometers to about 1,350 nanometers, about 650 nanometers to about 1,450 nanometers, about 750 nanometers to about 850 nanometers, about 750 nanometers to about 950 nanometers, about 750 nanometers to about 1,050 nanometers, about 750 nanometers to about 1,150 nanometers, about 750 nanometers to about 1,250 nanometers, about 750 nanometers to about 1,350 nanometers, about 750 nanometers to about 1,450 nanometers, about 850 nanometers to about 950 nanometers, about 850 nanometers to about 1,050 nanometers, about 850 nanometers to about 1,150 nanometers, about 850 nanometers to about 1,250 nanometers, about 850 nanometers to about 1,350 nanometers, about 850 nanometers to about 1,450 nanometers, about 950 nanometers to about 1,050 nanometers, about 950 nanometers to about 1,150 nanometers, about 950 nanometers to about 1,250 nanometers, about 950 nanometers to about 1,350 nanometers, about 950 nanometers to about 1,450 nanometers, about 1,050 nanometers to about 1,150 nanometers, about 1,050 nanometers to about 1,250 nanometers, about 1,050 nanometers to about 1,350 nanometers, about 1,050 nanometers to about 1,450 nanometers, about 1,150 nanometers to about 1,250 nanometers, about 1,150 nanometers to about 1,350 nanometers, about 1,150 nanometers to about 1,450 nanometers, about 1,250 nanometers to about 1,350 nanometers, about 1,250 nanometers to about 1,450 nanometers, or about 1,350 nanometers to about 1,450 nanometers.

In some embodiments, the light scribing is performed by a light beam whose power is about 20 milliwatts (mW) to about 80 mW. In some embodiments, the light scribing is performed by a light whose power is at least about 20 mW. In some embodiments, the light scribing is performed by a light whose power is at most about 80 mW. In some embodiments, the light scribing is performed by a light whose power is about 20 mW to about 30 mW, about 20 mW to about 40 mW, about 20 mW to about 50 mW, about 20 mW to about 60 mW, about 20 mW to about 70 mW, about 20 mW to about 80 mW, about 30 mW to about 40 mW, about 30 mW to about 50 mW, about 30 mW to about 60 mW, about 30 mW to about 70 mW, about 30 mW to about 80 mW, about 40 mW to about 50 mW, about 40 mW to about 60 mW, about 40 mW to about 70 mW, about 40 mW to about 80 mW, about 50 mW to about 60 mW, about 50 mW to about 70 mW, about 50 mW to about 80 mW, about 60 mW to about 70 mW, about 60 mW to about 80 mW, or about 70 mW to about 80 mW.

In some embodiments, the supercapacitor is a three-dimensional hybrid microsupercapacitor. In some embodiments, the supercapacitor comprises three-dimensional interdigitated microsupercapacitors. In some embodiments, the supercapacitor comprises asymmetric microsupercapacitors. In some embodiments, the method further comprises forming a plurality of interdigitated electrodes into an array of microsupercapacitors. In some embodiments, the method further comprises integrating the array of microsupercapacitors with one or more solar cells.

In some embodiments, the one or more solar cells include a copper indium gallium selenide (CIGS) cell. In some embodiments, the one or more solar cells include an organic photovoltaic cell. In some embodiments, the plurality of interdigitated electrodes is configured to store charge via one or more non-Faradaic processes.

In some embodiments, the supercapacitor has a capacitance per footprint that is at least about 2 times greater than a commercial carbon supercapacitor. In some embodiments, the supercapacitor has a capacitance per footprint of about 0.3 $F/cm^2$ to about 0.8 $F/cm^2$. In some embodiments, the supercapacitor has a capacitance per footprint of at least about 0.3 $F/cm^2$. In some embodiments, the supercapacitor has a capacitance per footprint of about 0.3 $F/cm^2$ to about 0.4 $F/cm^2$, about 0.3 $F/cm^2$ to about 0.5 $F/cm^2$, about 0.3 $F/cm^2$ to about 0.6 $F/cm^2$, about 0.3 $F/cm^2$ to about 0.7 $F/cm^2$, about 0.3 $F/cm^2$ to about 0.8 $F/cm^2$, about 0.4 $F/cm^2$ to about 0.5 F/cm², about 0.4 F/cm² to about 0.6 F/cm², about 0.4 F/cm² to about 0.7 F/cm², about 0.4 F/cm² to about 0.8 F/cm², about 0.5 F/cm² to about 0.6 F/cm², about 0.5 F/cm² to about 0.7 F/cm², about 0.5 F/cm² to about 0.8 F/cm², about 0.6 F/cm² to about 0.7 F/cm², about 0.6 F/cm² to about 0.8 F/cm², or about 0.7 F/cm² to about 0.8 F/cm².

In some embodiments, at least one of the electrodes is a hybrid electrode that comprises the pseudocapacitive material and is configured to store charge via the one or more non-Faradaic processes.

In some embodiments, the hybrid electrode has a volumetric capacitance of about 500 F/cm³ to about 2,000 F/cm³. In some embodiments, the hybrid electrode has a volumetric capacitance of at least about 500 F/cm³. In some embodiments, the hybrid electrode has a volumetric capacitance of about 500 F/cm³ to about 625 F/cm³, about 500 F/cm³ to about 750 F/cm³, about 500 F/cm³ to about 1,000 F/cm³, about 500 F/cm³ to about 1,125 F/cm³, about 500 F/cm³ to about 1,250 F/cm³, about 500 F/cm³ to about 1,500 F/cm³, about 500 F/cm³ to about 1,625 F/cm³, about 500 F/cm³ to about 1,750 F/cm³, about 500 F/cm³ to about 2,000 F/cm³, about 625 F/cm³ to about 750 F/cm³, about 625 F/cm³ to about 1,000 F/cm³, about 625 F/cm³ to about 1,125 F/cm³, about 625 F/cm³ to about 1,250 F/cm³, about 625 F/cm³ to about 1,500 F/cm³, about 625 F/cm³ to about 1,625 F/cm³, about 625 F/cm³ to about 1,750 F/cm³, about 625 F/cm³ to about 2,000 F/cm³, about 750 F/cm³ to about 1,000 F/cm³, about 750 F/cm³ to about 1,125 F/cm³, about 750 F/cm³ to about 1,250 F/cm³, about 750 F/cm³ to about 1,500 F/cm³, about 750 F/cm³ to about 1,625 F/cm³, about 750 F/cm³ to about 1,750 F/cm³, about 750 F/cm³ to about 2,000 F/cm³, about 1,000 F/cm³ to about 1,125 F/cm³, about 1,000 F/cm³ to about 1,250 F/cm³, about 1,000 F/cm³ to about 1,500 F/cm³, about 1,000 F/cm³ to about 1,625 F/cm³, about 1,000 F/cm³ to about 1,750 F/cm³, about 1,000 F/cm³ to about 2,000 F/cm³, about 1,125 F/cm³ to about 1,250 F/cm³, about 1,125 F/cm³ to about 1,500 F/cm³, about 1,125 F/cm³ to about 1,625 F/cm³, about 1,125 F/cm³ to about 1,750 F/cm³, about 1,125 F/cm³ to about 2,000 F/cm³, about 1,250 F/cm³ to about 1,500 F/cm³, about 1,250 F/cm³ to about 1,625 F/cm³, about 1,250 F/cm³ to about 1,750 F/cm³, about 1,250 F/cm³ to about 2,000 F/cm³, about 1,500 F/cm³ to about 1,625 F/cm³, about 1,500 F/cm³ to about 1,750 F/cm³, about 1,500 F/cm³ to about 2,000 F/cm³, about 1,625 F/cm³ to about 1,750 F/cm³, about 1,625 F/cm³ to about 2,000 F/cm³, or about 1,750 F/cm³ to about 2,000 F/cm³.

In some embodiments, the supercapacitor is capable of outputting a voltage of about 50 V to about 250 V. In some embodiments, the supercapacitor is capable of outputting a voltage of at least about 50 V. In some embodiments, the supercapacitor is capable of outputting a voltage of about 50 V to about 75 V, about 50 V to about 100 V, about 50 V to about 125 V, about 50 V to about 150 V, about 50 V to about 175 V, about 50 V to about 200 V, about 50 V to about 225 V, about 50 V to about 250 V, about 75 V to about 100 V, about 75 V to about 125 V, about 75 V to about 150 V, about 75 V to about 175 V, about 75 V to about 200 V, about 75 V to about 225 V, about 75 V to about 250 V, about 100 V to about 125 V, about 100 V to about 150 V, about 100 V to about 175 V, about 100 V to about 200 V, about 100 V to about 225 V, about 100 V to about 250 V, about 125 V to about 150 V, about 125 V to about 175 V, about 125 V to about 200 V, about 125 V to about 225 V, about 125 V to about 250 V, about 150 V to about 175 V, about 150 V to about 200 V, about 150 V to about 225 V, about 150 V to about 250 V, about 175 V to about 200 V, about 175 V to about 225 V, about 175 V to about 250 V, about 200 V to about 225 V, about 200 V to about 250 V, or about 225 V to about 250 V.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

FIG. 6D is an exemplary photograph showing the asymmetric microsupercapacitor, in accordance with some embodiments.

FIG. 6E is an exemplary optical microscope image showing the LSG-GO/LSG-MnO$_2$ interface, in accordance with some embodiments.

FIG. 6F is an exemplary SEM image of an interface between GO and LSG showing selective electrodeposition of MnO$_2$ on LSG only and the inset provides a magnified view of the GO and LSG area, in accordance with some embodiments.

DETAILED DESCRIPTION

Figure 1C:
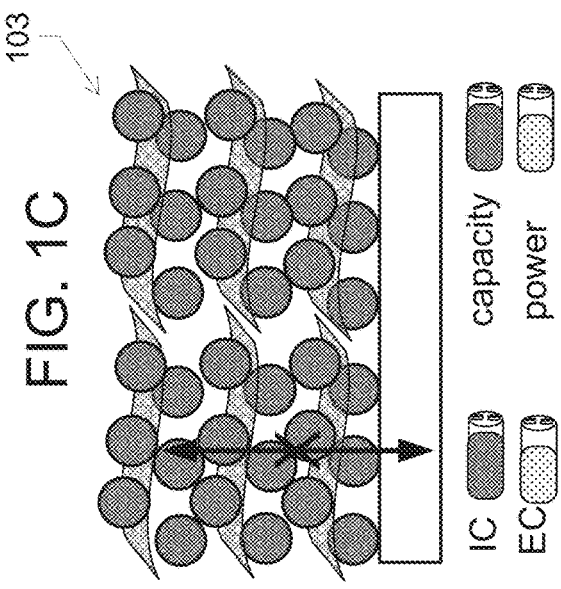
FIG. 1C shows an example of an electrode with conductive materials added to the nanostructured metal oxide, in accordance with some embodiments.

Provided herein are devices comprising one or more cells, and methods for fabrication thereof. The devices may be electrochemical devices. The devices may include three-dimensional supercapacitors. The devices may be microdevices such as, for example, microsupercapacitors. In some embodiments, the devices are three-dimensional hybrid microsupercapacitors. The devices may be configured for high voltage applications (e.g., microdevices for high voltage applications). In some embodiments, the devices are high voltage microsupercapacitors. In certain embodiments, the devices are high voltage asymmetric microsupercapacitors. In some embodiments, the devices are integrated microsupercapacitors for high voltage applications.

The present disclosure provides systems and methods for direct preparation of devices (e.g., high-voltage devices) such as, for example, high-voltage supercapacitors. The high-voltage supercapacitors may include microsupersupercapacitors. The high-voltage devices may be prepared in a single step. The high-voltage devices may be prepared using one package. The high-voltage devices may be prepared in a single step and using one package. One package may advantageously be used instead of a plurality (e.g., instead of hundreds in the traditional modules).

A high-voltage device (e.g., a high-voltage supercapacitor) may have a voltage of greater than or equal to about 5 volts (V), 10 V, 15 V, 20 V, 30 V, 40 V, 50 V, 60 V, 70 V, 80 V, 90 V, 100 V, 110 V, 120 V, 130 V, 140 V, 150 V, 160 V, 170 V, 180 V, 190 V, 200 V, 210 V, 220 V, 230 V, 240 V, 250 V, 260 V, 270 V, 280 V, 290 V, 300 V, 310 V, 320 V, 330 V, 340 V, 350 V, 360 V, 370 V, 380 V, 390 V, 400 V, 410 V, 420 V, 430 V, 440 V, 450 V, 460 V, 470 V, 480 V, 490 V, 500 V, 510 V, 520 V, 530 V, 540 V, 550 V, 560 V, 570 V, 580 V, 590 V, 600 V, 650 V, 700 V, 750 V, 800 V, 850 V, 900 V, 950 V, 1,000 V, 1,050 V, 1,100 V, 1,150 V, 1,200 V, 1,250 V, 1,300 V, 1,350 V, 1,400 V, 1,450 V, or 1,500 V.

A high-voltage device (e.g., high-voltage supercapacitor) may have a voltage of less than about 10 V, 15 V, 20 V, 30 V, 40 V, 50 V, 60 V, 70 V, 80 V, 90 V, 100 V, 110 V, 120 V, 130 V, 140 V, 150 V, 160 V, 170 V, 180 V, 190 V, 200 V, 210 V, 220 V, 230 V, 240 V, 250 V, 260 V, 270 V, 280 V, 290 V, 300 V, 310 V, 320 V, 330 V, 340 V, 350 V, 360 V, 370 V, 380 V, 390 V, 400 V, 410 V, 420 V, 430 V, 440 V, 450 V, 460 V, 470 V, 480 V, 490 V, 500 V, 510 V, 520 V, 530 V, 540 V, 550 V, 560 V, 570 V, 580 V, 590 V, 600 V, 650 V, 700 V, 750 V, 800 V, 850 V, 900 V, 950 V, 1,000 V, 1,050 V, 1,100 V, 1,150 V, 1,200 V, 1,250 V, 1,300 V, 1,350 V, 1,400 V, 1,450 V, or 1,500 V.

In some embodiments, a high-voltage or supercapacitor may have a voltage of at least about 100 V. In some embodiments, a high-voltage device or supercapacitor may have a voltage of at least about 180 V. In some embodiments, a high-voltage device or supercapacitor may have a voltage of less than or equal to about 600 V, 550 V, or 500 V. In some embodiments, a high-voltage device or supercapacitor may have a voltage of from about 100 V to 540 V, from 180 V to 540 V, from 100 V to 200 V, from 100 V to 300 V, from 180 V to 300 V, from 100 V to 400 V, from 180 V to 400 V, from 100 V to 500 V, from 180 V to 500 V, from 100 V to 600 V, from 180 V to 600 V, from 100 V to 700 V, from 180 V to 700 V, from 150 V to 1,000 V, or from 150 V to 1,100 V.

High-voltage devices of the disclosure may comprise interconnected cells. In some embodiments, the cells can be electrochemical cells. In some embodiments, the cells can be individual supercapacitor cells. The cells may be interconnected to achieve a high voltage and/or for other purposes. Any aspects of the disclosure described in relation to a microsupercapacitor may equally apply to a supercapacitor at least in some configurations, and vice versa. In some embodiments, the supercapacitor cells may be microsupercapacitor cells. A cell may comprise symmetric or asymmetric electrodes.

A plurality of cells may be interconnected to form supercapacitors and/or other devices. In some embodiments, the devices can be batteries and/or various types of capacitors. In some embodiments, at least about 2, 5, 10, 20, 30, 40, 50, 75, 100, 125, 150, 200, 250, 300, 350, 400, 500, 600, 700, 800, 900, 1000, 1500, 2000, or more cells may be interconnected. In some embodiments, between about 50 and 300 cells may be interconnected. In some embodiment, the cells are connected in series. In some embodiments, the cells are connected in parallel. In some embodiments, the cells are connected in series and in parallel.

A supercapacitor may operate using one or more charge storage mechanisms. In some embodiments, the supercapacitor may operate using pseudocapacitor charge storage mechanisms. In some embodiments, the supercapacitor may operate using electric double-layer capacitor (EDLC) charge storage mechanisms. In some embodiments, the supercapacitor may operate using a combination of pseudocapacitor and electric double-layer capacitor (EDLC) charge storage mechanisms. In some embodiments, charge may be stored with the aid of both Faradaic and non-Faradaic processes. Such a supercapacitor may be referred to as a hybrid supercapacitor. In some embodiments, hybrid charge storage mechanism(s) occur at a single electrode. In some embodiments, hybrid charge storage mechanism(s) occur at a both electrodes. Hybrid supercapacitors may comprise symmetric or asymmetric electrodes.

A cell may comprise an electrolyte. In some embodiments, the cell is a supercapacitor cell. Electrolytes may include aqueous electrolytes, organic electrolytes, ionic liquid-based electrolytes, or any combination thereof. In some embodiments, the electrolyte may be liquid, solid, and/or a gel. In some embodiments, an ionic liquid may be hybridized with another solid component to form a gel-like electrolyte (also "ionogel" herein). The solid component may be a polymer. The solid component may be silica. In some embodiments, the solid component can be fumed silica. An aqueous electrolyte may be hybridized with a polymer to form a gel-like electrolyte (also "hydrogel" and "hydrogel-polymer" herein). An organic electrolyte may be hybridized with a polymer to form a gel-like electrolyte.

Electrolytes may comprise aqueous potassium hydroxide; hydrogel comprising poly(vinyl alcohol) (PVA)-$H_2SO_4$ or PVA-$H_3PO_4$; aqueous electrolyte of phosphoric acid ($H_3PO_4$); tetraethyl ammonium tetrafluoroborate ($TEABF_4$) dissolved in acetonitrile, 1-ethyl-3-methylimidazoliumtetrafluoroborate ($EMIMBF_4$; ionogel comprising fumed silica (e.g., fumed silica nano-powder) mixed with an ionic liquid (e.g., 1-butyl-3-methylimidazolium bis(trifluoromethylsulfonyl)imide ($BMIMNTf_2$)); and the like. Such electrolytes may provide a range of voltage windows, including at least about 0.5 V, 1 V, 2 V, 3 V, 4 V, or more. In some embodiments, the ionogel comprising fumed silica nano-powder with the ionic liquid $BMIMNTf_2$ may provide a voltage window of about 2.5 V. In some embodiments, hydrogel-polymer electrolytes may provide a voltage window of about 1 V. In some embodiments, a cell comprises an aqueous electrolyte.

The active material in the electrodes may comprise carbonaceous materials, one or more metal oxides, and/or other suitable materials. In some embodiments, the active material in the electrodes can be carbon. In some embodiments, the carbon can comprise activated carbon, graphene, interconnected corrugated carbon-based network (ICCN), or any combination thereof. The active material in the electrodes may comprise a highly conductive and high surface area laser-scribed graphene (LSG) framework that is a form of interconnected corrugated carbon-based network (ICCN). The ICCN may be produced from light scribing (e.g., laser scribing) of carbon-based films such as graphite oxide (GO). Any aspects of the disclosure described in relation to graphene (in the context of light scribed or three-dimensional materials) or LSG may equally apply to ICCN at least in some configurations, and vice versa.

An ICCN may comprise a plurality of expanded and interconnected carbon layers. For the purpose of this disclosure, in certain embodiments, the term "expanded," referring to a plurality of carbon layers that are expanded apart from one another, means that a portion of adjacent ones of the carbon layers are separated by at least about 2 nanometers (nm). In some embodiments, at least a portion of adjacent carbon layers are separated by greater than or equal to about 2 nm, 3 nm, 4 nm, 5 nm, 6 nm, 7 nm, 8 nm, 9 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, or 100 nm. In some embodiments, at least a portion of adjacent carbon layers are separated by less than about 3 nm, 4 nm, 5 nm, 6 nm, 7 nm, 8 nm 9 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, or 100 nm. In some embodiments, at least a portion of adjacent carbon layers are separated by between about 2 nm and 10 nm, 2 nm and 25 nm, 2 nm and 50 nm, or 2 nm and 100 nm. In some embodiments, each of the plurality of carbon layers is a two-dimensional material with only one carbon atom of thickness. In some embodiments, each of the expanded and interconnected carbon layers may comprise at least one, or a plurality of corrugated carbon sheets that are each one atom thick. In another embodiment, each of the expanded and interconnected carbon layers comprises a plurality of corrugated carbon sheets. The thickness of the ICCN, as measured from cross-sectional scanning electron microscopy (SEM) and profilometry, can be found to be around about 7.6 micrometer in one embodiment. In another embodiment, a range of thicknesses of the plurality of expanded and interconnected carbon layers making up the ICCN is from about 7 micrometer to 8 micrometer.

An ICCN may have a combination of properties that include, for example, high surface area and high electrical conductivity in an expanded interconnected network of carbon layers. In some embodiments, the plurality of expanded and interconnected carbon layers has a surface area of greater than or equal to about 500 square meters per gram ($m^2/g$), 1000 $m^2/g$, 1400 $m^2/g$, 1500 $m^2/g$, 1520 $m^2/g$, 1750 $m^2/g$ or 2000 $m^2/g$. In some embodiments, the plurality of expanded and interconnected carbon layers has a surface area of between about 100 $m^2/g$ and 1500 $m^2/g$, 500 $m^2/g$ and 2000 $m^2/g$, 1000 $m^2/g$ and 2500 $m^2/g$, or 1500 $m^2/g$ and 2000 $m^2/g$. The plurality of expanded and interconnected carbon layers may have such surface areas in combination with one or more electrical conductivities (e.g., one or more electrical conductivities provided herein).

In some embodiments, the electrical conductivity of the plurality of expanded and interconnected carbon layers is at least about 0.1 S/m, or at least about 0.5 S/m, or at least about 1 S/m, or at least about 5 S/m, or at least about 10 S/m, or at least about 15 S/m, or at least about 25 S/m, or at least about 50 S/m, or at least about 100 S/m, or at least about 200 S/m, or at least about 300 S/m, or at least about 400 S/m, or at least about 500 S/m, or at least about 600 S/m, or at least about 700 S/m, or at least about 800 S/m, or at least about 900 S/m, or at least about 1,000 S/m, or at least about 1,100 S/m, or at least about 1,200 S/m, or at least about 1,300 S/m, or at least about 1,400 S/m, or at least about 1,500 S/m, or at least about 1,600 S/m, or at least about 1,700 S/m. In one embodiment, the plurality of expanded and interconnected carbon layers yields an electrical conductivity that is at least about 1700 S/m and a surface area that is at least about 1500 $m^2/g$. In another embodiment, the plurality of expanded and interconnected carbon layers yields an electrical conductivity of about 1650 S/m and a surface area of about 1520 $m^2/g$.

An ICCN may possess a very low oxygen content of only about 3.5%, which contributes to a relatively very high charging rate. In other embodiments, the oxygen content of the expanded and interconnected carbon layers ranges from about 1% to about 5%.

The active material in the electrodes may comprise a porous ICCN composite that includes metallic nanoparticles disposed within the plurality of pores of the ICCN. In some embodiments, the active material comprises graphene LSG/metal oxide nanocomposite). In some embodiments, the metallic nanoparticles may be disposed within the plurality of pores through electrodeposition or any other suitable technique. The metallic nanoparticles may have shapes that include, but are not limited to, nanoflower shapes, flake shapes, and combinations thereof. The metallic nanoparticles may comprise one or more metals, metal oxides, metal hydroxides, or any combination thereof. In some embodiments, the metallic nanoparticles may be metal particles, metal oxide particles, or any combination thereof. In some embodiments, the metallic nanoparticles may comprise an oxide or hydroxide of manganese, ruthenium, cobalt, nickel, iron, copper, molybdenum, vanadium, nickel, or a combination of one or more thereof. In some embodiments, the metallic nanoparticles may comprise (e.g., comprise (or be) particles of) platinum (Pt), palladium (Pd), silver (Ag), gold (Au), or any combination thereof. In some embodiments, the metallic nanoparticles may be metal particles that include, but are not limited to, Pt, Pd, Ag, Au, and combinations thereof. In some embodiments, the metallic nanoparticles comprise $MnO_2$, $RuO_2$, $Co_3O_4$, NiO, $Fe_2O_3$, CuO, $MoO_3$, $V_2O_5$, $Ni(OH)_2$, or any combination thereof.

In some embodiments, a porous ICCN composite may be produced by providing a film comprising a mixture of a metallic precursor and a carbon-based oxide and exposing at least a portion of the film to light to form a porous interconnected corrugated carbon-based network (ICCN) composite. The porous ICCN composite may comprise a plurality of carbon layers that are interconnected and expanded apart from one another to form a plurality of pores, and metallic nanoparticles disposed within the plurality of pores. The light may convert the metallic precursor to the metallic nanoparticles. Providing the film made of the mixture of the metallic precursor and the carbon-based oxide may comprise providing a solution comprising a liquid, the metallic precursor, and the carbon-based oxide; disposing the solution with the liquid, the metallic precursor, and the carbon-based oxide onto a substrate; and evaporating the liquid from the solution to form the film. The carbon-based oxide may be graphite oxide. The metallic nanoparticles may be, for example, particles of $RuO_2$, $Co_3O_4$, NiO, $V_2O_5$, $Fe_2O_3$, CuO, $MoO_3$, or any combination thereof.

In some embodiments, a porous ICCN composite may be produced wherein a percentage of surface area coverage of the metallic nanoparticles onto the plurality of carbon layers ranges from about 10% to about 95%. In some embodiments, the percentage of surface area coverage of the metallic nanoparticles onto the plurality of carbon layers is at least about 15%, at least about 20%, at least about 25%, at least about 30%, at least about 35%, at least about 40%, at least about 45%, at least about 50%, at least about 60%, at least about 70%, at least about 80%, at least about 90%, or at least about 95%.

In some embodiments, a porous ICCN composite may be produced wherein the porous ICCN composite provides an energy density that ranges from about 2 Watt-hour/liter to about 41 Watt-hour/liter. In certain embodiments, the porous ICCN composite provides an energy density that is at least about 2 Watt-hour/liter, at least about 5 Watt-hour/liter, at least about 10 Watt-hour/liter, at least about 15 Watt-hour/liter, at least about 20 Watt-hour/liter, at least about 25 Watt-hour/liter, at least about 30 Watt-hour/liter, at least about 35 Watt-hour/liter, or at least about 40 Watt-hour/liter.

Methods of producing porous ICCN composite are provided herein. For example, in one embodiment, the method comprises: providing a film comprising a mixture of a metallic precursor and a carbon-based oxide; and exposing at least a portion of the film to light to form a porous interconnected corrugated carbon-based network (ICCN) composite comprising: a plurality of carbon layers that are interconnected and expanded apart from one another to form a plurality of pores; and metallic nanoparticles disposed within the plurality of pores, wherein the light converts the metallic precursor to the metallic nanoparticles. In further or additional embodiments, a method of producing porous ICCN composite is provided wherein providing the film made of the mixture of the metallic precursor and the carbon-based oxide comprises: providing a solution comprising a liquid, the metallic precursor, and the carbon-based oxide; disposing the solution with the liquid, the metallic precursor, and the carbon-based oxide onto a substrate; and evaporating the liquid from the solution to form the film. In one embodiment, a method of producing porous interconnected corrugated carbon-based network (ICCN) composite is provided comprising: forming a porous ICCN comprising a plurality of carbon layers that are interconnected and expanded apart from one another to form a plurality of pores; and electrodepositing metallic nanoparticles within the plurality of pores. In another embodiment, the method comprises providing a film made of the mixture of the metallic precursor and the carbon-based oxide that comprises: providing a solution comprising a liquid, the metallic precursor, and the carbon-based oxide; disposing the solution with the liquid, the metallic precursor, and the carbon-based oxide onto a substrate; and evaporating the liquid from the solution to form the film. In certain applications, the carbon-based oxide is graphite oxide. The metallic nanoparticles may be particles of $MnO_2$, $RuO_2$, $Co_3O_4$, NiO, $V_2O_5$, $Fe_2O_3$, CuO, $MoO_3$, $Ni(OH)_2$, or any combination thereof.

In another aspect, methods for electrodepositing the metallic nanoparticles within the plurality of pores comprise: submerging the porous ICCN into an aqueous solution having a metal precursor; and applying an electrical current through the porous ICCN to electrodeposit the metallic nanoparticles into the plurality of pores. In some embodiments, the electrical current has a current density of at least about 250 $mA/cm^2$. In some embodiments, the electrical current has a current density of at least about 350 $mA/cm^2$, at least about 450 $mA/cm^2$, at least about 550 $mA/cm^2$, at least at least about 650 $mA/cm^2$, at least about 750 $mA/cm^2$, or at least about 1,000 $mA/cm^2$.

The porous ICCN or ICCN composite may be formed by exposing the carbon-based oxide to light from a light source. The light source may comprise a laser, a flash lamp, or other equally high intensity sources of light capable of reducing the carbon-based oxide to the porous ICCN. Any aspects of the disclosure described in relation to laser-scribed materials may equally apply to light-scribed materials at least in some configurations, and vice versa.

Devices herein, including supercapacitors and/or microsupercapacitors, may be configured in different structures. In some embodiments, the devices may be configured in stacked structures, planar structures, spirally wound structures, or any combination thereof. In some embodiments, the devices may be configured to comprising stacked electrodes. In some embodiments, the devices may be configured to comprise interdigitated electrodes. In some embodiments, the devices may be configured in a sandwich structure or an interdigitated structure.

Supercapacitors

Supercapacitors may be classified according to their charge storage mechanism as either electric double-layer capacitors (EDLCs) or pseudocapacitors. In EDLCs, charge can be stored through rapid adsorption-desorption of electrolyte ions on high-surface-area carbon materials. Pseudocapacitors can store charge via fast and reversible Faradaic reactions near the surface of metal oxides or conducting polymers. In some embodiments, the supercapacitors comprise symmetric EDLCs with activated carbon electrodes and organic electrolytes that can provide cell voltages as high as 2.7 V. Although these EDLCs can exhibit high power density and excellent cycle life, they can suffer from low energy density because of the limited capacitance of carbon-based electrodes. Faradaic electrodes can have a specific pseudocapacitance (e.g., 300-1,000 F/g) that exceeds that of carbon-based EDLCs; however, their performance can degrade quickly upon cycling.

Hybrid systems may be used as an alternative to EDLCs and pseudocapacitors. Using both Faradaic and non-Faradaic processes to store charge, hybrid capacitors can achieve energy and power densities greater than EDLCs without sacrificing cycling stability and affordability that limits pseudocapacitors. Hybrid supercapacitors may comprise $RuO_2$, $Co_3O_4$, $NiO$, $V_2O_5$, $Ni(OH)_2$, $MnO_2$, or any combination thereof. $MnO_2$-based systems may be attractive, as $MnO_2$ is an earth-abundant and environmentally friendly material with a theoretical specific capacitance (e.g., a high theoretical specific capacitance) of 1,380 farads per gram (F/g); however, poor ionic ($10^{-13}$ S/cm) and electronic ($10^{-5}$-$10^{-6}$ S/cm) conductivity of pristine $MnO_2$ can limit its electrochemical performance.

In some embodiments, ultrathin $MnO_2$ films that are a few tens of nanometers in thickness may be used. However, thickness and area-normalized capacitance of these electrodes may not be adequate for most applications.

In some embodiments, nanostructured manganese dioxide ($MnO_2$) may be incorporated on highly conductive support materials with high surface areas such as nickel nanocones, Mn nanotubes, activated carbon, carbon fabric, conducting polymers, carbon nanotubes or graphene. Specific capacitances of 148-410 F/g may be achieved under slow charge-discharge rates but may decrease rapidly as the discharge rate is increased. Further, these materials may have low packing density with large pore volume, meaning that a huge amount of electrolyte is needed to build the device, which adds to the mass of the device without adding any capacitance. The energy density and power density on the device level may be very limited.

In some embodiments, hybrid electrodes based on 3D ICCN doped with $MnO_2$ nanoflowers may be used. The structure of the ICCN substrate may be configured (e.g., rationally designed) to achieve high conductivity, suitable porosity, and/or high specific surface area. Such properties may result in not only a high gravimetric capacitance, but also improved volumetric capacitance. Furthermore, the high surface area of nanostructured $MnO_2$ can provide more active sites for Faradaic reactions and shorten ion diffusion pathways that are crucial for realizing its full pseudocapacitance. Hybrid supercapacitors based on these materials can achieve energy densities of, for example, up to about 42 Wh/L compared with about 7 Wh/L for state-of-the-art commercially available carbon-based supercapacitors. These ICCN-$MnO_2$ hybrid supercapacitors may use aqueous electrolytes and may be assembled in air without the need for the expensive dry rooms required for building today's supercapacitors.

Reference will now be made to the figures. It will be appreciated that the figures and features therein are not necessarily drawn to scale.

Three-Dimensional (3D) Hybrid Supercapacitors and Microsupercapacitors

The present disclosure provides methods for engineering three-dimensional (3D) hybrid supercapacitors and microsupercapacitors. Such devices may be configured (e.g., engineered) for high-performance energy storage. In some embodiments, such devices are configured (e.g., engineered) for high-performance integrated energy storage. The 3D high-performance hybrid supercapacitors and microsupercapacitors may be based, for example, on ICCN and $MnO_2$. The 3D high-performance hybrid supercapacitors and microsupercapacitors may be configured by rationally designing the electrode microstructure and combining active materials with electrolytes that operate at high voltages. In some examples, this results in hybrid electrodes with a volumetric capacitance (e.g., an ultrahigh volumetric capacitance) of at least about 1,100 $F/cm^3$, corresponding to a specific capacitance of the constituent $MnO_2$ of about 1,145 F/g, which is close to the theoretical value of 1,380 F/g. Energy density of the full device can vary, for example, between about 22 Wh/L and 42 Wh/L depending on the device configuration. In certain embodiments, such energy densities can be superior to (e.g., higher than) those of commercially available double-layer supercapacitors, pseudocapacitors, lithium-ion capacitors, and/or hybrid supercapacitors (e.g., commercially available hybrid supercapacitors comprising NiOOH positive electrode and activated carbon negative electrode, or $PbO_2$ positive electrode and activated carbon negative electrode) tested under the same conditions and/or comparable to that of lead acid batteries. These hybrid supercapacitors may use aqueous electrolytes and may be assembled in air without the need for expensive dry rooms required for building today's supercapacitors.

In some examples, specific capacitance of the constituent metal or metal oxide (e.g., $MnO_2$) may be at least about 50%, 60%, 70%, 75%, 80%, 81%, 82%, 83%, 84%, 85%, 86%, 87%, 88%, 89%, 90%, 91%, 92%, 93%, 94%, 95%, 96%, 97%, 98%, or 99% of the theoretical capacitance of the constituent metal or metal oxide (e.g., $MnO_2$). The electrode(s) may have such specific capacitance at a given mass loading of the constituent metal or metal oxide (e.g., $MnO_2$).

The electrode(s) may have a mass loading of the constituent metal or metal oxide (e.g., $MnO_2$) of at least about 5%, 10%, 13%, 15%, 20%, 25%, 30%, 35%, 40%, 45%, 50%, 55%, 60%, 65%, 70%, 75%, 80%, 85%, 90%, 95%, or 99%. The electrode(s) may have a mass loading of the constituent metal or metal oxide (e.g., $MnO_2$) of less than or equal to about 5%, 10%, 13%, 15%, 20%, 25%, 30%, 35%, 40%, 45%, 50%, 55%, 60%, 65%, 70%, 75%, 80%, 85%, 90%, 95%, or 99%. The electrode(s) may have a mass loading of the constituent metal or metal oxide (e.g., $MnO_2$) of about 10% to about 20%, from about 10% to about 50%, from about 10% to about 75%, or from about 10% to about 90%.

In some examples, a supercapacitor and/or microsupercapacitor herein can have a capacitance per footprint (also "areal capacitance" herein) of greater than or equal to about 0.3 $F/cm^2$, 0.4 $F/cm^2$, 0.5 $F/cm^2$, 0.6 $F/cm^2$, 0.7 $F/cm^2$, or 0.8 $F/cm^2$ (e.g., see TABLES 1-2). In some examples, a supercapacitor and/or microsupercapacitor herein can have a capacitance per footprint between about 0.3 $F/cm^2$ and 0.8 $F/cm^2$, 0.4 $F/cm^2$ and 0.8 $F/cm^2$, 0.5 $F/cm^2$ and 0.8 $F/cm^2$, 0.6 $F/cm^2$ and 0.8 $F/cm^2$, or 0.7 $F/cm^2$ and 0.8 $F/cm^2$. In some examples, a supercapacitor and/or microsupercapacitor herein can have a capacitance per footprint at least about 2, 3, 4, 5, 6, 7, 8, 9, or 10 times greater than a commercial carbon supercapacitor. In some examples, a hybrid electrode herein can have a volumetric capacitance of greater than or equal to about 50 $F/cm^3$, 100 $F/cm^3$, 150 $F/cm^3$, 200 $F/cm^3$, 400 $F/cm^3$, 600 $F/cm^3$, 800 $F/cm^3$, 1,000 $F/cm^3$, 1,100 $F/cm^3$, 1,200 $F/cm^3$, 1,300 $F/cm^3$, 1,400 $F/cm^3$, or 1,500 $F/cm^3$ (e.g., when calculated based on the volume of the active material per electrode only).

In designing supercapacitor electrodes, special efforts can be made to ensure that they are capable of providing high energy density and high power density. This may require optimization of the preparation conditions to facilitate ionic and electronic transport within the electrodes as illustrated in FIGS. 1A-D. Rationally designing high-performance hybrid supercapacitors can include rationally designing high-energy-high-power hybrid supercapacitor electrodes.

FIGS. 1A-D schematically illustrate rational design of high-energy-high-power hybrid supercapacitor electrodes. The method can include improving ionic current (IC) and electronic current (EC) within the electrode (e.g., improving the IC and the EC can be key). To achieve high-energy and high-power supercapacitors, both the ionic and electronic currents within the electrodes may need to be facilitated. This can be very challenging (e.g., with metal oxide pseudocapacitors) because of low electrical conductivity and long ionic diffusion pathways of some metal oxide films.

Figure 1B:
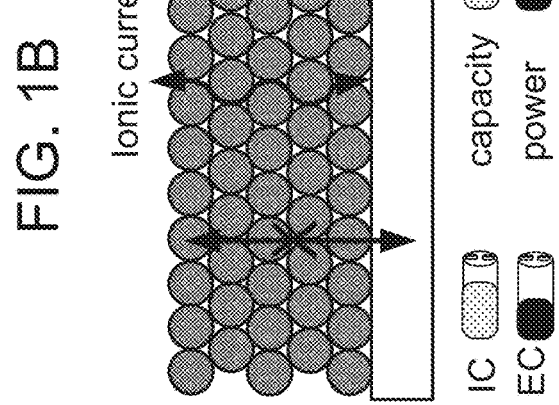
FIG. 1B shows an example of an electrode comprising a nanostructured metal oxide films, in accordance with some embodiments.
Figure 1A:
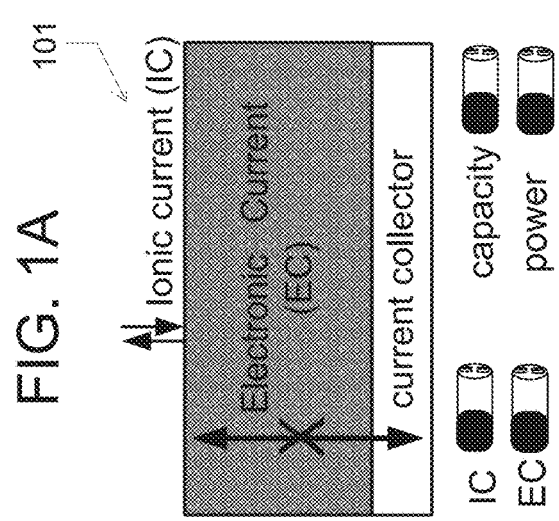
FIG. 1A shows an example of an electrode comprising a compact thick film of metal oxide, in accordance with some embodiments.

As illustrated in FIG. 1A, in a compact $MnO_2$ thick film electrode 101, only the top layer may be exposed to the electrolyte such that a limited amount of the active material is involved in charge storage.

Electrochemical utilization of electrodes can be improved by using nanostructured $MnO_2$ such as nanoparticles, nanorods, nanowires, and nanoflowers. As shown in FIG. 1B, the porous structure of a porous electrode 102 can increase or maximize the area of active material that is exposed to the electrolyte and thus available to discharge compared to a solid electrode surface. Although this system can exhibit higher energy density than the system in FIG. 1A, it can still suffer from the inherently low electrical conductivity of $MnO_2$ leading to low power output.

To improve the electrical conductivity of $MnO_2$ film, conductive materials such as carbon powder, carbon nanotubes, and graphene can be introduced into nanostructured $MnO_2$ electrodes 103. In such instances, the electronic charge carriers may need to move through small inter-particle contact areas which exhibit additional resistance, resulting in poor electron transport from the electrode material to the current collector, as shown in FIG. 1C.

Figure 1D:
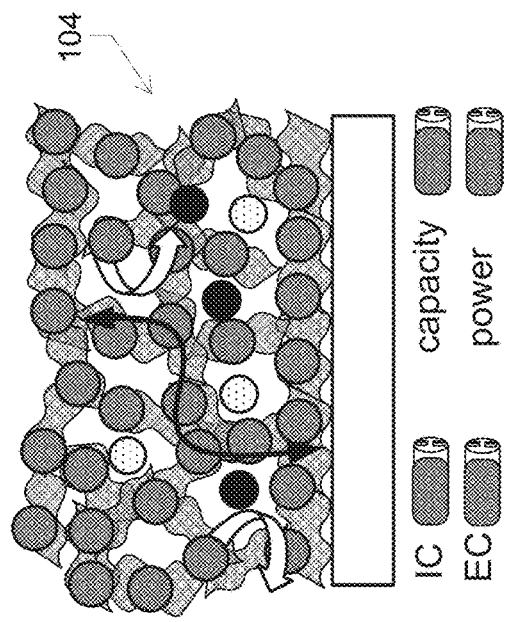
FIG. 1D shows an example of an electrode comprising nanostructured metal oxide grown on 3D interconnected corrugated carbon-based networks (ICCNs) with high surface area and high electronic conductivity, in accordance with some embodiments.

FIG. 1D shows an electrode obtained by growing $MnO_2$ nanostructures onto a 3D interconnected macroporous ICCN framework 104 with high electrical conductivity and high surface area. In this structure, graphene or the conducting ICCN framework 104 can act as a 3D current collector to provide electron "superhighways" for charge storage and delivery, while the nanostructured $MnO_2$ can enable fast, reversible Faradaic reactions with short ionic diffusion pathways. Each $MnO_2$ nanoparticle can be electrically connected to the current collector so that substantially all of the nanoparticles can contribute to capacity with almost no "dead" mass.

Figure 2A:
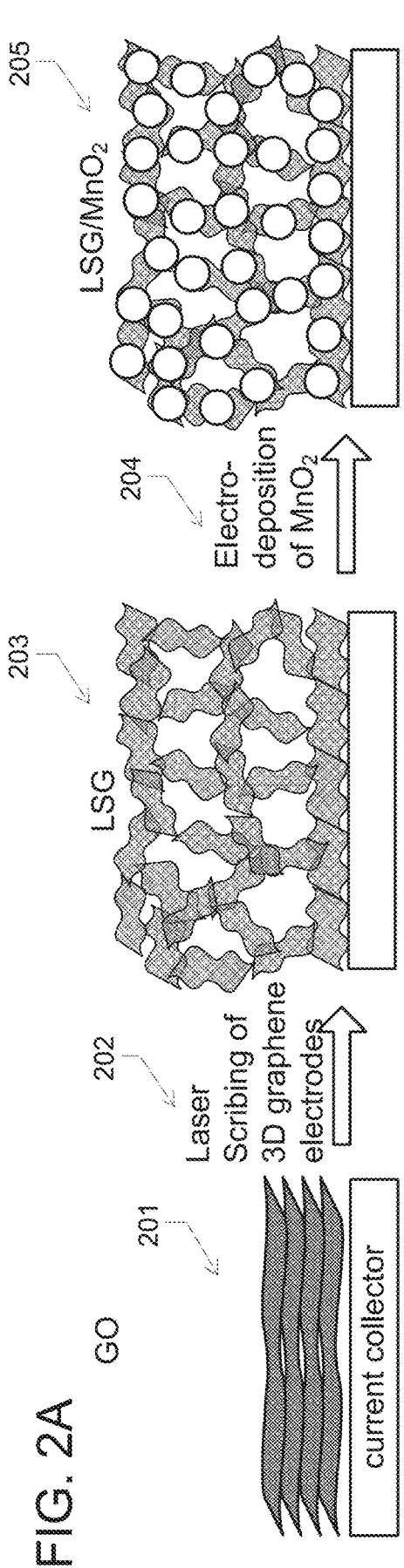
FIG. 2A is an exemplary schematic diagram of a fabrication procedure for laser-scribed graphene (LSG)-$MnO_2$ electrodes, in accordance with some embodiments.

FIGS. 2A-E show fabrication/synthesis and characterization of laser-scribed graphene (LSG)/$MnO_2$ electrodes 205 (e.g., 3D macroporous LSG-$MnO_2$ electrodes, wherein a highly conductive and high-surface-area 3D LSG framework was integrated with $MnO_2$ as schematically illustrated in FIG. 2A. The 3D LSG framework (ICCN) 203 was produced from the laser scribing 202 of graphite oxide (GO) films 201, upon which the color changed from golden brown to black. The LSG framework was subsequently coated in situ with $MnO_2$ using an electrochemical deposition technique 204 (e.g., as described elsewhere herein).

Figure 2B:
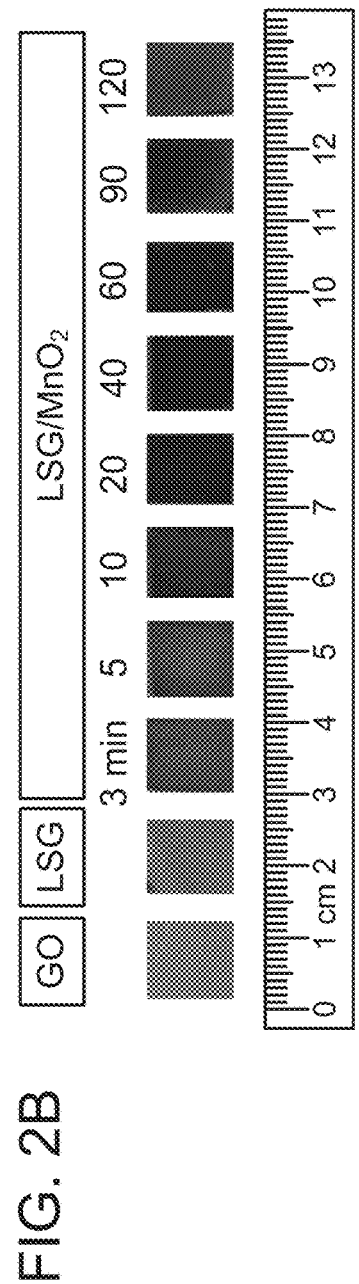
FIG. 2B provides exemplary digital photographs showing a GO film before and after laser scribing, in accordance with some embodiments.

FIG. 2B provides digital photographs showing an example of a GO film before and after laser scribing. The LSG can then be loaded with $MnO_2$, whose amount can be controlled by adjusting the deposition time (e.g., from about 3 minutes (min) to about 120 min). The ICCN electrode in FIG. 2B turns darker in color after electrodeposition, a visual indication of the loading of $MnO_2$.

Figure 2C:
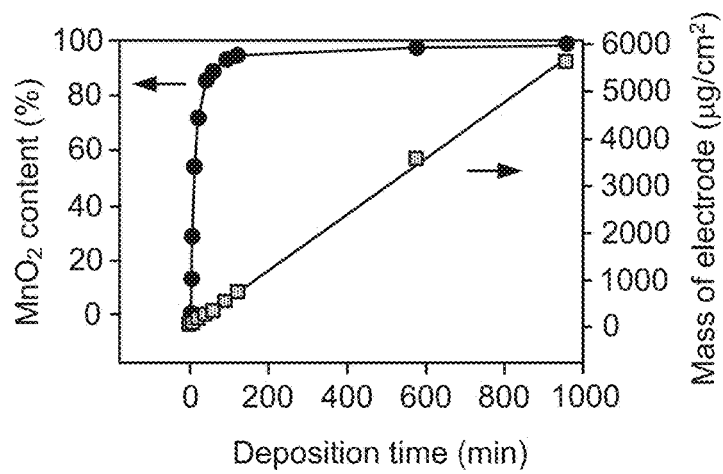
FIG. 2C shows an exemplary graph of mass loading of $MnO_2$ versus deposition time, in accordance with some embodiments.

Conductivity and mass loading of the active materials can have a significant impact on the electrochemical behavior of supercapacitor electrodes. The mass loading of $MnO_2$ can be controlled by adjusting the deposition current and deposition time. FIG. 2C shows that the $MnO_2$ loading changes almost linearly with the deposition time at an applied current of 0.25 $mA/cm^2$ and an average deposition rate estimated to be about 6 micrograms per minute (μg/min).

Figure 2D:
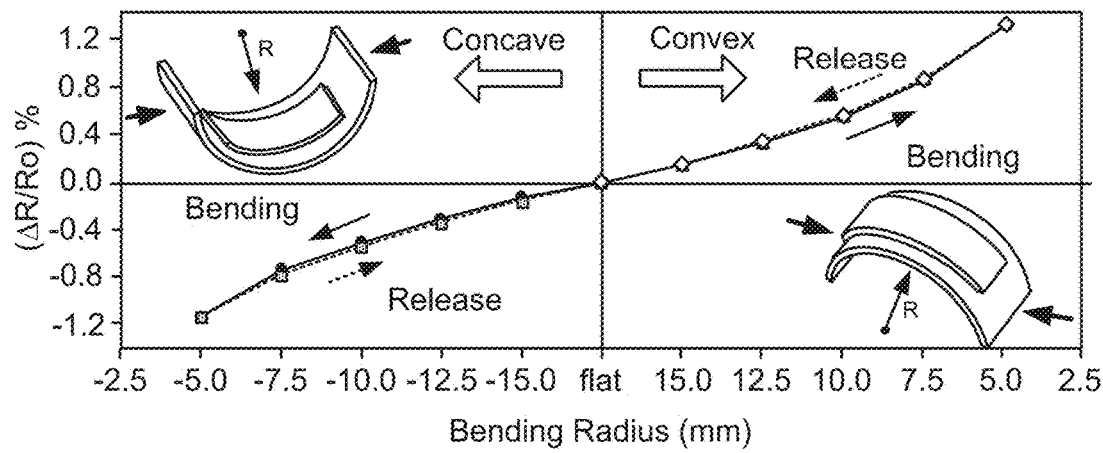
FIG. 2D shows exemplary variation of resistance of an LSG-$MnO_2$ electrode as a function of bending radius, in accordance with some embodiments.
Figure 2E:
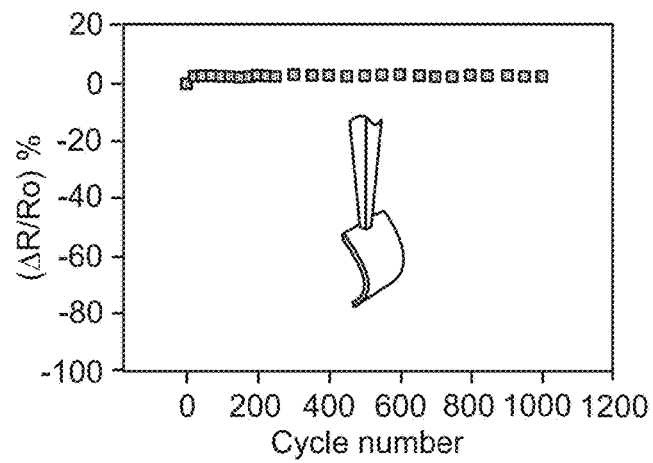
FIG. 2E shows exemplary changes in resistance of an LSG-$MnO_2$ electrode under repeated bending cycles for a concave bend radius of 5 mm, and an exemplary inset photograph showing flexibility of an LSG-$MnO_2$ electrode, in accordance with some embodiments.

The LSG-$MnO_2$ electrodes can be monolithic and demonstrate superb mechanical integrity under large mechanical deformation (e.g., in addition to interesting electrical properties). FIG. 2D shows that an LSG-$MnO_2$ electrode can be bent significantly without damage. The foldability of LSG-$MnO_2$ electrodes was evaluated by measuring their electrical resistance under successive bending cycles. In this example, the resistance varies only slightly up to a bending radius of 5.0 mm and can be completely recovered after straightening no matter whether the bending is positive (convex) or negative (concave). As shown in FIG. 2E, after 1,000 cycles of bending and straightening at a concave bend radius of 5.0 mm, the resistance has increased by only about 2.8%.

Figures 3A, 3B, 3C, 3D:
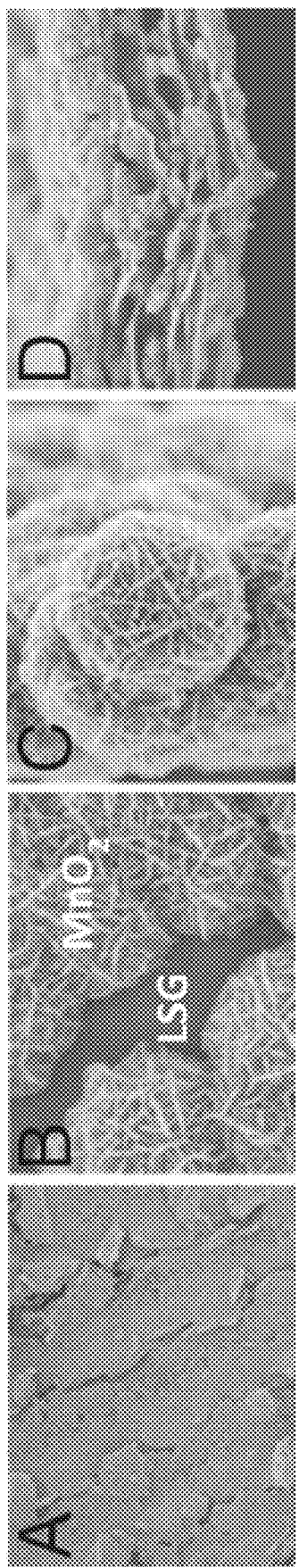
FIG. 3A shows an exemplary scanning electron microscopy (SEM) image of an LSG-$MnO_2$ electrode at low magnification, in accordance with some embodiments.
FIG. 3B shows an exemplary SEM image of an LSG-$MnO_2$ electrode at high magnification, in accordance with some embodiments.
FIG. 3C provides an exemplary SEM image that shows nanoflower morphology of electrodeposited $MnO_2$, in accordance with some embodiments.
FIG. 3D shows an exemplary cross-sectional SEM image of LSG-MnO$_2$, in accordance with some embodiments.

FIGS. 3A-G show examples of morphological and structural characterization of LSG-$MnO_2$ electrodes. The evolution of morphology corresponding to different deposition times was examined by scanning electron microscopy (SEM) (FIGS. 3A-D). The SEM micrographs show the general morphology and detailed microstructure of a typical sample prepared by 120 min of deposition. $MnO_2$ has been uniformly coated onto the surface of graphene throughout the entire film. In this example, the electrodeposited $MnO_2$ particles show a nanoflower-shaped hierarchical architecture with a clear interface between $MnO_2$ and the ICCN substrate. Closer inspection of the $MnO_2$ nanoflowers in this example shows that they are made up of a plurality (e.g., hundreds) of ultrathin nanoflakes that are about 10-20 nm thick (e.g., see also FIG. 11). These nanoflakes are interconnected together to form mesoporous $MnO_2$ with a large accessible surface area (e.g., thus offering numerous electroactive sites available to the electrolyte which promotes fast surface Faradaic reactions). FIG. 3A shows an exemplary scanning electron microscopy (SEM) image of an LSG-$MnO_2$ electrode at low magnification, in accordance with some embodiments.

Figure 3G:
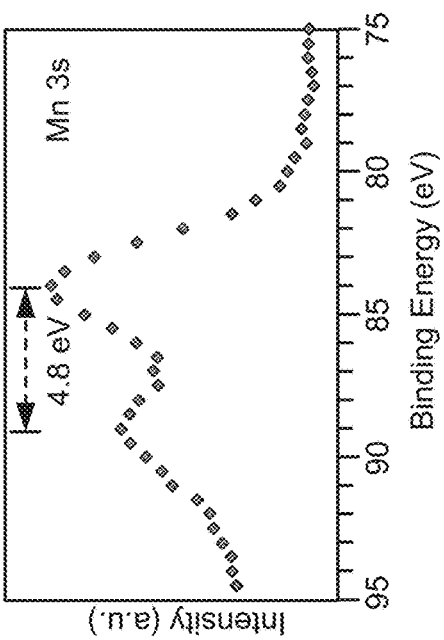
FIG. 3G shows exemplary XPS spectra of Mn 3s, in accordance with some embodiments.
Figure 3F:
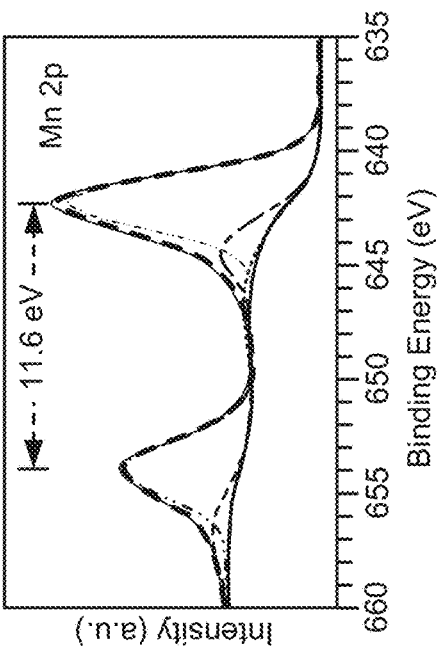
FIG. 3F shows exemplary X-ray photoelectron spectroscopy (XPS) spectra of Mn 2p showing a doublet with a peak-to-peak separation of 11.6 eV, in accordance with some embodiments.
Figure 3E:
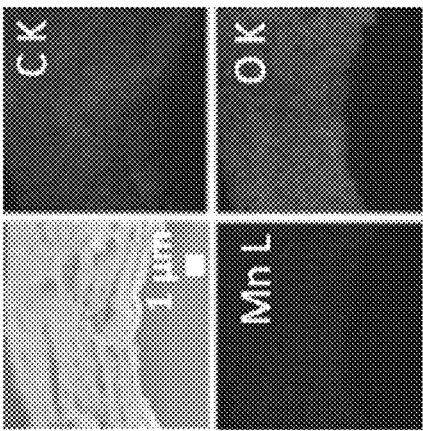
FIG. 3E shows an exemplary energy-dispersive X-ray spectroscopy (EDS) elemental mapping of C (red), Mn (blue), and O (green), in accordance with some embodiments.

The 3D structure of LSG-$MnO_2$ electrodes was further analyzed using cross-sectional SEM (FIG. 3D). The 3D porous structure of LSG is preserved after the deposition of $MnO_2$ without any agglomerations. The graphene surface has been uniformly coated with $MnO_2$ over the entire cross-section. Energy-dispersive X-ray spectroscopy (EDS), shown in FIG. 3E, provides elemental maps of C, O, and Mn, confirming that a homogeneous coating of $MnO_2$ throughout the 3D macroporous framework has been created. X-ray photoelectron spectroscopy (XPS) data of Mn 2p and Mn 3s are shown in FIGS. 3F and 3G, respectively, further confirm the chemical composition of the deposited oxide.

Figure 11:
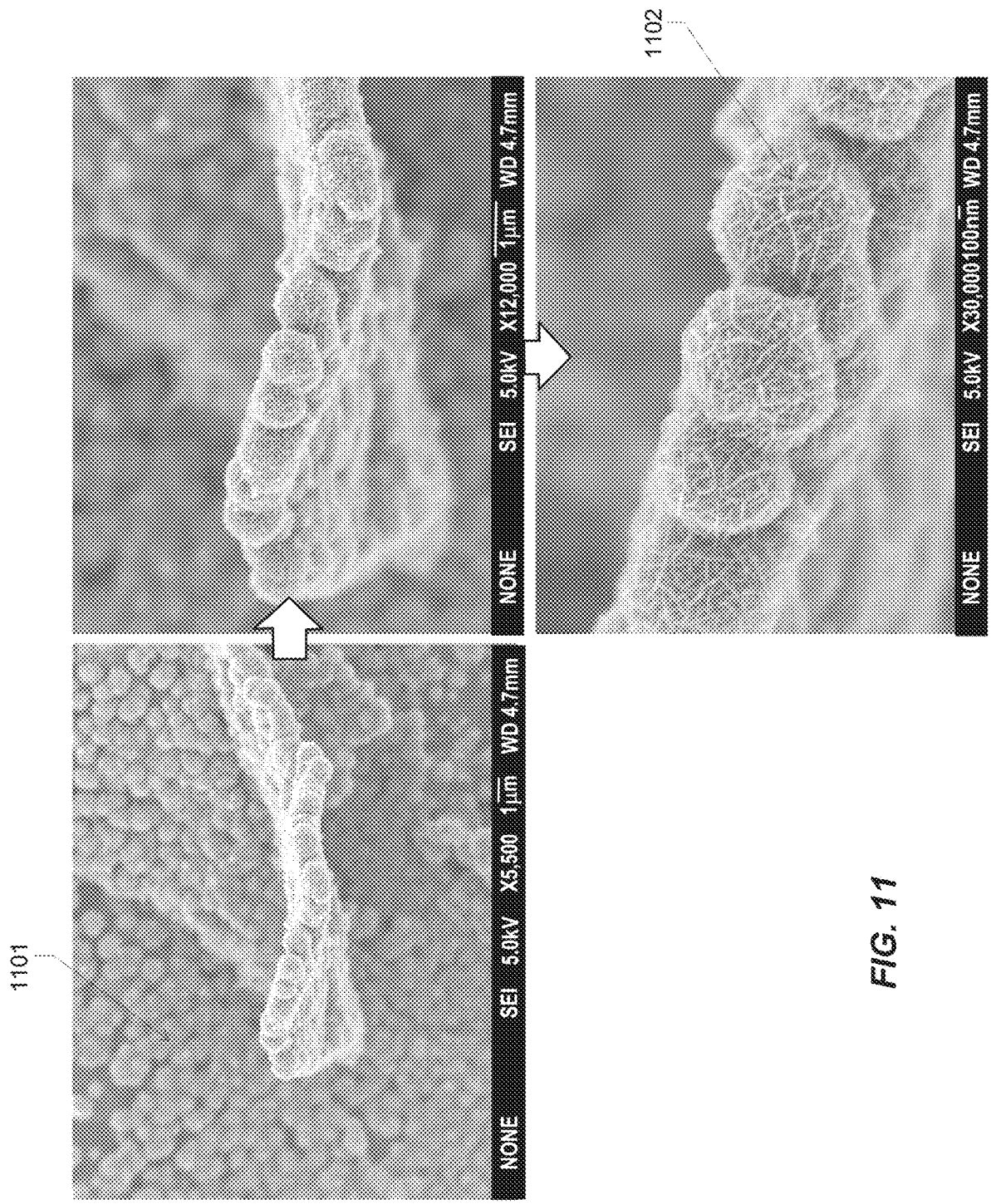
FIG. 11 shows exemplary evolution of a surface of LSG-MnO$_2$, in accordance with some embodiments.

FIG. 11 shows an example of evolution of a surface of LSG-$MnO_2$ 1101. In this example, SEM analysis of the surface of LSG-$MnO_2$ electrodes shows a homogeneous coating of the surface of graphene with $MnO_2$ nanoflowers 1102.

Symmetric Supercapacitors

Figure 4A:
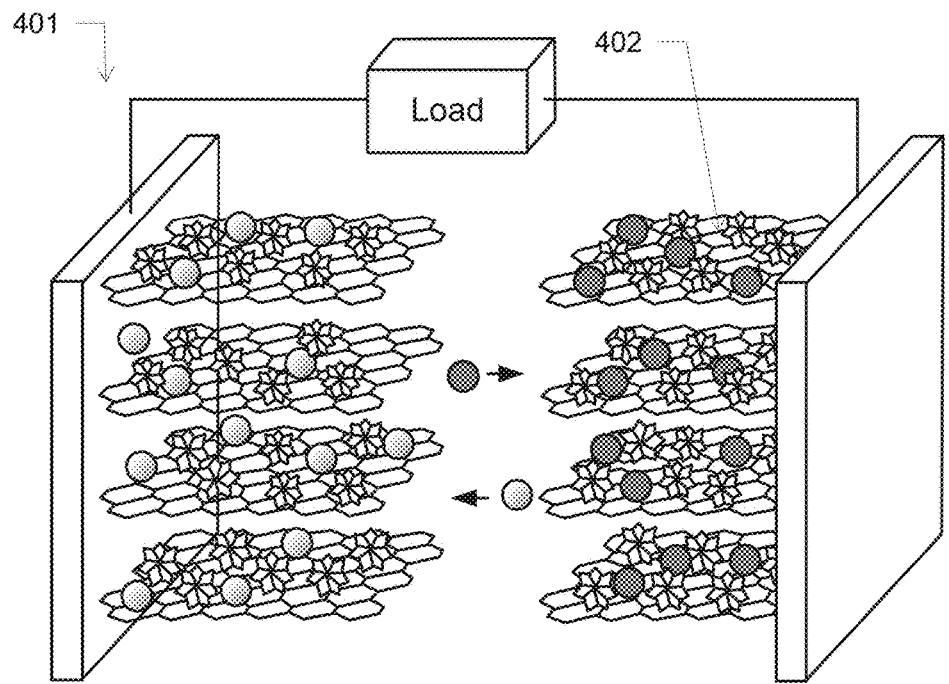
FIG. 4A shows an exemplary schematic of an LSG-MnO$_2$ symmetric supercapacitor device, in accordance with some embodiments.

In some embodiments, symmetric supercapacitors are constructed (e.g., fabricated or assembled) and their electrochemical performance is tested. FIGS. 4A-I show examples of symmetric LSG-$MnO_2$ supercapacitors 401 and their electrochemical performance. To test the electrochemical performance of LSG-$MnO_2$ macroporous frameworks 402, a supercapacitor pouch cell was assembled from two symmetric electrodes separated by a Celgard M824 ion porous separator and impregnated with 1.0 M $Na_2SO_4$ electrolyte, as schematically shown in FIG. 4A.

Figure 4B:
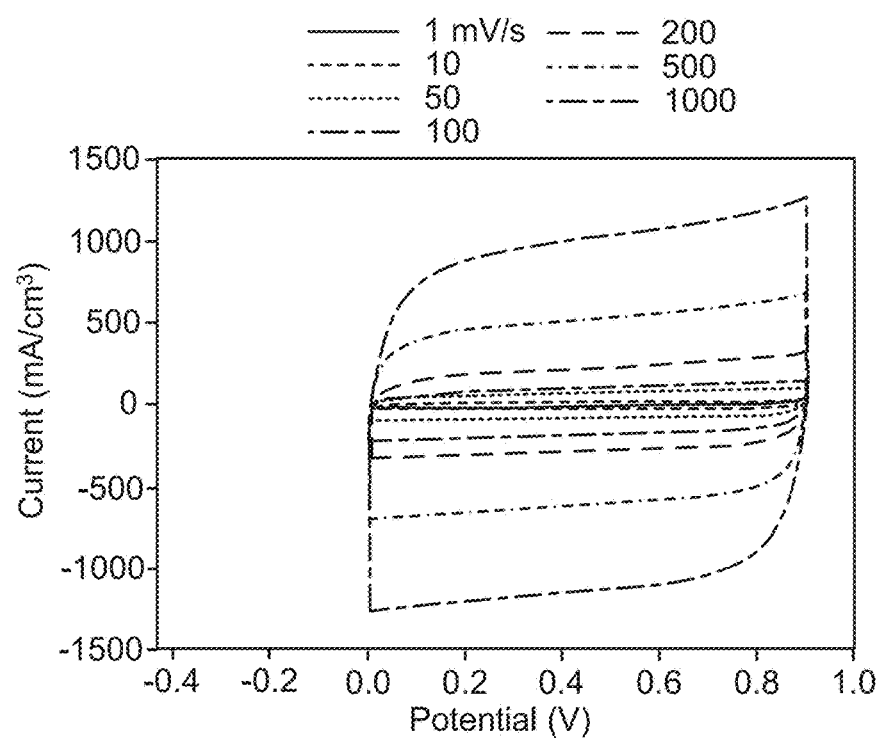
FIG. 4B shows exemplary cyclic voltammetry (CV) profiles for an LSG-MnO$_2$ (3 min) supercapacitor at different scan rates, in accordance with some embodiments.

Cells were tested by cyclic voltammetry (CV) over a wide range of scan rates from 1 to 1,000 mV/s. FIG. 4B shows examples of CV profiles for an LSG-$MnO_2$ sample with a deposition time of 3 min. The supercapacitor shows nearly rectangular CV profiles up to a scan rate of about 1,000 mV/s (e.g., as high as 1,000 mV/s), indicating excellent charge storage characteristics and ultrafast response time for the electrodes.

Figure 4C:
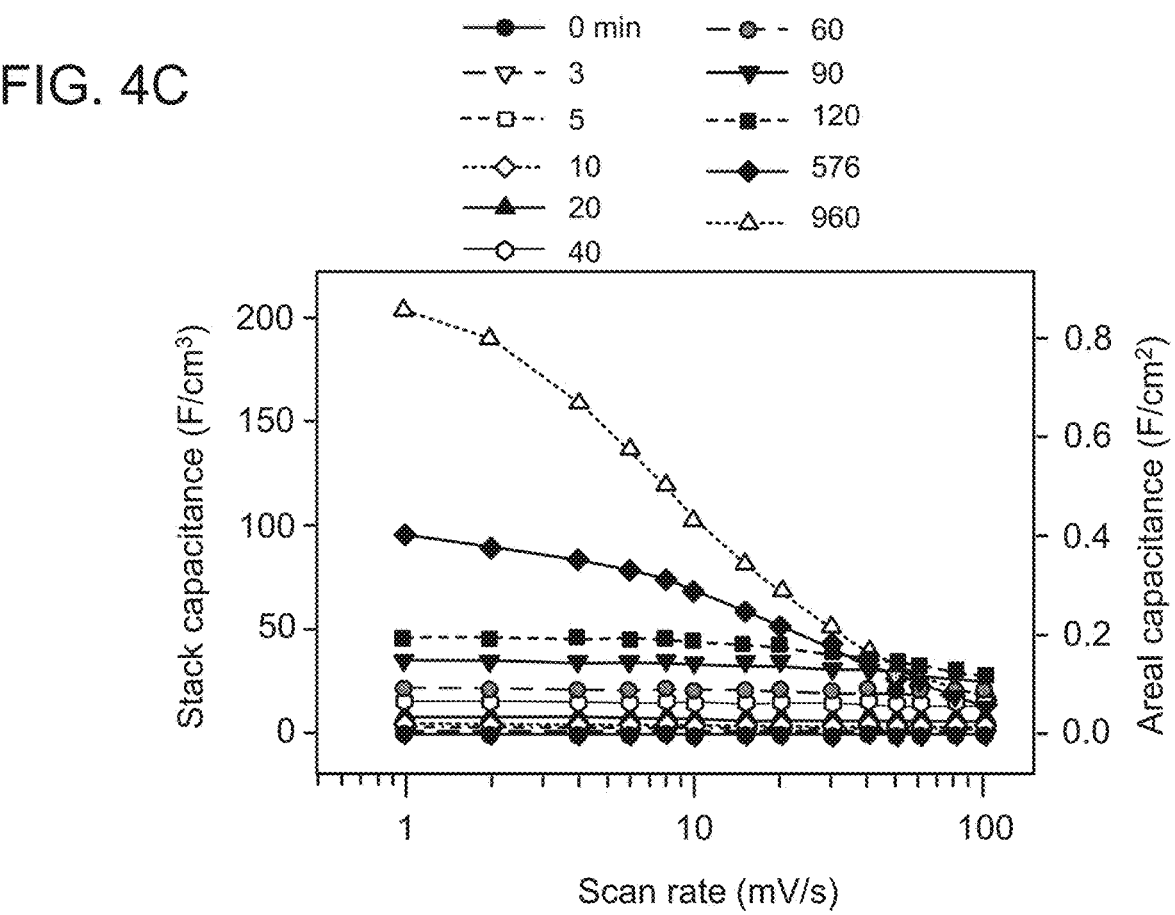
FIG. 4C shows exemplary evolution of stack capacitance of LSG with various mass loadings of MnO$_2$ as a function of scan rate, in accordance with some embodiments.
Figure 4D:
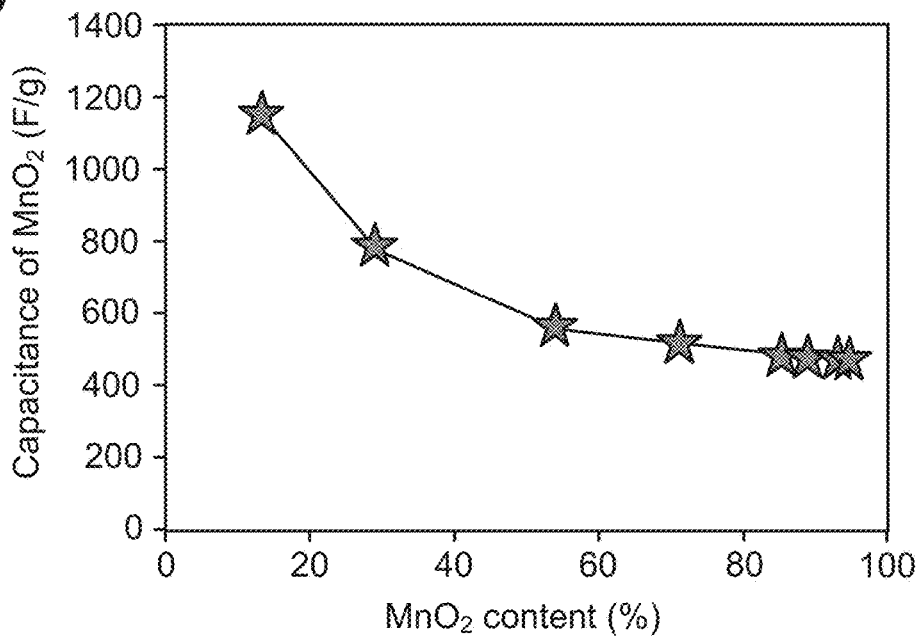
FIG. 4D shows exemplary specific capacitance due to MnO$_2$ only as a function of the loadings measured at a scan rate of 1 mV/s, in accordance with some embodiments.

Capacitances of the devices made with different deposition times were calculated from CV profiles and are presented in FIG. 4C. The capacitance in FIG. 4C was calculated using the total volume of the cell stack (including the volume of the current collector, the active material, the separator, and the electrolyte), rather than a single electrode.

The capacitance can depend strongly on the loading amount of the pseudocapacitive component (e.g., pseudocapacitive $MnO_2$). In FIG. 4C, the capacitance increases significantly with deposition time from 0 to about 960 min. For example, a stack capacitance of up to about 203 $F/cm^3$ can be achieved with the sample at a 960-minute deposition time. This stack capacitance translates to a volumetric higher than for $MnO_2$-based supercapacitors (e.g., 16.1 $F/cm^3$ for carbon nanotube-polypyrrole-$MnO_2$ sponge, 130 $F/cm^3$ for graphene-$MnO_2$—CNT, 246 $F/cm^3$ for CNT-$MnO_2$, 108 $F/cm^3$ for mesoporous carbon/$MnO_2$, and 90 $F/cm^3$ for ultraporous carbon-$MnO_2$). Depending on the deposition time, areal capacitances (e.g., ultrahigh areal capacitances) of up to about 0.8 $F/cm^2$ per footprint of the device can be achieved (e.g., compared to, for example, areal capacitances of about 0.3 $F/cm^2$ provided by commercial carbon supercapacitors).

TABLE 1 provides examples of electrochemical performance of supercapacitors comprising a variety of electrodes materials such as carbons, polymers, $MnO_2$, and their hybrid materials. AN (rows 1, 2, 4 and 5) refers to acetonitrile. $TEABF_4$ (rows 1 and 2) refers to tetraethylammonium tetrafluoroborate. $EMIMBF_4$ (rows 3 and 5) refers to 1-ethyl-3-methylimidazolium tetrafluoroborate. $BMIMBF_4$ (row 4) refers to 1-butyl-3-methyl-imidazolium tetrafluoroborate. For the material in row 10, the capacitance per footprint area in 3 electrode measurements is at least two times the areal capacitance for 2 electrode measurements. For the electrode material in row 11, gravimetric capacitance is listed instead of volumetric capacitance. The LSG-$MnO_2$ electrode material (row 15) may be as described herein.

TABLE 1

| | Electrode Material | Cell Type | Voltage window | Electrolyte | Specific capacitance Per Footprint area ($mF/cm^2$) | Volumetric ($F/cm^3$) |
|---|---|---|---|---|---|---|
| 1 | Activated carbons | Full cell | 2.7 V | $TEABF_4$/AN | ~300 | 60-80 |
| 2 | Carbide derived carbon | 3 electrode | 2.3 V | $TEABF_4$/AN | — | 180 |
| 3 | LSG | Full cell | 4.0 V | $EMIMBF_4$ | 5.02 | 14.34 |
| 4 | Activated MEGO | Full cell | 3.5 V | $BMIM$-$BF_4$/AN | — | 60 |
| 5 | Liquid mediated CCG | Full cell | 3.5 V | $EMIMBF_4$/AN | — | 263.3 |
| 6 | CNT/PPy/$MnO_2$ | Full cell | 0.9 V | KCl | — | 16.1 |
| 7 | Graphene/$MnO_2$/CNT | Full cell | 1.0 V | 1.0M $Na_2SO_4$ | — | 130 |
| 8 | CNT/$MnO_2$ | 3 electrode | 0.85 V | 0.1M $K_2SO_4$ | — | 246 |
| 9 | Meso-porous carbon/$MnO_2$ | 3 electrode | 0.8 V | 1.0M $Na_2SO_4$ | — | 108 |
| 10 | Ultra-porous Carbon/$MnO_2$ | 3 electrode | 0.8 V | 1.0M $Na_2SO_4$ | 1500 | 90 |
| 11 | Graphene/$RuO_2$ | 3 electrode | 1.0 V | 1.0M $H_2SO_4$ | — | (570 F/g) |
| 12 | CNT/$Co_3O_4$ | 3 electrode | 0.5 V | 2.0M KOH | 30.8 | 30.8 |
| 13 | Titanium carbide clay | 3 electrode | 0.55 V | 1.0M $H_2SO_4$ | — | 910 @5 μm 534 @30 μm 355 @75 μm |
| 14 | MXene/PVA | 3 electrode | 0.6 V | 1.0M KOH | — | 528 |
| 15 | LSG-$MnO_2$ (15 μm thick film) | Full cell | 0.9 V | 1.0M $Na_2SO_4$ | 852 | 1136.5 | capacitance of 1,136.5 $F/cm^3$ when calculated based on the volume of the active material per electrode only. This value is much higher than the capacitance of, for example, activated carbons (e.g., 60-80 $F/cm^3$), carbide-derived carbons (e.g., 180 $F/cm^3$), bare LSG (e.g., 12 $F/cm^3$), activated microwave exfoliated graphite oxide (MEGO) (e.g., 60 $F/cm^3$), and liquid-mediated chemically converted graphene (CCG) films (e.g., 263.3 $F/cm^3$), indicating that the volumetric capacitance of carbon-based electrodes can be significantly improved by incorporating pseudocapacitive materials (e.g., see TABLE 1). Furthermore, this value is The contribution of the $MnO_2$ nanoflowers can be separated (e.g., separately viewed/analyzed) from the average capacitance of the LSG-$MnO_2$ electrodes. In an example, shown in FIG. 4D, specific capacitance of $MnO_2$ depends on the mass of the active material, reaching a maximum value of about 1145 F/g (about 83% of the theoretical capacitance) at a mass loading of about 13% of $MnO_2$. The electrode microstructure can facilitate the transport of ions and electrons and provide abundant surfaces for charge-transfer reactions, ensuring a greater utilization of the active materials.

Figure 4E:
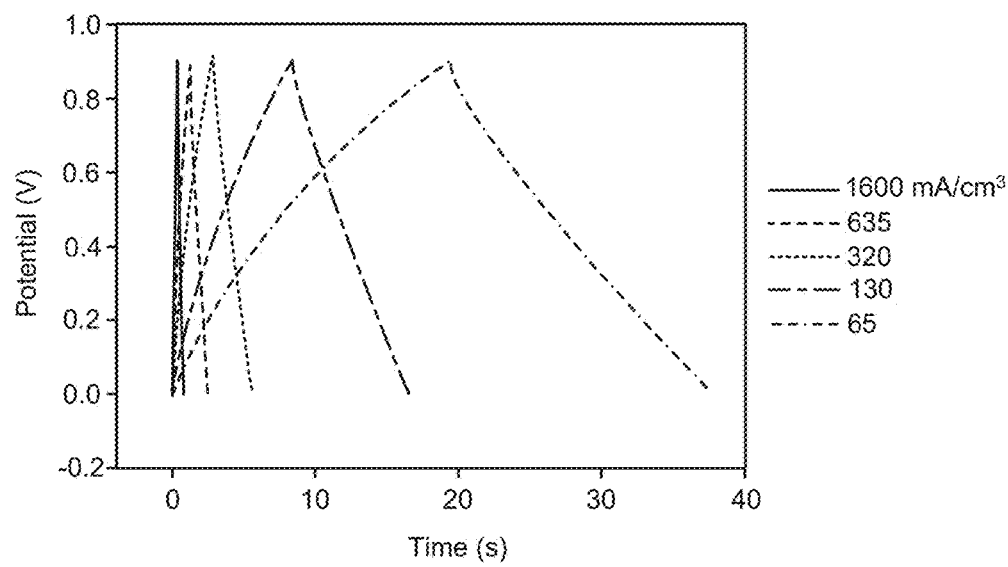
FIG. 4E shows exemplary charge-discharge curves of an LSG-MnO$_2$ (3 min) supercapacitor at different current densities, in accordance with some embodiments.

FIG. 4E shows charge-discharge curves of an LSG-MnO$_2$ (3 min) supercapacitor at different current densities.

Figure 4F:
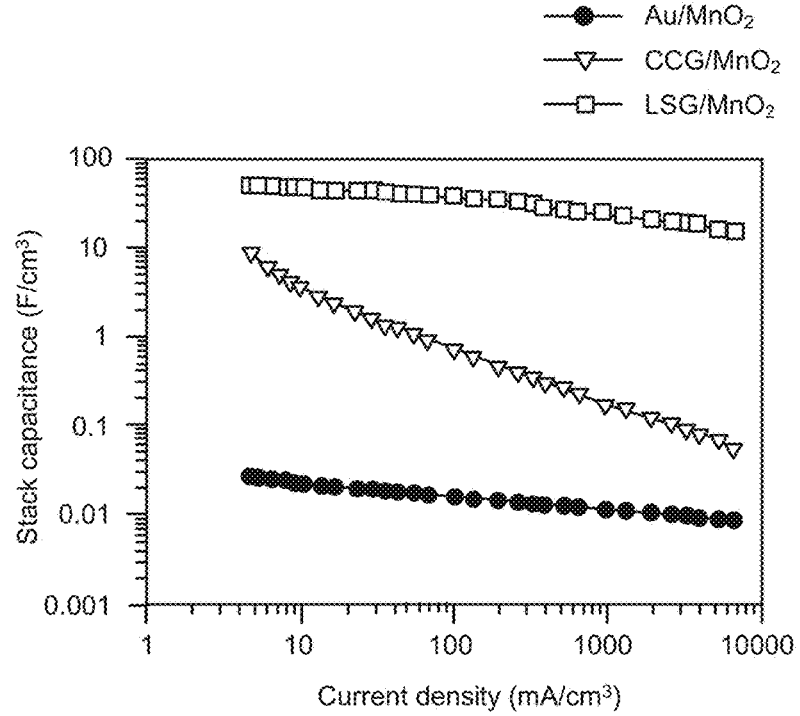
FIG. 4F shows exemplary change of stack capacitance of an LSG-MnO$_2$ (120 min) supercapacitor as a function of current density and data for CCG-MnO$_2$ (120 min) and Au—MnO$_2$ (120 min) supercapacitors are presented for comparison, in accordance with some embodiments.
Figure 4G:
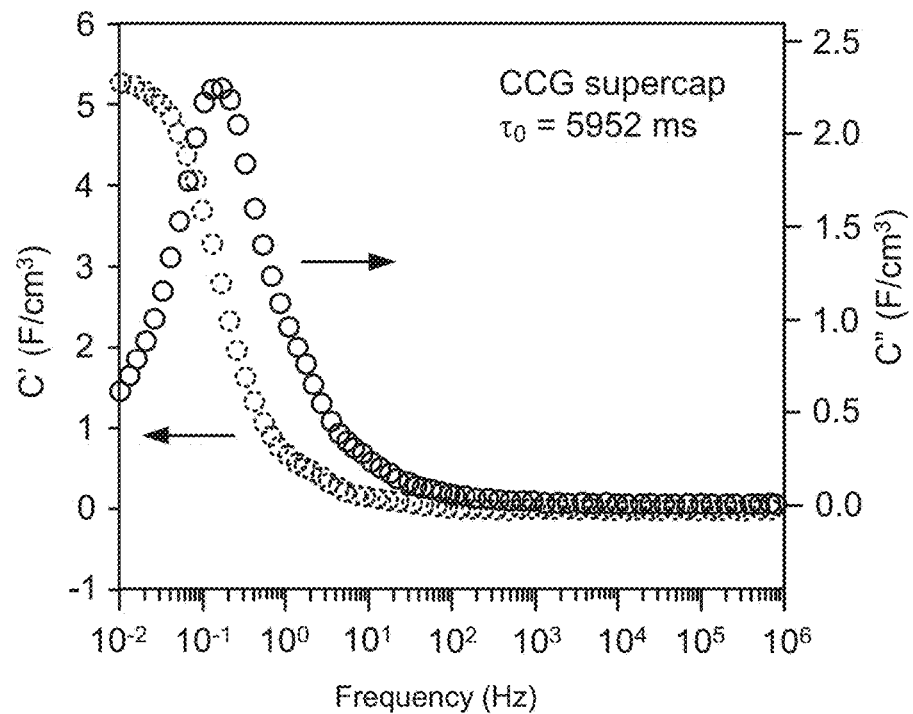
FIG. 4G shows exemplary progression of real (C') and imaginary (C") parts of stack capacitance of CCG as a function of frequency, in accordance with some embodiments.
Figure 4H:
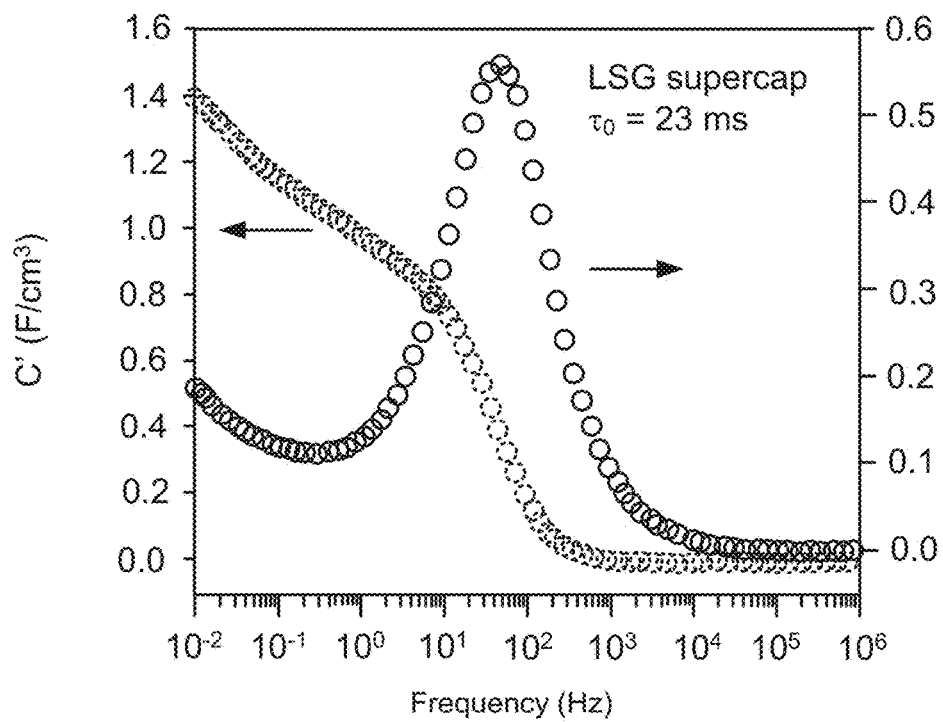
FIG. 4H shows exemplary progression of real (C') and imaginary (C") parts of stack capacitance of LSG as a function of frequency, in accordance with some embodiments.

MnO$_2$ was also electrodeposited on both CCG and gold substrates under the same conditions as the LSG-MnO$_2$ macroporous electrodes. FIG. 4F provides a comparison of their electrochemical performance with LSG-MnO$_2$. The CCG-MnO$_2$ electrode exhibits lower capacitance, and its performance falls off very quickly at higher charge-discharge rates. This may be attributed to the restacking of graphene sheets during the fabrication of the CCG electrodes, resulting in a significant reduction in the surface area and eventually closing off much of the porosity. The Au—MnO$_2$ electrode shows extremely low capacitance because of the limited surface area and structural properties (e.g., see FIG. 1A). The LSG-MnO$_2$ shows a stack capacitance of about 50 F/cm$^3$ that is more than four times higher than CCG-MnO$_2$ and about three orders of magnitude higher than Au—MnO$_2$. The enhanced capacitance and rate capability of the LSG-MnO$_2$ can be attributed, for example, to its improved (e.g., optimized) structure (e.g., which synergizes the effects of both effective ion migration and high electroactive surface area, thus enabling high and reversible capacitive behavior even at high charge-discharge rates). The improved (e.g., optimized) ionic diffusion of the LSG network was also confirmed from electrochemical impedance spectroscopy with a response time of about 23 milliseconds (ms) for LSG compared with about 5,952 ms for the CCG electrode(s), as shown in FIGS. 4G-H) (e.g., see also FIGS. 9B, 9D, and 10).

Figure 4I:
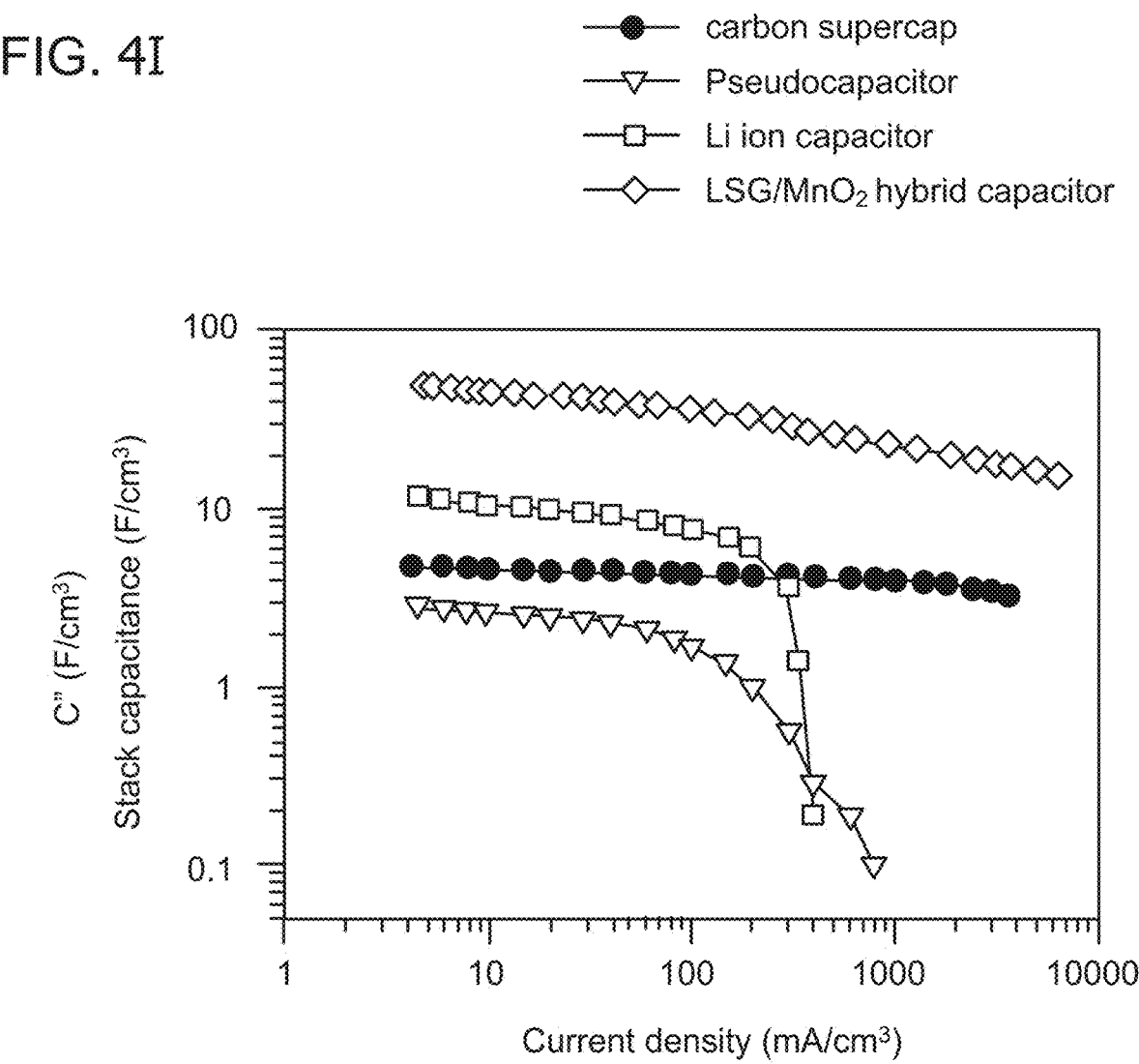
FIG. 4I provides an exemplary comparison of an LSG-MnO$_2$ (120 min) hybrid capacitor with examples of an activated carbon supercapacitor (2.7 V/10 F), a pseudocapacitor (2.6 V/35 mF), and a lithium-ion hybrid capacitor (2.3 V/220 F), in accordance with some embodiments.

FIG. 4I shows an example comparing capacitance of an LSG-MnO$_2$ supercapacitor with commercially available activated carbon supercapacitors, pseudocapacitors, and lithium-ion hybrid capacitors. In this example, the LSG-MnO$_2$ supercapacitor shows improved (e.g., superior) volumetric capacitance and rate capability compared with the commercially available activated carbon supercapacitors, pseudocapacitors, and lithium-ion hybrid capacitors.

The microstructure of the host graphene in a graphene/metal oxide nanocomposite can affect its electrochemical performance. The pore structure of the graphene electrode can affect the electrochemical performance of its composites with metal oxides.

Figure 9A:
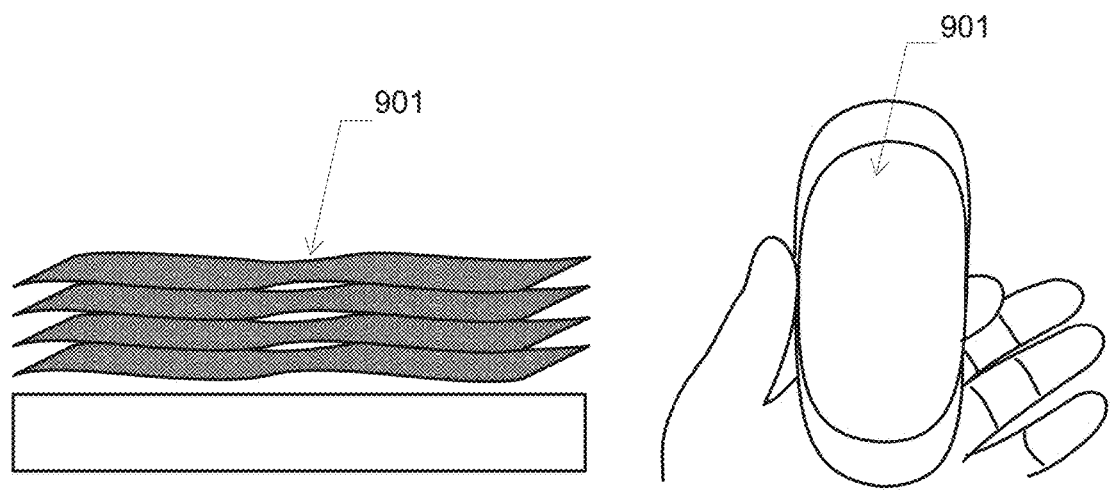
FIG. 9A schematically illustrates an exemplary converted graphene (CCG) film, and in accordance with some embodiments.
Figure 9B:
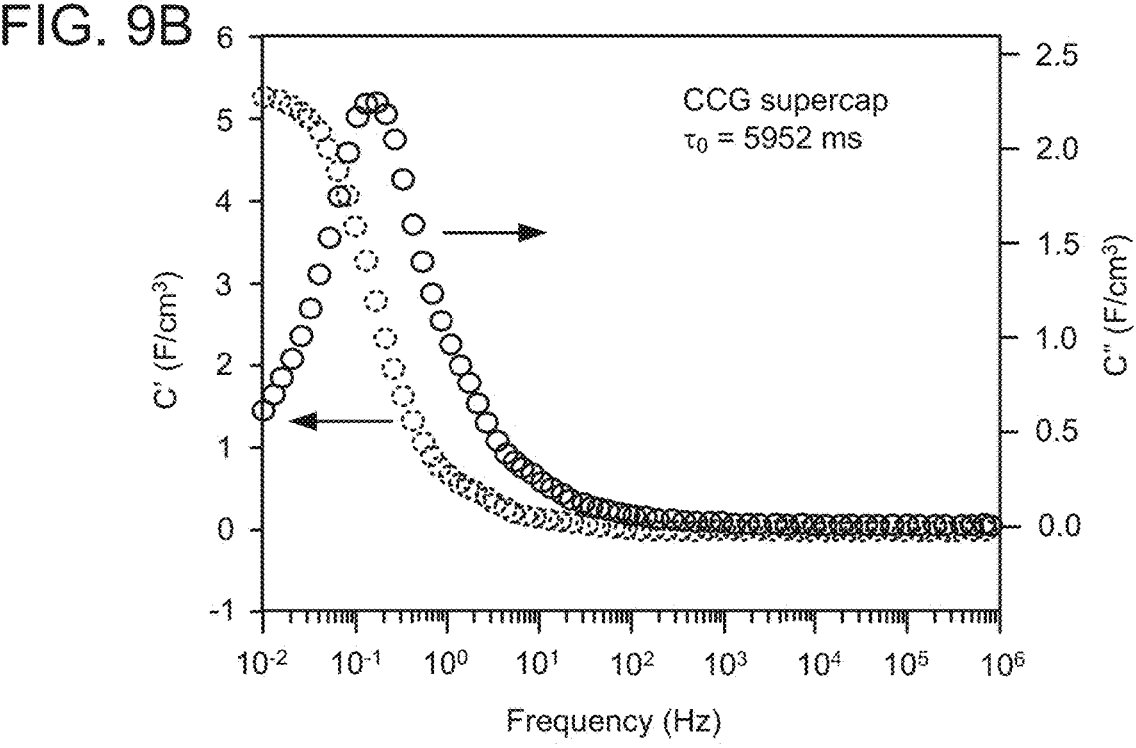
FIG. 9B illustrates the exemplary effect of the pore structure of a CCG on its electrochemical performance, in accordance with some embodiments.
Figure 9C:
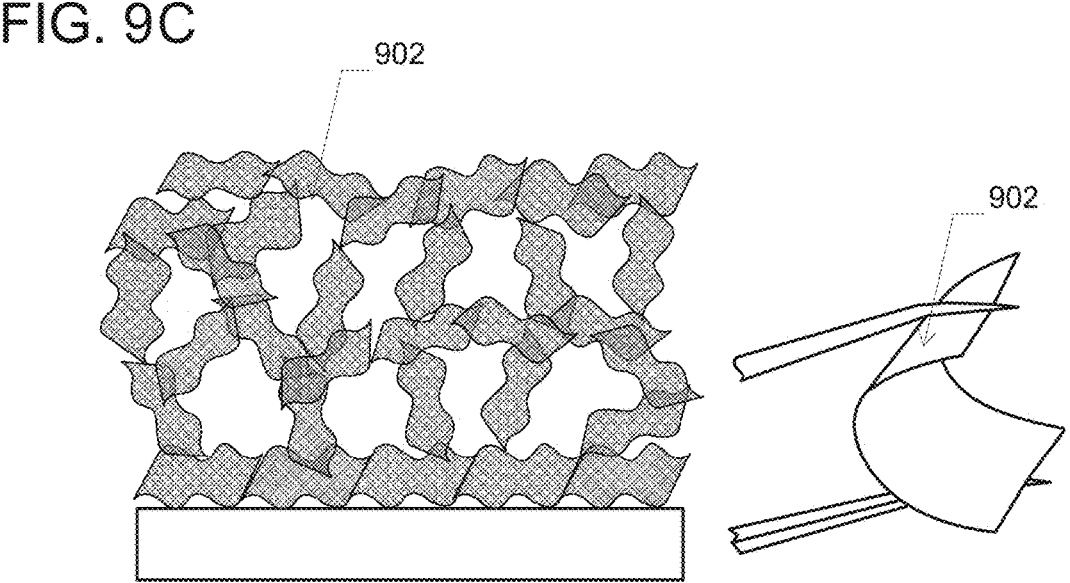
FIG. 9C schematically illustrates an exemplary laser-scribed graphene (LSG) film, in accordance with some embodiments.
Figure 9D:
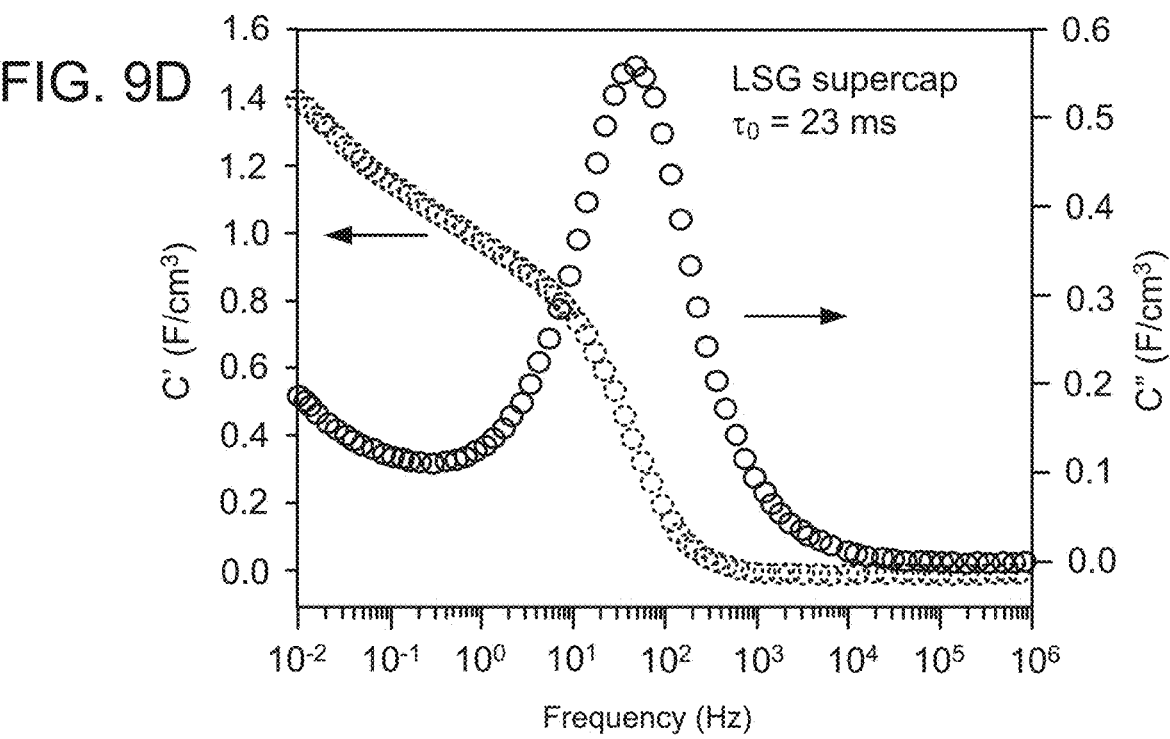
FIG. 9D illustrates the exemplary effect of the pore structure of a LSG on its electrochemical performance, in accordance with some embodiments.

FIGS. 9B and 9D schematically illustrate the effect of pore structure of graphene on its electrochemical performance for two forms of graphene of different pore structures: chemically converted graphene (CCG) films and laser-scribed graphene (LSG) films. Schematic illustrations show structural differences between dense CCG films FIG. 9A and porous LSG films FIG. 9C. Also shown in FIGS. 9B and 9D are graphs showing emergence of real (C') and imaginary (C") parts of volumetric stack capacitance versus frequency for CCG and LSG electrodes (bottom). The CCG sheets can be well connected together in a layered structure to form the CCG electrodes. The reduced porosity and limited accessibility to electrolyte ions can cause a slow frequency response of about 5 seconds for CCG electrodes. LSG electrodes can have a well-defined porous structure such that the individual graphene sheets in the LSG network are accessible to the electrolyte, and thus exhibit a rapid frequency response of 23 ms. This may cause the enhanced capacitance and rate capability observed with the LSG-MnO$_2$. The improved (e.g., optimized) structure of LSG electrodes may synergize the effects of both effective ion migration and high electroactive surface area, thus enabling, for example, high and reversible capacitive behavior for LSG-MnO$_2$ even at high charge/discharge rates.

Figure 10:
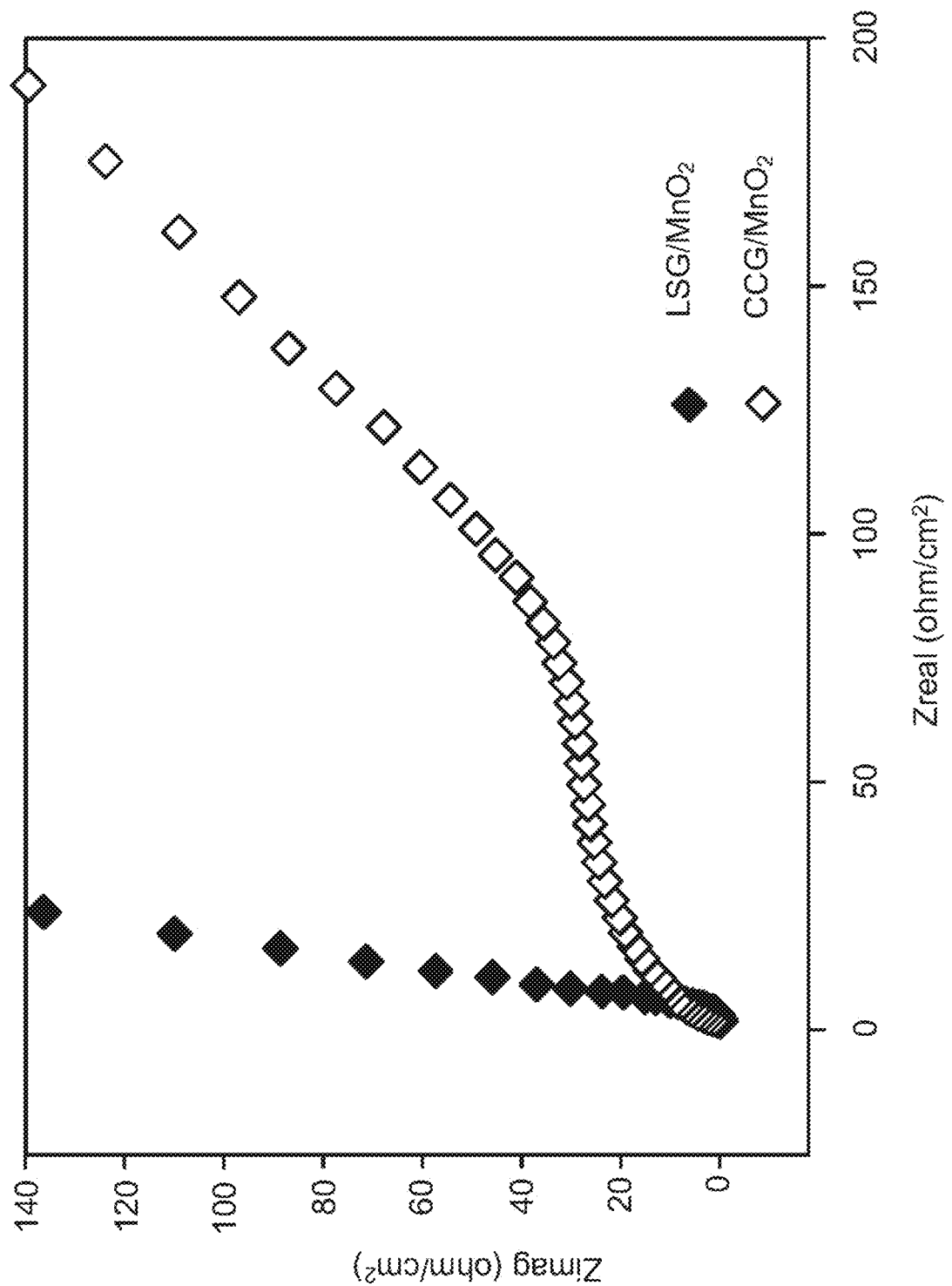
FIG. 10 shows exemplary Nyquist impedance plots of CCG/MnO$_2$ and LSG-MnO$_2$, in accordance with some embodiments.

Further understanding of the capacitive behavior of the CCG/MnO$_2$ and LSG-MnO$_2$ hybrid electrodes was obtained by conducting AC impedance measurements in the frequency range 1 MHz to 10 mHz. FIG. 10 shows examples of Nyquist impedance plots of CCG/MnO$_2$ and LSG-MnO$_2$. The LSG-MnO$_2$ shows better ion diffusion and smaller charge transfer resistance. The experiments were carried out over a frequency range of 1 MHz to 10 mHz. For each of these cells, MnO$_2$ was electrodeposited for 120 min. The Nyquist plots consist of a spike at the low frequency region and a semicircle at the high frequency region. Compared with CCG/MnO$_2$, the LSG-MnO$_2$ supercapacitor shows a much smaller diameter for the semicircle, suggesting a more efficient charge transfer on the electrode surface. Furthermore, in the low frequency region, a more vertical straight line is observed for the porous LSG-MnO$_2$ electrodes, indicating faster ion diffusion and almost ideal capacitive behavior for these electrodes. The intercept of the Nyquist curve on the real axis is about 1.5Ω, indicating a high conductivity for the electrolyte and low internal resistance of the electrodes. These results show that the microstructure of the graphene electrodes can have a strong impact on the electrochemical performance of their composites with metal oxides.

The porosity of the LSG-MnO$_2$ can provide good accessibility to the electrolyte during charge and discharge processes while at the same time still maintaining the high packing density of the material. The high surface area of nanostructured MnO$_2$ can provide more active sites for the Faradaic reactions and shorten the ion diffusion pathways that are crucial for realizing its full pseudocapacitance. In some examples, LSG-MnO$_2$ electrodes can achieve both high gravimetric capacitance and volumetric capacitance superior to MnO$_2$-based pseudocapacitors and hybrid capacitors, as described in greater detail in relation to TABLE 1.

Asymmetric Supercapacitors

In some embodiments, asymmetric supercapacitors are constructed (e.g., fabricated or assembled) and their electrochemical performance is tested.

Asymmetric supercapacitors can use positive and negative electrode materials of different types that can be charged/discharged in well-separated potential windows in the same electrolyte. Asymmetric supercapacitors may offer high capacity via a Faradaic reaction at the positive electrode and maintain fast charge/discharge due to the EDL mechanism at the negative electrode. The asymmetric configuration may extend the operating voltage window of aqueous electrolytes beyond the thermodynamic limit of water (about 1.2 V) (e.g., leading to significantly higher specific energy than symmetric supercapacitors using aqueous electrolytes). In an example, asymmetric supercapacitors can be based on carbon and NiOOH electrodes with an aqueous electrolyte. While this configuration can provide high capacitance, it can have a low cell voltage (<1.5 V) that can be detrimental to its energy and power performance.

Figure 5A:
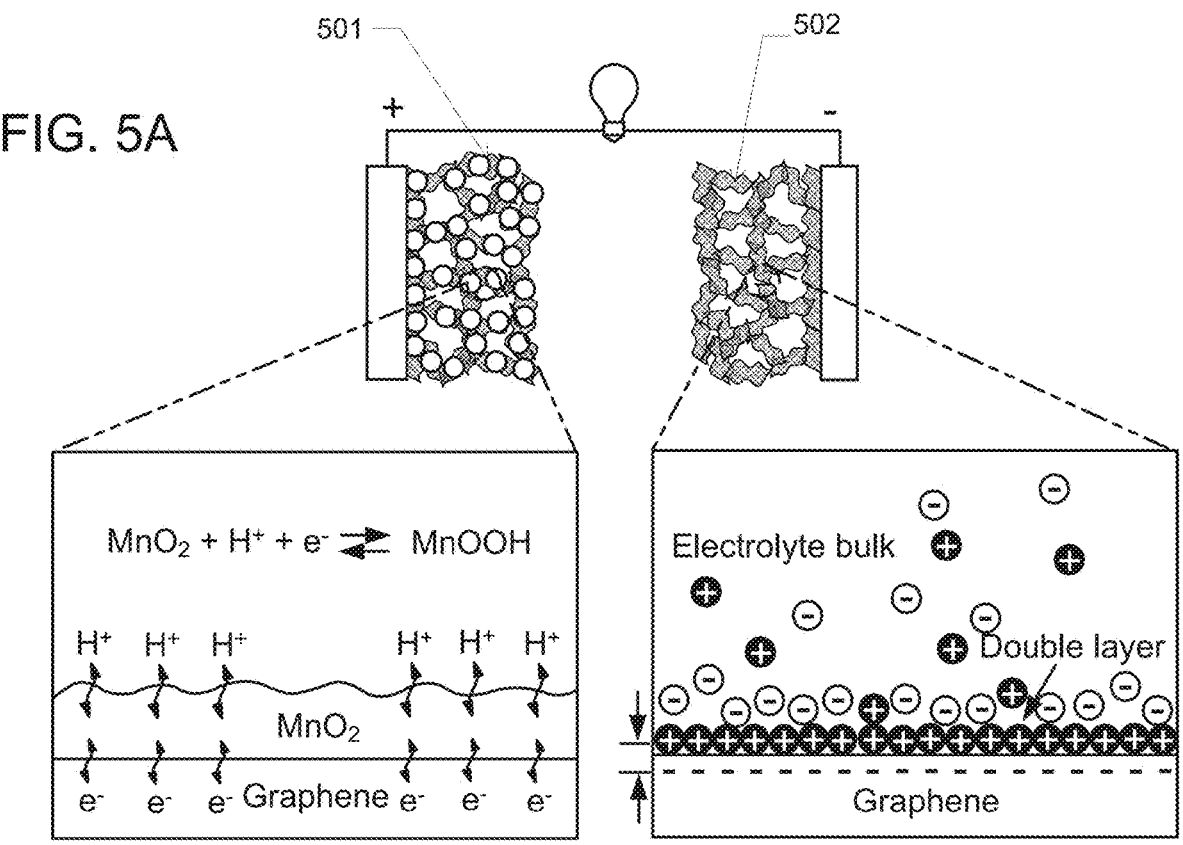
FIG. 5A is an exemplary schematic showing an example structure of an assembled supercapacitor device based on graphene-MnO$_2$ as positive electrode and LSG as negative electrode in 1.0 M Na$_2$SO$_4$ electrolyte, in accordance with some embodiments.

FIGS. 5A-F show examples of an asymmetric supercapacitor based on ICCN-MnO$_2$ as positive electrode and LSG as negative electrode and its electrochemical performance. Considering the high pseudocapacitance of the LSG-MnO$_2$ electrode and the fast charge-discharge of the double-layer capacitance of the LSG electrode, an asymmetric supercapacitor was assembled using LSG-MnO$_2$ 501 as the positive and LSG 502 as the negative electrode, as schematically illustrated in FIG. 5A.

Figure 5B:
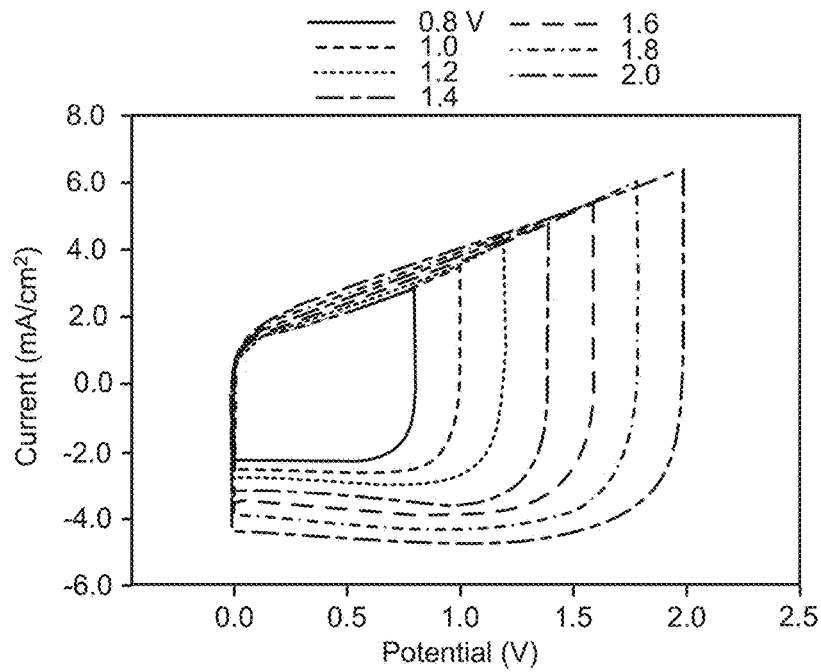
FIG. 5B shows exemplary CV curves of an asymmetric supercapacitor after increasing the potential window from 0.8 to 2.0 V, in accordance with some embodiments.
Figure 5C:
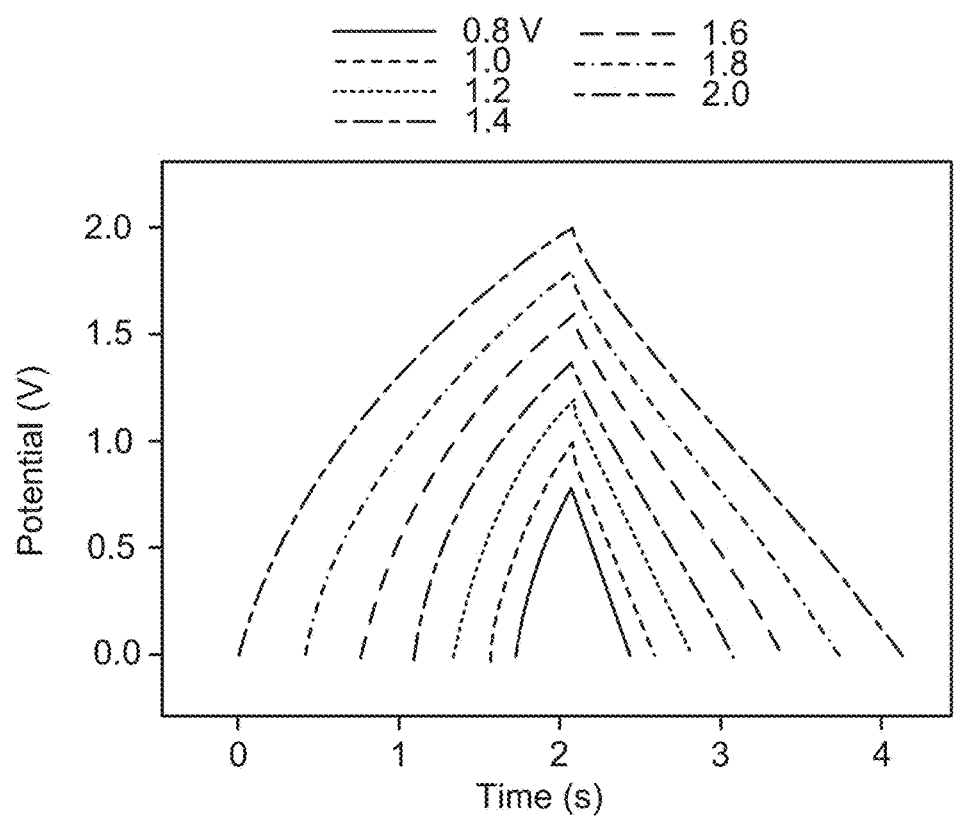
FIG. 5C shows exemplary charge discharge curves of an asymmetric supercapacitor after increasing the potential window from 0.8 to 2.0 V, in accordance with some embodiments.

In this example, a charge balance between the two electrodes was achieved by controlling the deposition time of MnO$_2$ at the positive electrode and the thickness of the ICCN film at the negative electrode. FIGS. 5B-C show electrochemical performance of an example asymmetric cell comprising a positive electrode comprising LSG-MnO$_2$ with 13% MnO$_2$ mass loading (3-min deposition time). The cell exhibits an ideal capacitive behavior with nearly rectangular CV profiles and highly triangular charge/discharge curves. The CV profiles retain their rectangular shape without apparent distortions with increasing scan rates up to a rate (e.g., an ultrahigh rate) of 10,000 mV/s (e.g., indicating the high rate capability of this asymmetric supercapacitor). The asymmetric cell has a wide and stable operating potential window up to about 2.0 V in aqueous electrolyte that may afford high energy density.

Figure 5D:
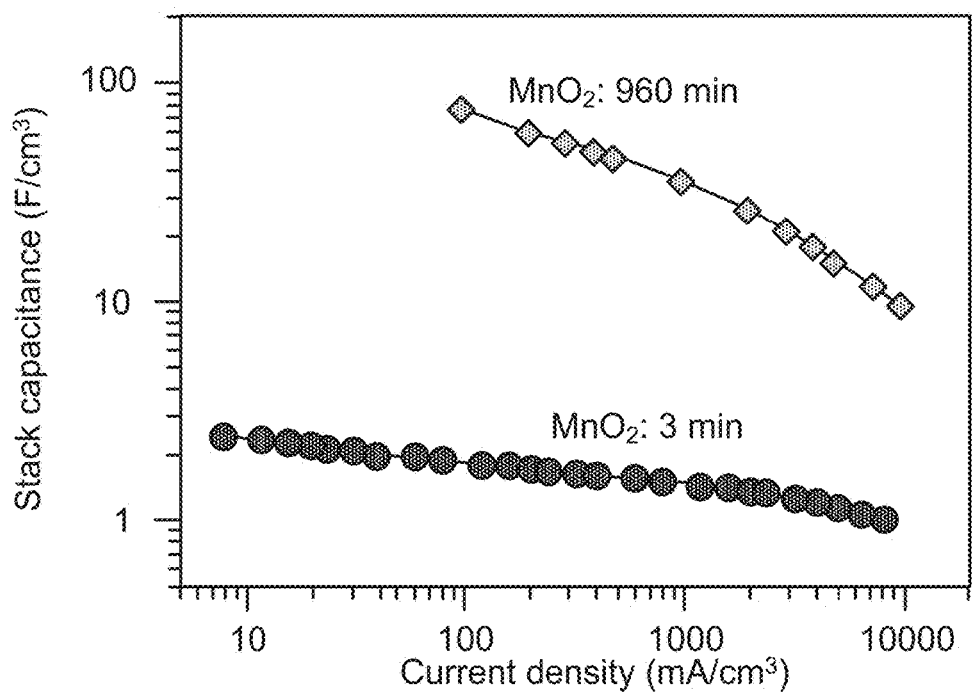
FIG. 5D shows exemplary change of the stack capacitance as a function of current density, in accordance with some embodiments.

FIG. 5D shows that as the MnO$_2$ deposition time is increased from about 3 min to about 960 min, stack capacitance increases significantly from about 3 F/cm$^3$ to about 76 F/cm$^3$ (e.g., indicating that the stored energy and power can be greatly improved in the asymmetric structure). These cells can also retain their high capacity at faster charge and discharge rates.

Figure 5E:
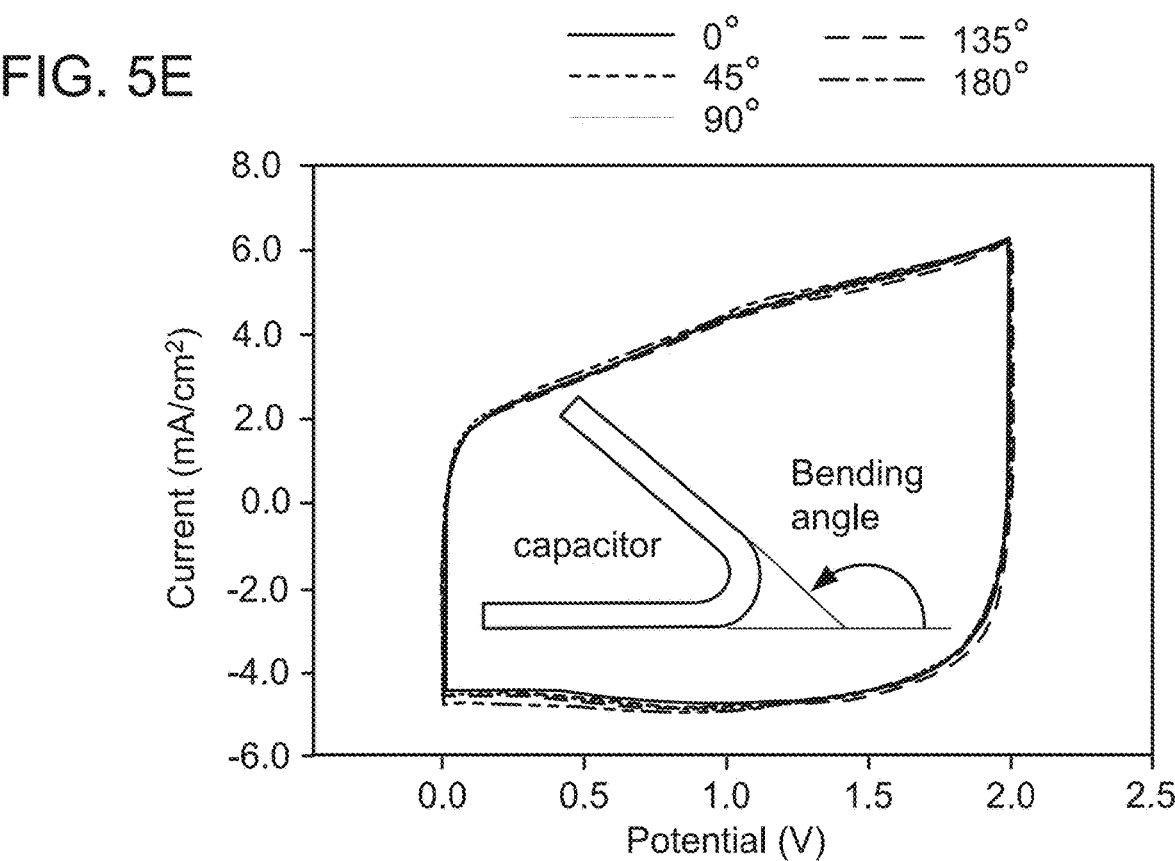
FIG. 5E shows exemplary electrochemical performance of the device under different bending angles, in accordance with some embodiments.

The as-fabricated supercapacitor can be highly flexible and can be folded and twisted without affecting the structural integrity of the device or its electrochemical performance (FIG. 5E). Such a device may be a practical energy storage system for flexible electronics.

Figure 5F:
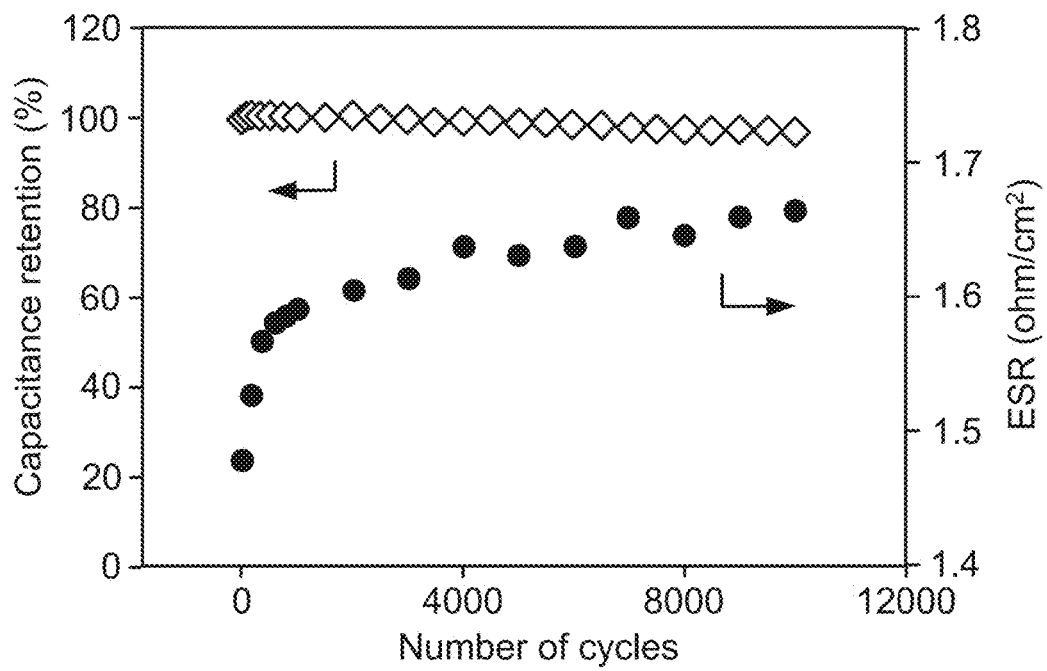
FIG. 5F shows exemplary cycling stability of the device tested over 10,000 cycles at a scan rate of 1,000 mV/s, and change of equivalent series resistance (ESR) during cycling, in accordance with some embodiments.

The asymmetric supercapacitor can have a long cycle life. The asymmetric supercapacitor can be very stable. FIG. 5F shows that the asymmetric supercapacitor can maintain greater than about 96% of its original capacity after 10,000 charge-discharge cycles tested at a (e.g., high) scan rate of 1,000 millivolts per second (mV/s). The equivalent series resistance (ESR) of the supercapacitor was monitored during cycling using a Nyquist plot. A slight increase of the ESR in the first 1,000 cycles was measured, with only subtle changes over the remaining cycles.

The present disclosure provides a simple technique for the fabrication of supercapacitor arrays (e.g., for high voltage applications). The arrays can comprise interdigitated electrodes. The arrays can be integrated with solar cells for efficient energy harvesting and storage systems.

Three-Dimensional Interdigitated Microsupercapacitors

Microsupercapacitors with high capacity per footprint area may enable miniaturization of energy storage devices (e.g., for electronic applications). Greater areal capacities (e.g., than current state-of-the-art systems with areal capacities of <11.6 mF/cm$^2$ for carbons, <78 mF/cm$^2$ for conducting polymers, and <56.3 mF/cm$^2$ for metal oxides) may be needed. Engineering of 3D interdigitated microsupercapacitors with high energy density is described, for example, in relation to FIGS. 6A-I.

Figure 6A:
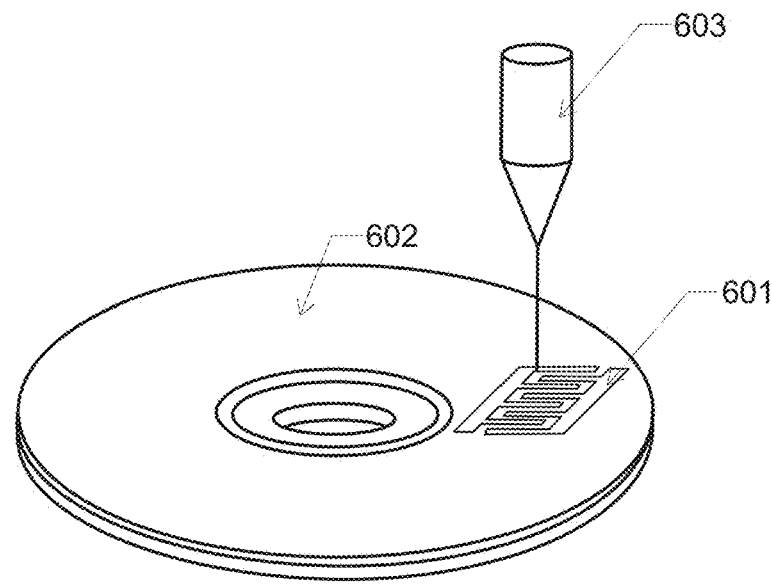
FIGS. 6A-C illustratively show an exemplary fabrication process for an asymmetric microsupercapacitor device based on LSG-MnO$_2$ as positive electrode and LSG as negative electrode, in accordance with some embodiments.
Figure 6B:
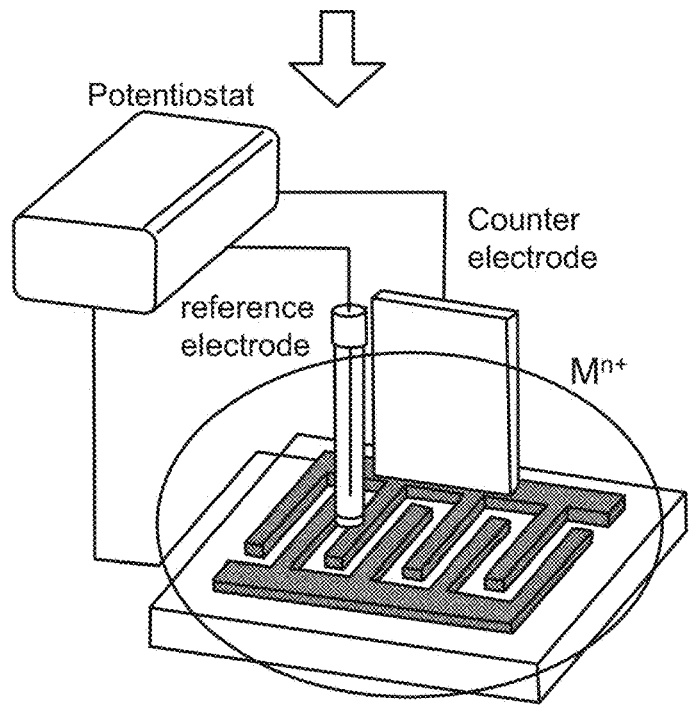
Figure 6C:
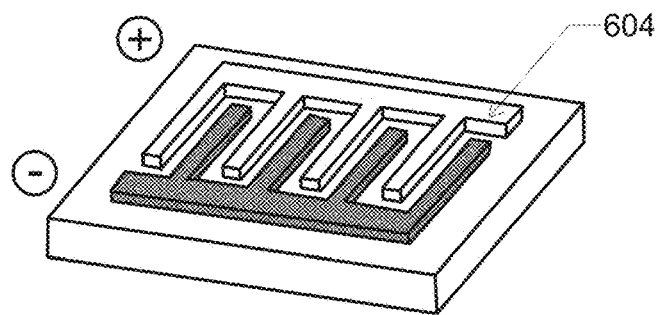

FIGS. 6A-C show an example of a hybrid microsupercapacitor in which the positive and negative electrodes are separated into a 3D interdigitated structure. This structure was achieved by combining the techniques of "top down" LightScribe lithography with "bottom up" selective electrodeposition. First, 3D interdigitated ICCN (e.g., LSG) microelectrodes are produced by the direct writing of graphene patterns 601 on GO films 602 using a consumer grade LightScribe DVD burner 603. Subsequently, MnO$_2$ nanoflowers 605 are selectively electrodeposited on one set of the ICCN (e.g., LSG) microelectrodes using a cell setup as described elsewhere herein. The width of the microelectrodes is adjusted to match the charge between the positive and negative poles of the microdevice.

FIG. 6D shows a digital photograph of an asymmetric microsupercapacitor 605 that consists of alternating positive and negative electrodes. The lighter microelectrodes correspond to bare ICCN (negative electrodes), whereas the other side turns darker in color after the electrodeposition of MnO$_2$ (positive electrodes).

FIG. 6E is an optical microscope image that shows a well-defined pattern and sharp boundaries between the microelectrodes. SEM further confirmed the conformal structure of this asymmetric microsupercapacitor.

FIG. 6F provides a magnified view at the interface between GO and graphene showing selective electrodeposition of MnO$_2$ on the graphene area only.

Figure 6G:
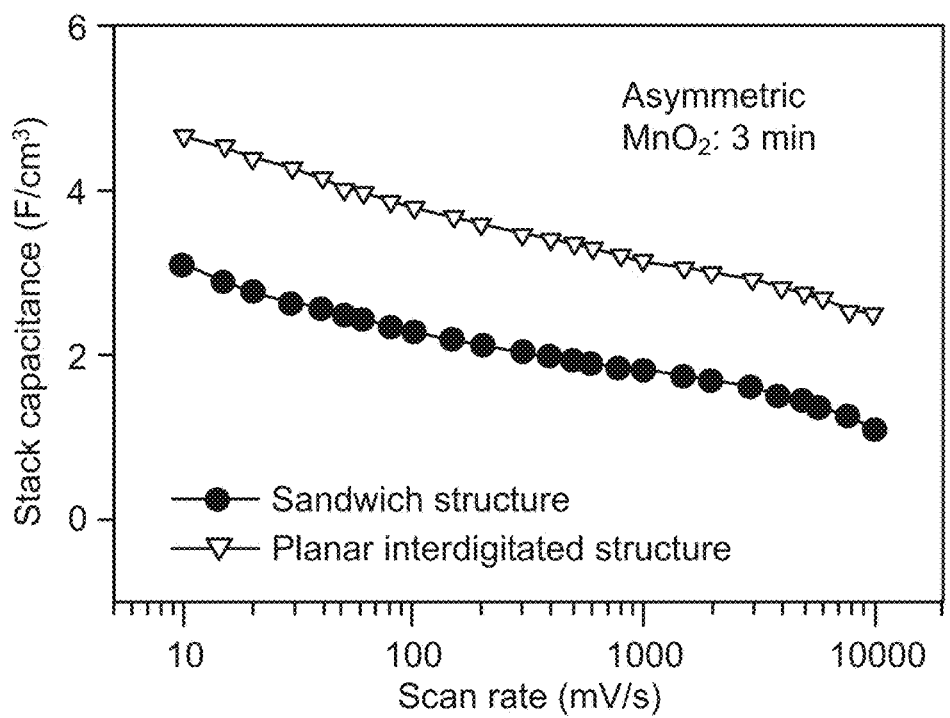
FIG. 6G provides an exemplary comparison of stack capacitance of the supercapacitor between the sandwich structure and the planar interdigitated structure for an asymmetric, MnO$_2$ deposition time 3 min device, in accordance with some embodiments.
Figure 6H:
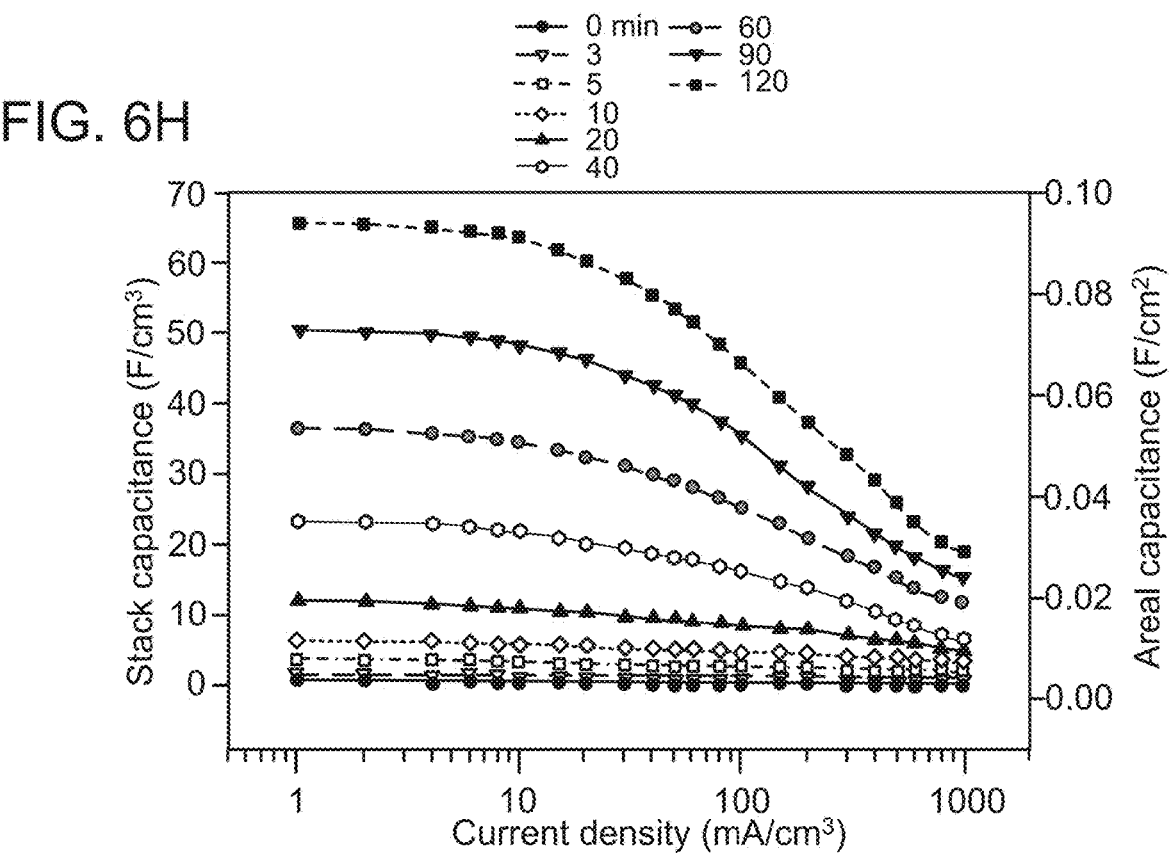
FIG. 6H provides the exemplary stack and areal capacitance of LSG-MnO$_2$ supercapacitors with deposition times of 0 to 120 minutes.
Figure 6I:
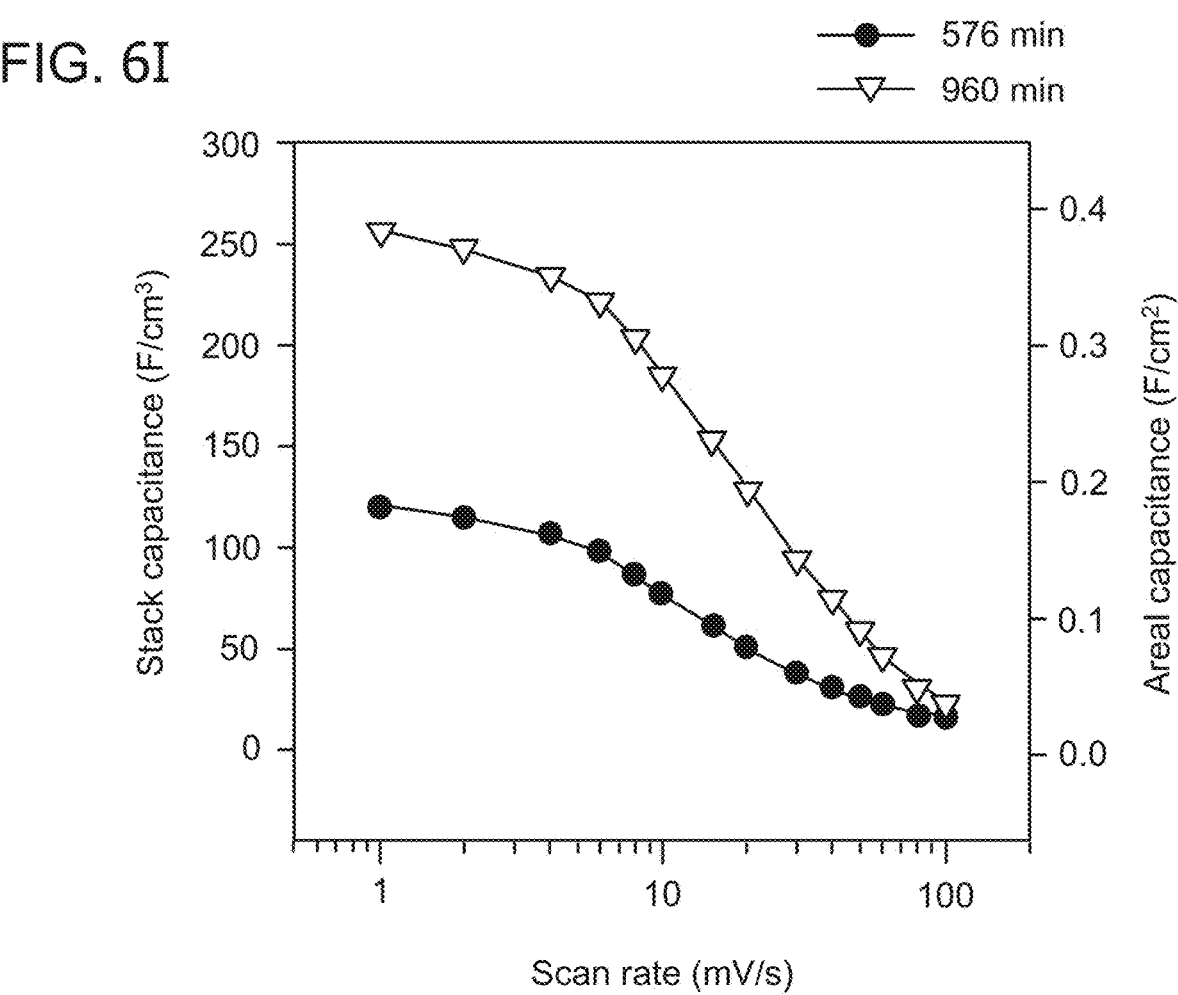
FIG. 6I provides the exemplary stack and areal capacitance of LSG-MnO$_2$ supercapacitors with deposition times of 576 and 960 minutes.

FIG. 6G provides examples of electrochemical characterization results showing that the asymmetric microsupercapacitor provides enhanced volumetric capacitance and rate capability compared to a sandwich-type asymmetric supercapacitor. Symmetric hybrid microsupercapacitors can show a similar behavior, as shown, for example, in FIGS. 6H-I, with the areal capacitance approaching about 400 mF/cm$^2$. In some examples, an interdigitated microsupercapacitor (e.g., comprising ICCN/MnO$_2$) has an areal capacitance of greater than or equal to about 10 mF/cm$^2$, 50 mF/cm$^2$, 100 mF/cm$^2$, 150 mF/cm$^2$, 200 mF/cm$^2$, 250 mF/cm$^2$, 300 mF/cm$^2$, 320 mF/cm$^2$, 340 mF/cm$^2$, 360 mF/cm$^2$, 380 mF/cm$^2$, 400 mF/cm$^2$, 420 mF/cm$^2$, 440 mF/cm$^2$, 460 mF/cm$^2$, 480 mF/cm$^2$, 500 mF/cm$^2$, 550 mF/cm$^2$, 600 mF/cm$^2$, 650 mF/cm$^2$, 700 mF/cm$^2$, 750 mF/cm$^2$, 800 mF/cm$^2$, 850 mF/cm$^2$, 900 mF/cm$^2$, 950 mF/cm$^2$, or 1,000 mF/cm$^2$. In some examples, an interdigitated microsupercapacitor (e.g., comprising ICCN/MnO$_2$) has an areal capacitance of about 300 mF/cm$^2$ to about 400 mF/cm$^2$, about 350 mF/cm$^2$ to about 450 mF/cm$^2$, about 380 mF/cm$^2$ to about 550 mF/cm$^2$, or about 600 mF/cm$^2$ to about 1,000 mF/cm$^2$. The stack capacitance significantly improves to about 250 F/cm$^3$ (volumetric capacitance per electrode is about 1197 F/cm$^3$) which is much higher than example values for EDLC, pseudo- and hybrid microsupercapacitors: e.g., 1.3 F/cm$^3$ for carbon onions, 2.35-3.05 F/cm$^3$ for graphene, 1.08 F/cm$^3$ for CNT, 3.1 F/cm$^3$ for graphene/CNT, 180 F/cm$^3$ (electrode) for carbide-derived carbon, 588 F/cm$^3$ for polyaniline nanofibers, 317 F/cm$^3$ (electrode) for vanadium disulfide nanosheets, and 178 F/cm$^3$ for molybdenum disulfide nanosheets (e.g., see TABLE 2).

Figure 13:
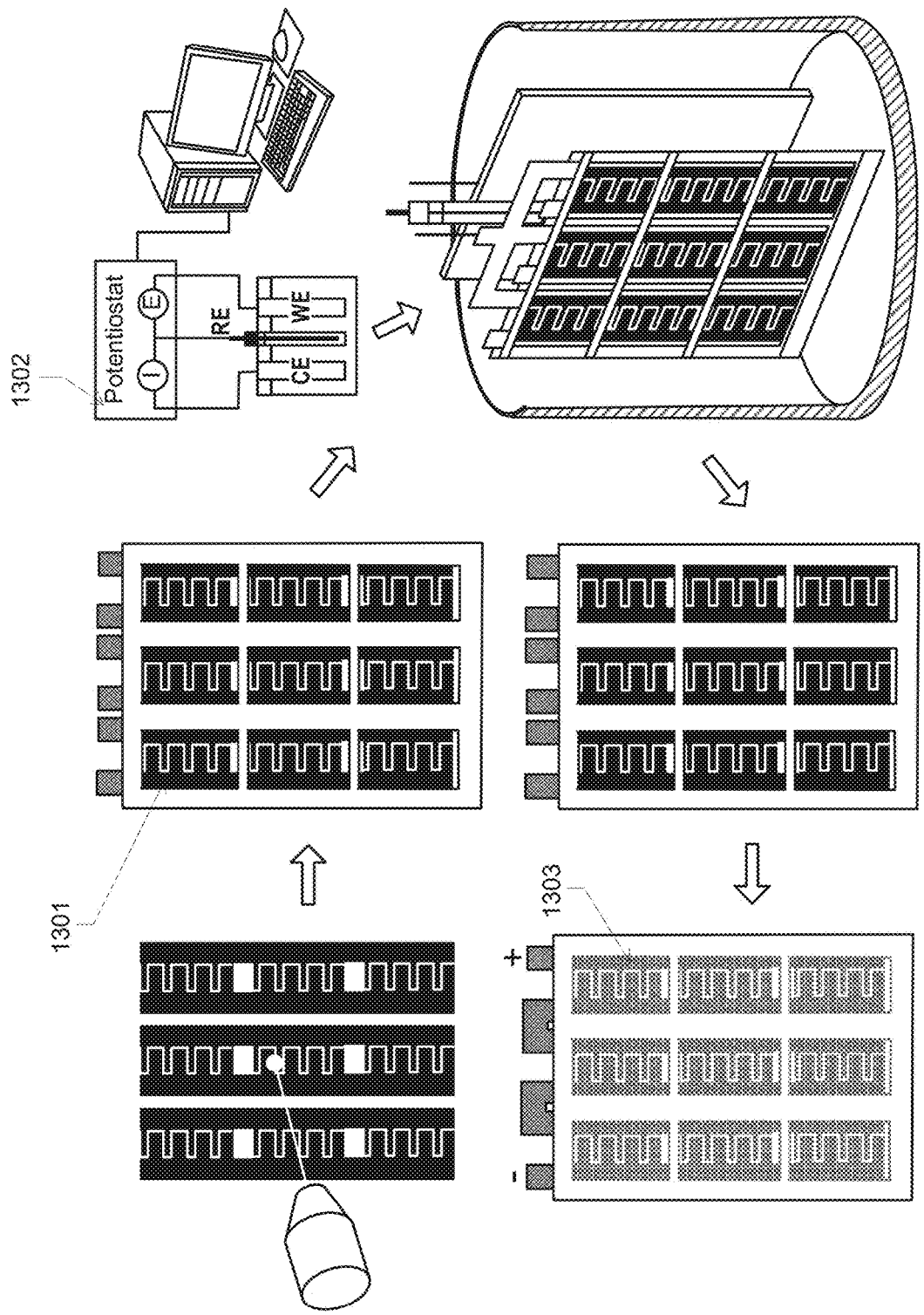
FIG. 13 schematically illustrates exemplary fabrication of an array of 9 asymmetric cells connected in series/parallel, in accordance with some embodiments.
Figure 14A:
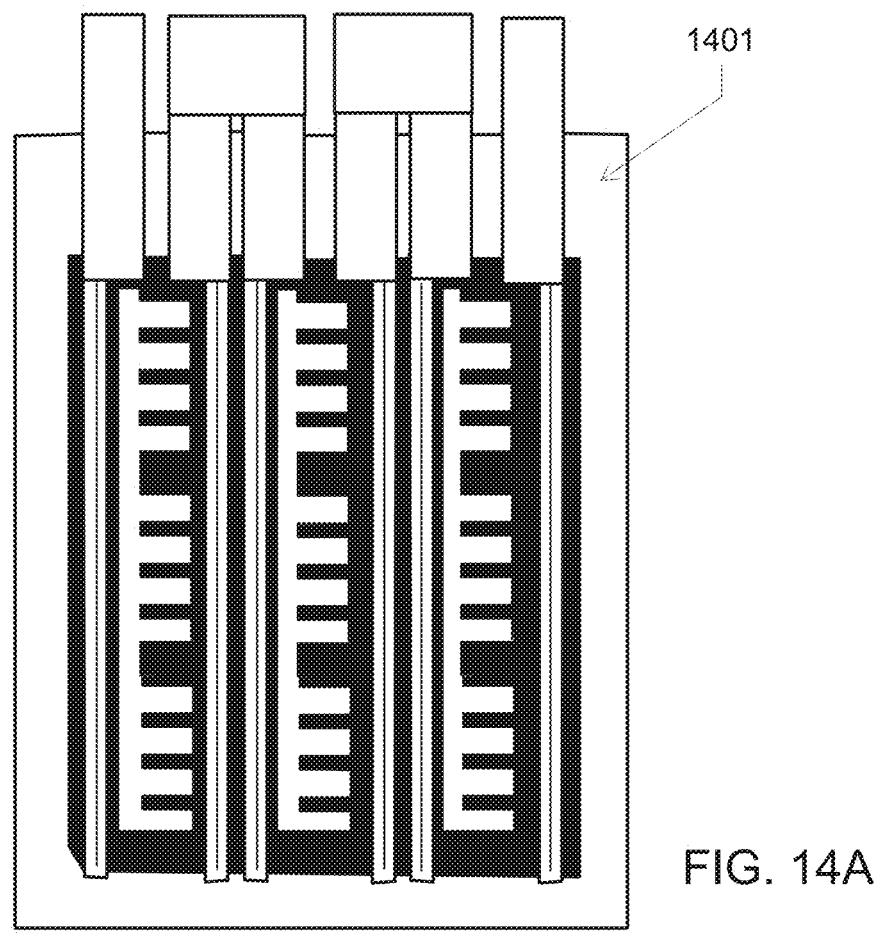
FIG. 14A shows an exemplary finished array of 9 asymmetric cells connected 3 in series×3 in parallel, in accordance with some embodiments.
Figure 14B:
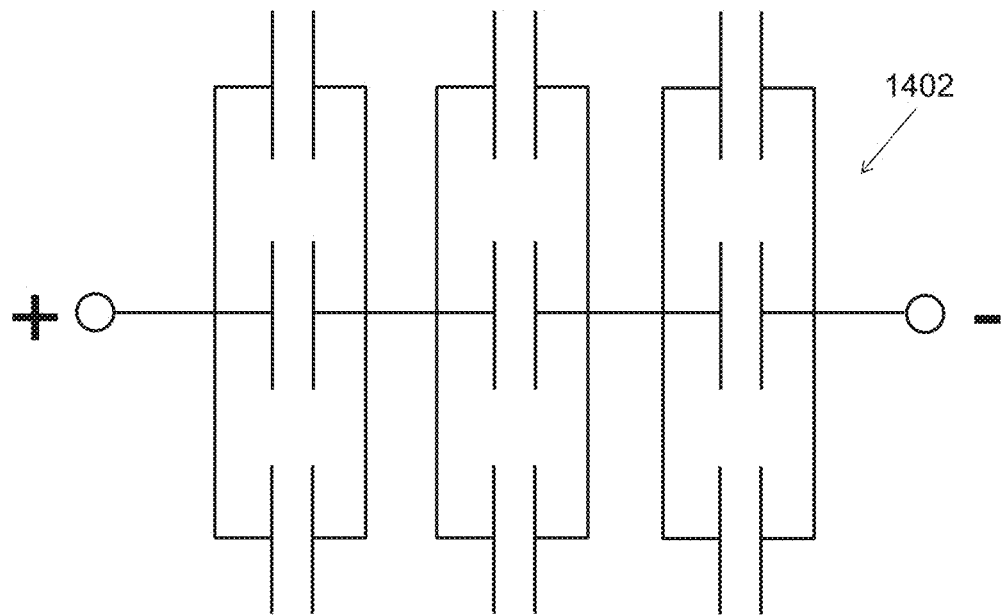
FIG. 14B shows an exemplary circuit illustration of the full microsupercapacitor array in accordance with some embodiments.

FIG. 14A shows the full microsupercapacitor array 1401 (e.g., as fabricated by the method of FIG. 13). FIG. 14B shows an exemplary circuit illustration of the full microsupercapacitor array 1401.

Figure 7:
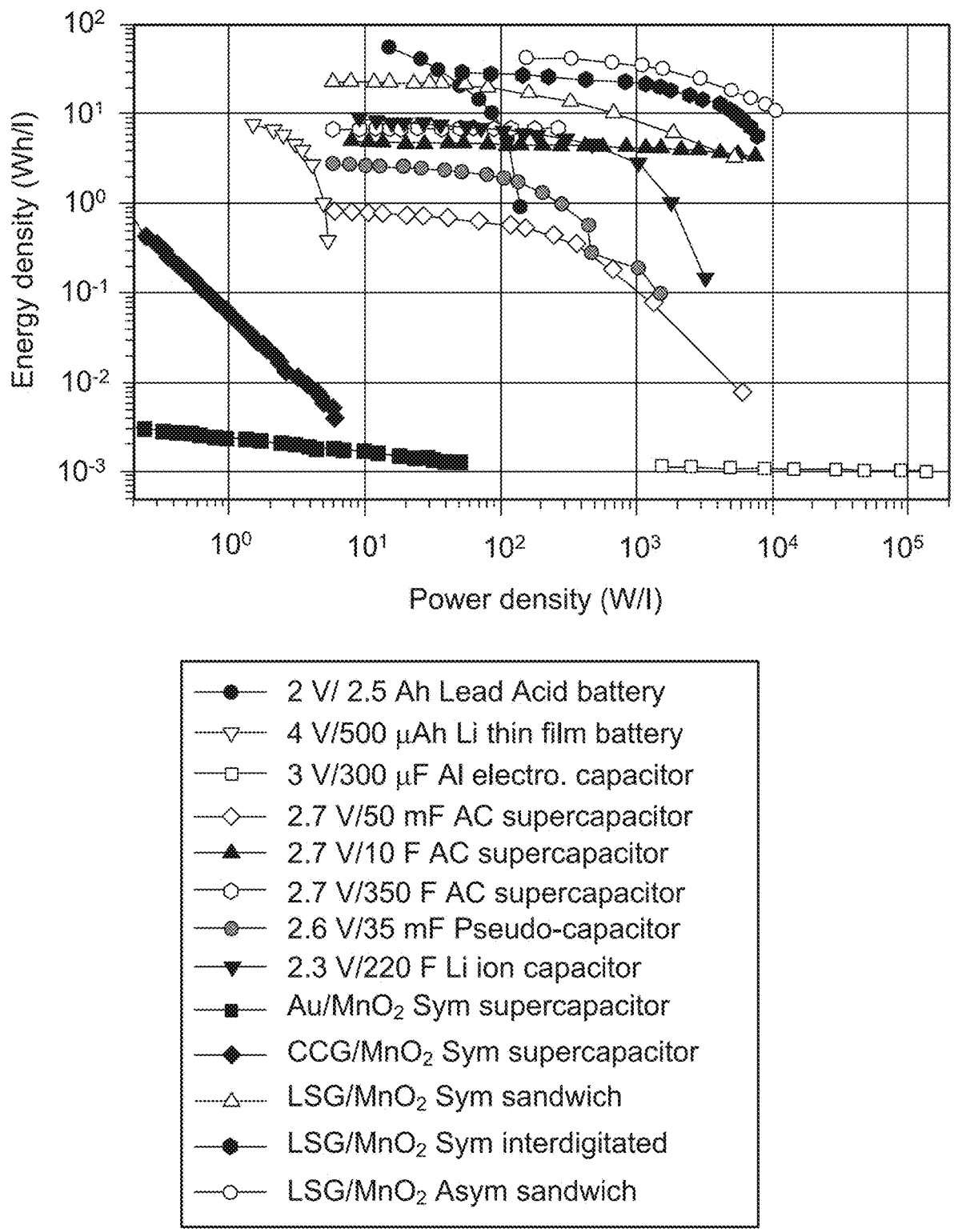
FIG. 7 shows an exemplary Ragone plot comparing energy and power density of LSG-MnO$_2$ supercapacitors with energy storage devices including a lead acid battery, a lithium thin-film battery, an aluminum electrolytic capacitor, activated carbon supercapacitors of variable sizes, a pseudocapacitor, and a lithium-ion hybrid capacitor, in accordance with some embodiments. Performance data for Au—MnO$_2$ and CCG-MnO$_2$ are also included which reveal the importance of the microstructure of the electrodes, in accordance with some embodiments.

FIG. 7 shows examples of energy and power density of LSG-MnO$_2$-based supercapacitors. FIG. 7 also shows examples of energy and power density of a number of commercially available carbon-based supercapacitors, pseudo-capacitors, hybrid supercapacitors, and Li-ion hybrid capacitors. These devices were tested under the same dynamic conditions as LSG-MnO$_2$. For all devices, the calculations were made based on the volume of the full cell that includes the current collector, active material, separator, and electrolyte. The energy density of the hybrid LSG-MnO$_2$ can vary, for example, between about 22 Wh/L and 42 Wh/L depending on the configuration (symmetric, asymmetric and sandwich, interdigitated) and the mass loading of MnO$_2$. In certain embodiments, the LSG-MnO$_2$ hybrid supercapacitors can store at least about 6 times the capacity of state-of-the-art commercially available EDLC carbon super-capacitors. In certain embodiments, LSG-MnO$_2$ hybrid supercapacitors can be superior to pseudocapacitors, hybrid supercapacitors (e.g., commercially available hybrid supercapacitors comprising NiOOH positive electrode and activated carbon negative electrode, or PbO$_2$ positive electrode and activated carbon negative electrode; in such systems, the positive electrode may have very low electrical conductivity and thus provide little to low power density and/or the negative electrode activated carbon may have limited ion diffusion rates because of its tortuous microporous structure; such systems may only be built in large size spirally wound structures and/or may not provide capability to build high-voltage cells), and/or supercapacitor-lithium-ion battery hybrid (Li-ion capacitors). In certain embodiments, the LSG-$MnO_2$ supercapacitors can provide power densities up to about 10 kW/l (e.g., about 100 times faster than high-power lead acid batteries and/or about 1,000 times faster than a lithium thin-film battery).

Supercapacitors, microsupercapacitors, and/or arrays of (micro) supercapacitors herein may maintain their capacitance at high charge-discharge rates. For example, an array of supercapacitors (e.g., an array of microsupercapacitors comprising ICCN/$MnO_2$) can maintain its capacitance (e.g., areal capacitance) even at high charge-discharge rates. In some embodiments, a supercapacitor, microsupercapacitor and/or array of (micro)supercapacitors herein may maintain its capacitance (e.g., areal capacitance) at a charge-discharge rate corresponding to a given current density and/or scan rate (e.g., a high rate may correspond to a given current density and/or scan rate). In some examples, a supercapacitor, microsupercapacitor and/or array of (micro)supercapacitors herein may maintain its capacitance (e.g., areal capacitance) at a current density of at least about 1,000 mA/$cm^3$, 5,000 mA/$cm^3$, or 10,000 mA/$cm^3$ (e.g., see FIG. 4F). In some examples, a supercapacitor, microsupercapacitor, and/or array of (micro)supercapacitors herein may maintain its capacitance (e.g., areal capacitance) at a current density of up to about 1,000 mA/$cm^3$, 5,000 mA/$cm^3$, or 10,000 mA/$cm^3$ (e.g., see FIG. 4F). In some examples, a supercapacitor, microsupercapacitor, and/or array of (micro) supercapacitors herein may maintain its capacitance (e.g., areal capacitance) at a scan rate of at least about 1,000 mV/s, 5,000 mV/s, or 10,000 mV/s (e.g., see FIGS. 6G-I with a scan rate of, for example, up to about 10,000 mV/second; in certain embodiments, this translates to a charge time of about 0.1 second and discharge time of about 0.1 second). In some examples, a supercapacitor, microsupercapacitor and/or array of (micro) supercapacitors herein may maintain its capacitance (e.g., areal capacitance) at a scan rate of up to about 1,000 mV/s, 5,000 mV/s, or 10,000 mV/s (e.g., see FIGS. 6G-I with a scan rate of, for example, up to about 10,000 mV/second; in certain embodiments, this translates to a charge time of about 0.1 second and discharge time of about 0.1 second). The supercapacitor, microsupercapacitor, and/or array of (micro) supercapacitors may maintain its capacitance at such current densities in combination with one or more such scan rates. In an example, an array of supercapacitors maintains its capacitance per footprint (e.g., at least about 380 mF/$cm^2$) even at a charge-discharge rate corresponding to (i) a current density of about 10,000 mA/$cm^3$ and/or (ii) a scan rate of up to about 10,000 mV/s.

TABLE 2 provides examples of electrochemical performance of microsupercapacitors (e.g., interdigitated microsupercapacitors). Microsupercapacitors may be, for example, interdigitated or micro-fibers. The microsupercapacitors in table TABLE 2 can include or be interdigitated microsupercapacitors. For example, the microsupercapacitors in TABLE 2 can all be interdigitated microsupercapacitors. Ionogel (row 3) refers to I-butyl-3-methylimidazolium bis(trifluoromethylsulfonyl)imide ionic liquid gelled with fumed silica nanopowder. The LSG-$MnO_2$ electrode material (row 12) may be as described herein.

TABLE 2

| | Electrode Material | Cell Type | Voltage window | Electrolyte | Specific capacitance Per Footprint area (mF/$cm^2$) | Volumetric (F/$cm^3$) |
|---|---|---|---|---|---|---|
| 1 | Carbon onions | Full cell | 3.0 V | $TEABF_4$/PC | 1.7 | 1.35 |
| 2 | Graphene | Full cell | 1.0 V | PVA-$H_2SO_4$ | 2.32 | 3.05 |
| 3 | Graphene | Full cell | 2.5 V | Ionogel | 1.78 | 2.35 |
| 4 | Graphene-CNT carpet | Full cell | 1.0 V | 1.0M $Na_2SO_4$ | 2.16 | 1.08 |
| 5 | Graphene/CNT | Full cell | 1.0 V | 3.0M KCl | 5.1 | 3.1 |
| 6 | Carbide-derived carbon | Full cell | 2.3 V | $TEABF_4$/AN | — | 180 |
| 7 | Polyaniline nanowires | Full cell | 1.0 V | 1.0M $H_2SO_4$ | — | 588 |
| 8 | Activated cabon-$MnO_2$ | Full cell | 1.0-1.5 V | 0.2M $K_2SO_4$ | 21.3-30 | — |
| 9 | $MnO_2$ | Full cell | 1.0 V | 0.2M $K_2SO_4$ | 28.3 | — |
| 10 | $VS_2$ nanosheets | Full cell | 0.6 V | PVA-$BMIMBF_4$ | 4.76 | 317 |
| 11 | $MoS_2$ nanosheets | Full cell | 0.5 V | — | 8 | 178 |
| 12 | LSG/$MnO_2$ | Full cell | 0.9 V | 1.0M $Na_2SO_4$ | 384 | 1136.5 |

Figure 8A:
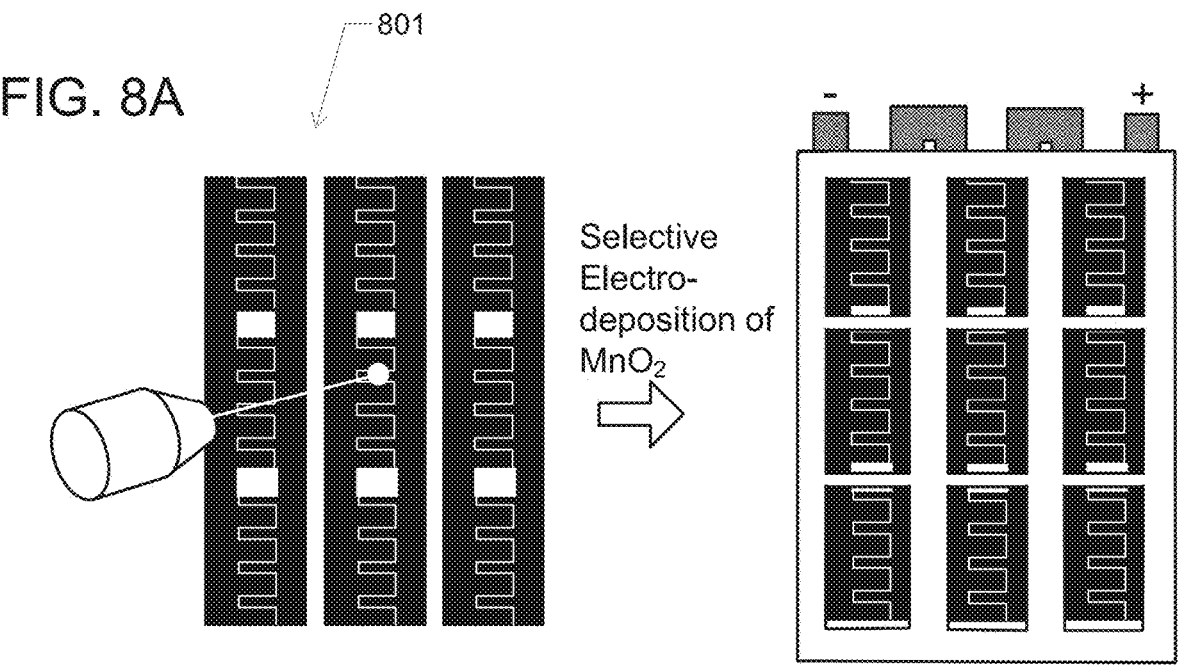
FIG. 8A schematically illustrates exemplary direct fabrication of an asymmetric supercapacitor array consisting of 9 cells in a single step
Figure 8B:
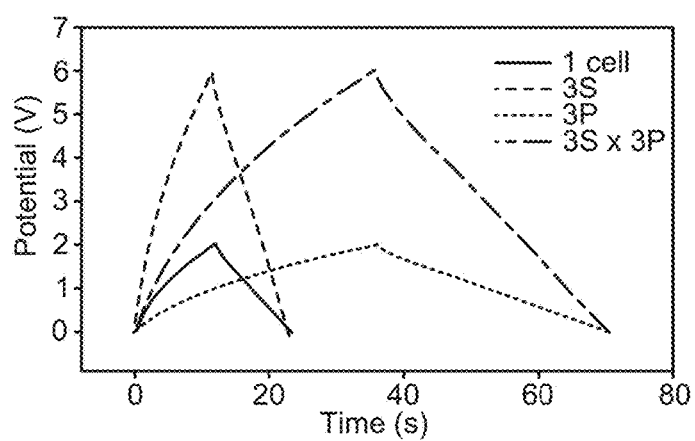
FIG. 8B shows charge-discharge curves of asymmetric supercapacitor arrays connected in series (3 cells in series, 3S), in parallel (3 cells in parallel, 3P), and in a combination of series and parallel (3 series×3 parallel, 3S×3P), in accordance with some embodiments, and a single device (1 cell) for comparison, in accordance with some embodiments.

The present disclosure provides methods for direct fabrication of supercapacitor (e.g., microsupercapacitor) arrays for high voltage applications and integrated energy storage (e.g., as described in relation to FIGS. 8A-B).

FIG. 8A shows an array of separate electrochemical cells 801 directly fabricated in the same plane and in one step (e.g., see also FIGS. 12-16). In some embodiments, all cells (e.g., in the array) may be fabricated simultaneously in one step. This configuration may show very good control over the voltage and/or current output. In some embodiments, the array can be an asymmetric supercapacitor array. FIG. 8B also shows charge-discharge curves of examples of asymmetric supercapacitor arrays; a single device is shown for comparison. An enlarged image and additional description of the charge-discharge data is provided in relation to FIG. 17. These arrays can offer the flexibility of controlling the output voltage and current of the array. For example, compared with a single device with an operating voltage of about 2 V, an array of 3 serial cells can extend the output voltage to about 6 V, whereas the output capacity (runtime) can be increased by a factor of about 3 using an array of 3 cells connected in parallel (e.g., see FIG. 17). By using an array of 3 strings in parallel and 3 strings in series, the output voltage and current can both be tripled.

Figure 8C:
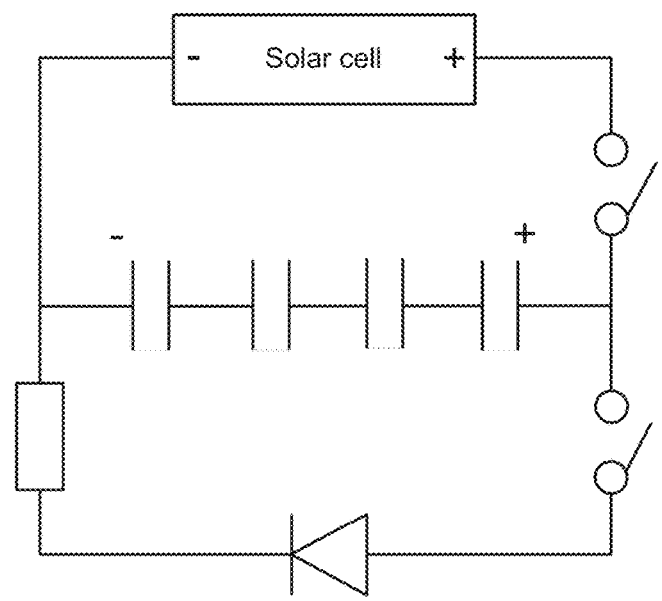
FIG. 8C schematically illustrates an exemplary integration of a supercapacitor array with solar cells for efficient solar energy harvesting and storage, in accordance with some embodiments.
Figure 8D:
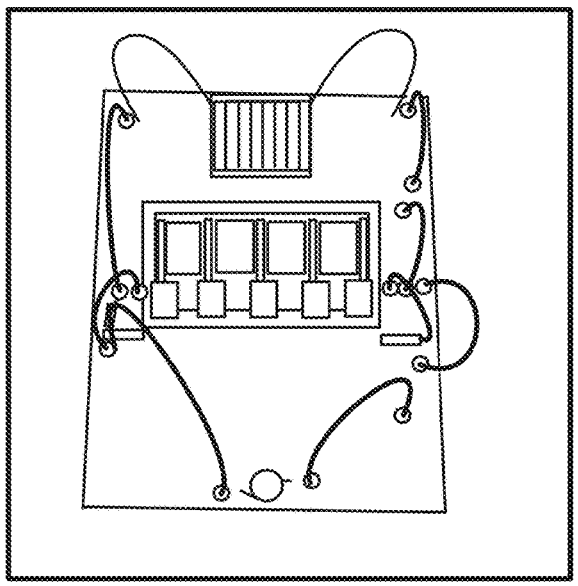
FIG. 8D schematically illustrates an exemplary integration of a supercapacitor array with solar cells in sun and at night, in accordance with some embodiments.
Figure 8D:
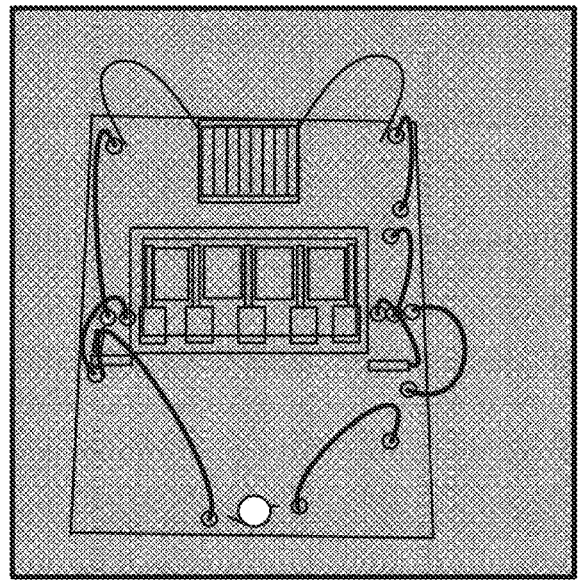

FIG. 8C shows that this array can be (e.g., in addition) integrated (or coupled) with one or more solar cells for efficient solar energy harvesting and storage. The microsupercapacitor array can store the energy produced by the solar cell during the day and release it later whenever needed. Such a module may be applied in a variety of applications, such as, for example, for self-powered street lighting. ICCN/$MnO_2$ (e.g., LSG-$MnO_2$) hybrid supercapacitors can be integrated with solar cells (e.g., in one unit) for efficient solar energy conversion and storage. Per FIG. 8D, solar energy can be stored in an LSG-$MnO_2$ supercapacitor pack during the day, and charged supercapacitors can provide power after sundown. Example applications can include off-grid solar/supercapacitor power systems.

Direct Fabrication of Hybrid Microsupercapacitor Array for High Voltage Applications Supercapacitors may be used in a variety of applications, including, for example, in applications where a large amount of power is needed for a short period of time, where a very large number of charge/discharge cycles is required and/or where a longer lifetime is required. Traditional capacitors used for general electronics applications may range from a few volts to 1 kV. The working voltage of supercapacitors may be lower (e.g., very low or <3 volts). To meet the high voltage requirements, supercapacitors can be put into a bank of cells connected together in series. This can result in bulky supercapacitor modules which can cause problems, for example, in applications where the total size of the power source is critical. The present disclosure provides an array of separate electrochemical cells directly fabricated in the same plane as shown, for example, in FIGS. 12-16 (e.g., to overcome these and/or other limitations).

In some embodiments, a method to fabricate the array of separate electrochemical cells may include a first step of fabricating an ICCN and a second step of depositing $MnO_2$.

Figure 12:
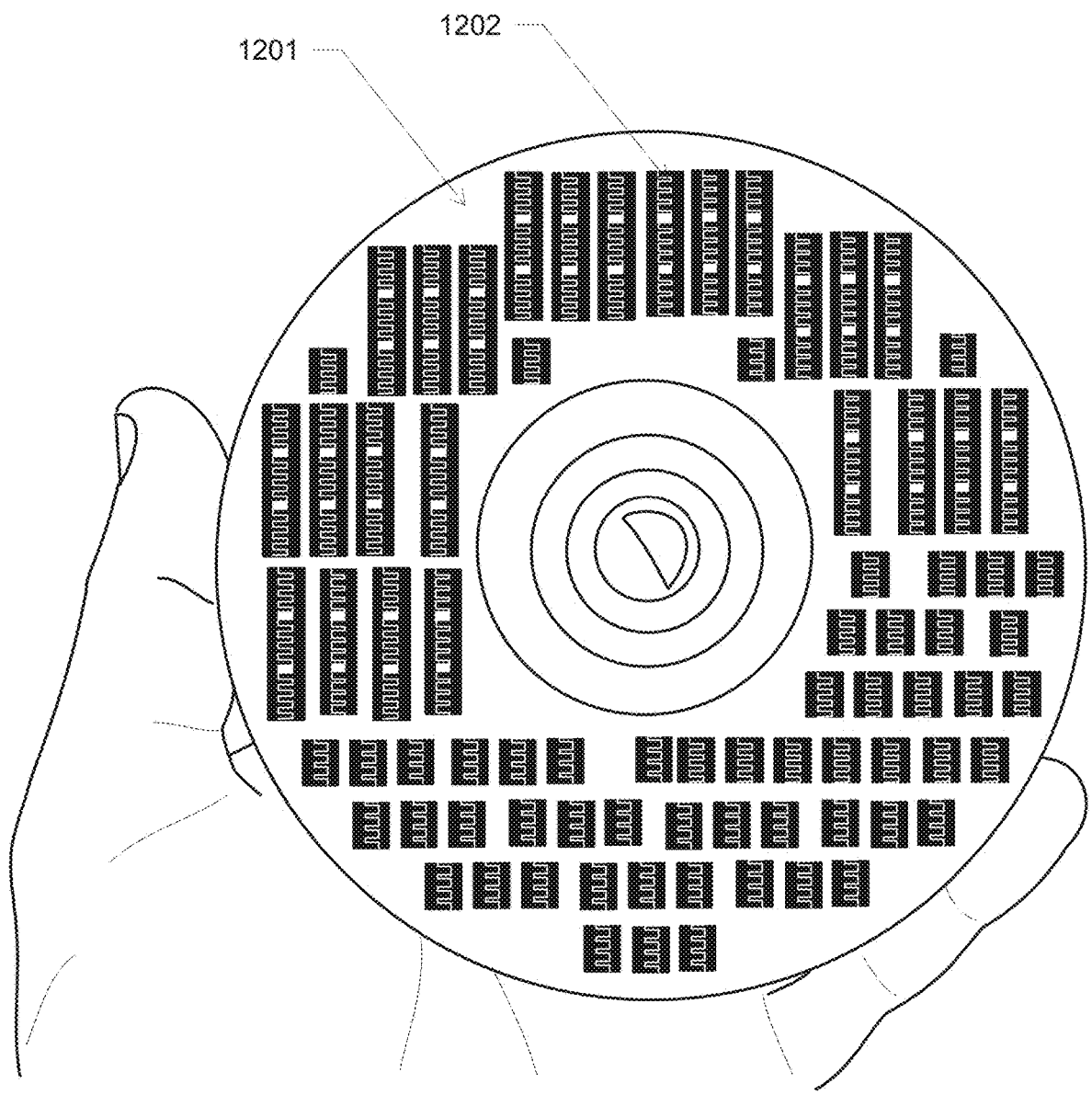
FIG. 12 is an example of a light scribed writing LSG microsupercapacitor array, in accordance with some embodiments.

Circuits can be designed using appropriate computer software and can be directly patterned on a graphite oxide film coated on a DVD disc. FIG. 12 shows a DVD 1201 after direct writing of ICCN (e.g., LSG) patterns 1202 configured (e.g., designed) to achieve symmetric and asymmetric microsupercapacitor arrays. The pattern can be designed, for example, with Microsoft Paint software and then directly patterned on a GO-coated DVD disc. In an example, the device can comprise (e.g., consist of), for example, 8 in-plane microelectrodes (4 positive and 4 negative) separated by nearly or substantially insulating GO. The distance between the microelectrodes can be suitably or sufficiently short (e.g., close enough) to keep the ion-transport pathway short. In another example, patterns may be designed to make a supercapacitor bank of series/parallel combinations in order to meet the voltage (series) and current (parallel) requirements of the system on which they are to be integrated (or to which they are to be coupled).

Deposition of $MnO_2$ nanoflowers (e.g., performed as a second step) may comprise a deposition process that varies depending on whether a symmetric or an asymmetric array is being fabricated. Examples of such processes are described in relation to FIGS. 13-14 (for an asymmetric array) and FIG. 15 (for a symmetric array).

FIG. 13 schematically illustrates fabrication of an array of 9 asymmetric cells 1301 connected in series/parallel. A plain ICCN array can be fabricated first (e.g., as explained in relation FIG. 12). In this example, the graphene pattern is designed to make an array of 9 cells 1301 (3 in parallel×3 in series). This can be followed by electrodeposition of $MnO_2$ 1303 in a three electrode cell as schematically illustrated in FIG. 13. For an asymmetric supercapacitor, the deposition can be controlled to go on three sets of microelectrodes (e.g., the positive electrodes) while the other three are kept intact (e.g., the negative electrodes). The deposition can be controlled such that, for example, electrodeposition occurs only on the three electrodes that are electrically connected to the power source 1302 while the other electrodes are not connected. The $MnO_2$ 1303 deposition can occur on the 9 cells at the same time. The fabrication of the supercapacitor array may therefore take approximately (e.g., almost) the same time as a single cell without the need for further processing. In some examples, at least about 2, 3, 4, 5, 6, 7, 8, 9, 10, 15, 20, 25, 50, 75, 100, 150, 200, 250, 500, 750, 1,000, 2,000, 5,000, 10,000, 20,000, 50,000, 75,000, or 100,000 cells may be electrodeposited or fabricated in substantially the same time as a single cell fabricated by a different method. After the deposition is complete, the supercapacitor array may be thoroughly washed with de-ionized (DI) water and/or electrolyte may be added onto each of the cells.

Figure 15:
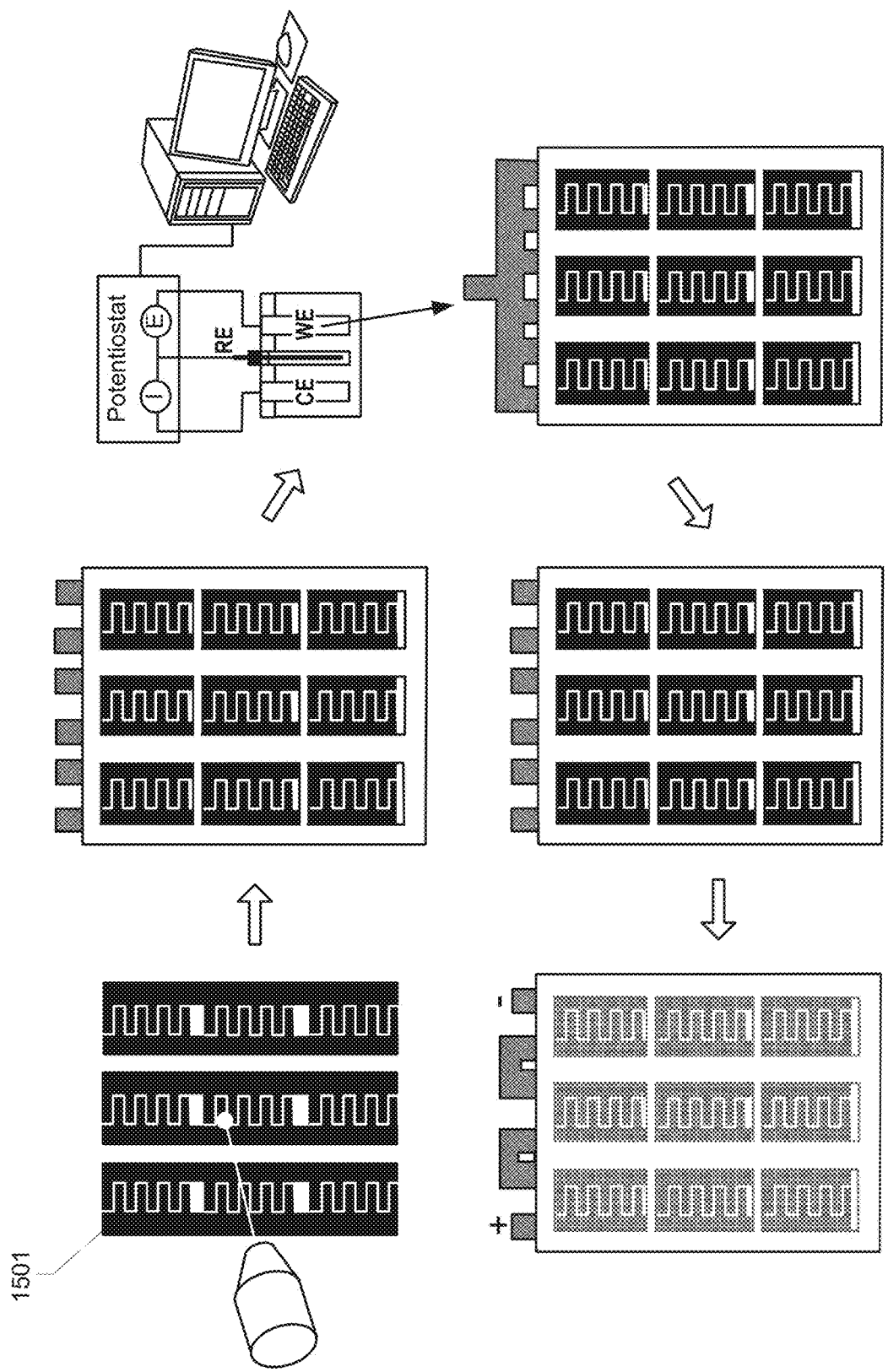
FIG. 15 schematically illustrates exemplary fabrication of an array of 9 symmetric supercapacitors connected in series and/or parallel, in accordance with some embodiments.

FIG. 15 schematically illustrates fabrication of an array of 9 symmetric supercapacitors 1501 connected in series and/or parallel. The fabrication method can be similar to that of FIG. 13 except that all six sets of microsupercapacitor electrodes act as the working electrode during the deposition of $MnO_2$ instead of the three shown in FIG. 13.

Figure 16:
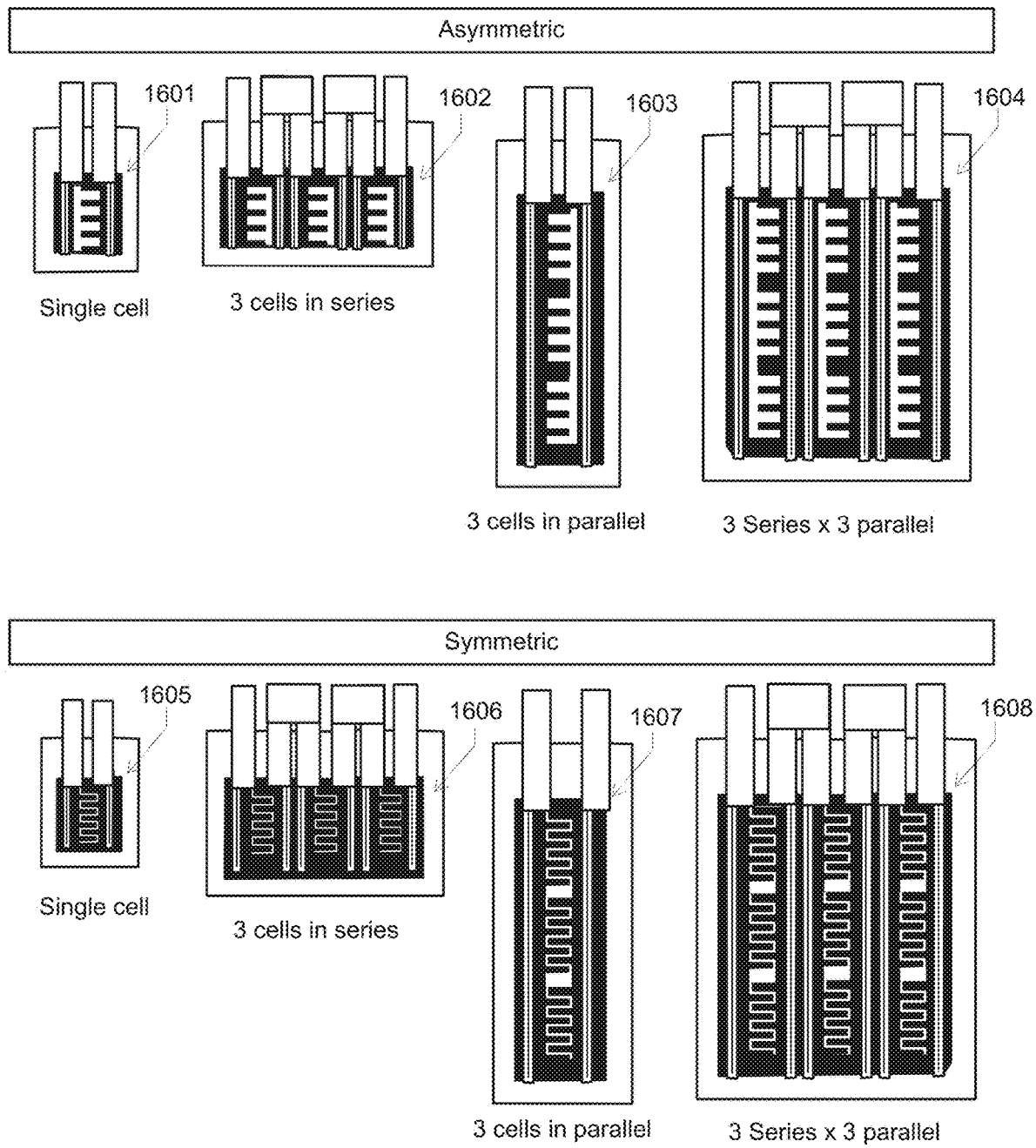
FIG. 16 shows examples of supercapacitor arrays that are connected in series, parallel and in combinations of the two, in accordance with some embodiments.

FIG. 16 shows a full set of symmetric and asymmetric supercapacitor arrays (e.g., microsupercapacitor arrays). The examples include a single asymmetric cell 1601, an array of 3 asymmetric cells in series 1602, an array of 3 asymmetric cells in parallel 1603 and an array of 3 series×3 parallel asymmetric cells 1604 (from left to right, top), and a single symmetric cell 1605, an array of 3 symmetric cells in series 1606, an array of 3 symmetric cells in parallel 1607 and an array of 3 series×3 parallel symmetric cells 1608 (from left to right, bottom). A gel electrolyte may be used to prevent leakage into other cells in the array.

Figure 17:
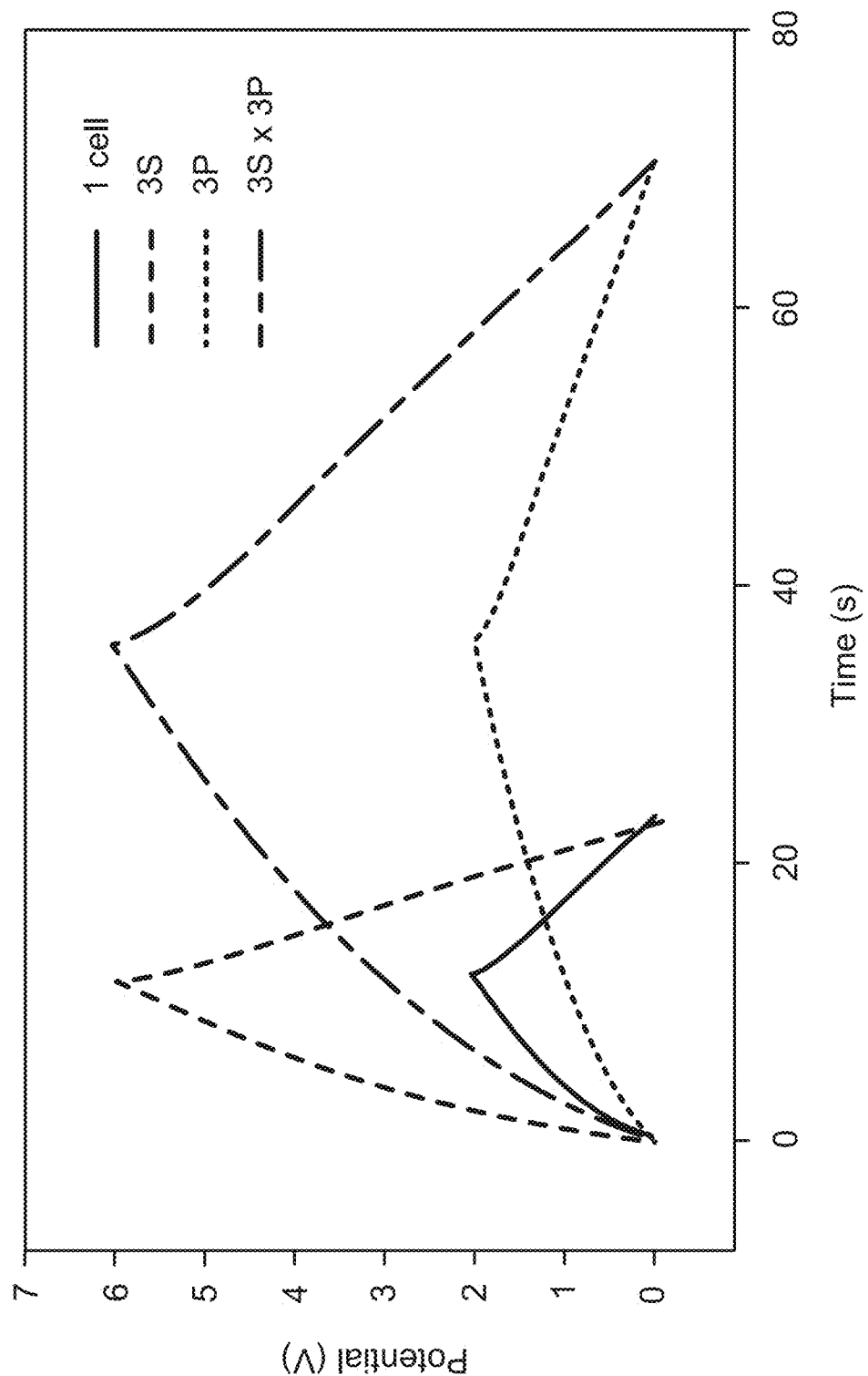
FIG. 17 shows examples of electrochemical performance of asymmetric supercapacitor arrays, in accordance with some embodiments.

FIG. 17 shows examples of electrochemical performance of asymmetric supercapacitor arrays (e.g., the asymmetric supercapacitor arrays in FIG. 16 (top)). Galvanostatic charge/discharge curves of asymmetric supercapacitor arrays connected in series ("3S") (e.g., 3 cells in series), in parallel ("3P") (e.g., 3 cells in parallel), and in a combination of series and parallel ("3S×3P") (e.g., 3 series×3 parallel cells) are shown. A single device ("1 cell") is shown for comparison. Compared with the single device with an operating voltage of about 2 V, the serial connection can extend the output voltage to about 6 V (e.g., by a factor of about 3 at about the same output capacity (runtime)) and the parallel connection can increase the output capacity (runtime) by a factor of about 3 (e.g., at about the same output voltage). By using a combination of series/parallel connections (e.g., 3S×3P), the output voltage and current can both be increased (e.g., each by a factor of about 3 (tripled)).

The number of cells in a high-voltage supercapacitor array can be increased from, for example, a string of 3 cells (e.g., 3S and/or 3S×3P in FIG. 17) to reach an operating voltage of, for example, at least about 100 V or other voltage(s) described elsewhere herein (e.g., in relation to high-voltage devices). For example, a high-voltage supercapacitor array (e.g., comprising ICCN/$MnO_2$) can have a voltage (e.g., operating voltage) of greater than or equal to about 5 V, 10 V, 15 V, 20 V, 30 V, 40 V, 50 V, 60 V, 70 V, 80 V, 90 V, 100 V, 110 V, 120 V, 130 V, 140 V, 150 V, 160 V, 170 V, 180 V, 190 V, 200 V, 210 V, 220 V, 230 V, 240 V, 250 V, 260 V, 270 V, 280 V, 290 V, 300 V, 310 V, 320 V, 330 V, 340 V, 350 V, 360 V, 370 V, 380 V, 390 V, 400 V, 410 V, 420 V, 430 V, 440 V, 450 V, 460 V, 470 V, 480 V, 490 V, 500 V, 510 V, 520 V, 530 V, 540 V, 550 V, 560 V, 570 V, 580 V, 590 V, 600 V, 650 V, 700 V, 750 V, 800 V, 850 V, 900 V, 950 V, 1,000 V, 1,050 V, 1,100 V, 1,150 V, 1,200 V, 1,250 V, 1,300 V, 1,350 V, 1,400 V, 1,450, or 1,500 V. Such voltages may be promising for a variety of applications. The voltage may be advantageously adapted for a variety of applications.

Integration with Solar Cells

Solar power (e.g., solar cells; implementation in more energy efficient buildings and/or smart cities) may be combined (e.g., coupled or integrated) with an energy storage system. When combined with an energy storage system for storing energy during the day, solar cells can be used to make self-powered systems that are promising for streetlight, industrial wireless monitoring, transportation, and/or consumer electronics applications. In some implementations, chemical batteries can be used in such systems (e.g., due to their high energy density). In some implementations, supercapacitors can be used in such system s (e.g., as alternatives to batteries because they can capture energy more efficiently due to their short response time). Such modules may benefit from or require energy densities that are higher than the energy density of existing supercapacitors.

The present disclosure provides supercapacitors, microsupercapacitors, and/or other devices that may be integrated with solar cells. For example, a microsupercapacitor array can be integrated with solar cells (e.g., for simultaneous solar energy harvesting and storage). In some embodiments, such devices (e.g., arrays of microsupercapacitors) may achieve high voltages and/or high currents. In some embodiments, such devices (e.g., hybrid supercapacitors or microsupercapacitors) may provide higher energy density. In some embodiments, such devices (e.g., hybrid microsupercapacitors) may provide any combination of high voltage, high current, higher energy density, and other characteristics (e.g., as described elsewhere herein). For example, since ICCN-$MnO_2$ (e.g., LSG-$MnO_2$) hybrid supercapacitors can provide higher energy density and because they can be fabricated in arrays with high voltage and current ratings, they can be integrated with solar cells for highly efficient energy harvesting and storage. An example of an ICCN-$MnO_2$ microsupercapacitor array integrated with one or more solar cells may be as described in relation to FIGS. 8A-B. In some embodiments, solar cells may be grouped (e.g., in modules, panels and/or arrays). A solar cell array may comprise one or more groups of solar cells (e.g., modules and/or panels). A solar cell or a group or array of solar cells (e.g., comprising a plurality of solar cells) may be integrated or coupled (e.g., integrated in one unit, or integrated, interconnected or coupled as separate units) with one or more supercapacitors, microsupercapacitors, and/or other devices described herein.

Supercapacitors, microsupercapacitors, and/or other devices herein may be in electrical communication with one or more solar cells. The devices (e.g., microsupercapacitors) and/or the solar cell(s) may be configured in a group or array. In some embodiments, an array of microsupercapacitors (e.g., interdigitated microsupercapacitors comprising at least one electrode comprising ICCN/$MnO_2$) may be in electrical communication with one or more solar cells (e.g., a solar cell array). Individual solar cells (e.g., in a solar cell array) may have a given voltage. An array or group of such solar cells may have a voltage that depends on the interconnection (e.g., series and/or parallel) of the solar cells. The voltage of the solar cell group or array may be matched to the voltage of the microsupercapacitor (e.g., hybrid microsupercapacitor) array. Any aspects of the disclosure described in relation to one or more solar cells may equally apply to a group (e.g., an array, module, and/or panel) of solar cells at least in some configurations, and vice versa. In certain embodiments, a group of solar cells (e.g., a solar cell array) may have a voltage of greater than or equal to about 5 V, 10 V, 12 V, 15 V, 17 V, 20 V, 25 V, 50 V, 75 V, 100 V, 125 V, 150 V, 175 V, 200 V, 250 V, 500 V, 750 V, 1,000 V, 1,050 V, 1,100 V, 1,150 V, 1,200 V, 1,250 V, 1,300 V, 1,350 V, 1,400 V, 1,450, or 1,500 V. In certain embodiments, the group of solar cells (e.g., a solar cell array) may comprise at least about 1, 2, 6, 8, 10, 12, 14, 16, 18, 20, 25, 50, 75, 100, 150, 200, 250, 300, 350, 400, 450, 500, 550, 600, 650, 700, 750, 800, 850, 900, 950, 1,000, 2,000, 3,000, 4,000, 5,000, 10,000, 15,000, or more solar cells.

A solar cell (e.g., one or more solar cells in a group or array of solar cells) may be of a given type (e.g., polymer and/or transparent organic photovoltaic cells, perovskite cells, organic cells, inorganic semiconductor cells, multi-junction or tandem solar cells, or any combination thereof). Solar cell(s) may be of a single junction type (e.g., comprising a single layer of light-absorbing material) or multi-junction type (e.g., comprising multiple physical configurations configured for various absorption and charge separation mechanisms). In some embodiments, solar cell(s) can comprise (e.g., wafer-based) crystalline silicon (e.g., polysilicon or monocrystalline silicon). In some embodiments, solar cell(s) can be thin film solar cells comprising, for example, amorphous silicon, cadmium telluride (CdTe), copper indium gallium selenide (CIGS), silicon thin film (e.g., amorphous silicon), or gallium arsenide thin film (GaAs). In some embodiments, solar cell(s) may comprise other thin films and/or use organic materials (e.g., organometallic compounds) as well as inorganic substances. In certain embodiments, solar cell(s) may include, for example, one or more of perovskite solar cells, liquid ink cells (e.g., using kesterite and perovskite), cells capable of upconversion and downconversion (e.g., comprising lanthanide-doped materials), dye-sensitized solar cells, quantum dot solar cells, organic/polymer solar cells (e.g., organic solar cells and polymer solar cells), and adaptive cells. In some embodiments, solar cell(s) may be multi-junction or tandem cells. Further, in some embodiments, various combinations of the aforementioned solar cell types may be implemented (e.g., in a given array).

In certain embodiments, examples of solar cells may include, but are not limited to, for example, cells comprising conjugated polymers (e.g., polymers containing electron conjugated units along main chain); semi-transparent, transparent, stacked or top-illuminated organic photovoltaic cells (e.g., combining a metal nanowire network with metal oxide nanoparticles to form silver-nanowire-based composite transparent conductors that are solution-processed onto organic or polymeric photovoltaic active layers under mild processing conditions); transparent organic solar cells (e.g., visibly transparent organic photovoltaic cells); cells comprising perovskite hybrid (e.g., organic-inorganic perovskite) materials (e.g., comprising organic-inorganic thin films fabricated through a solution process followed by a vapor treatment); perovskite-based cells employing non-doped small molecule hole transport materials (e.g., based on perovskite materials and using solution processable polymer materials as the hole and electron transport layers); amorphous silicon and polymer hybrid tandem photovoltaic cells (e.g., hybrid and/or hybrid tandem inorganic-organic solar cells fabricated by, for example, roll-to-roll manufacturing techniques); perovskite solar cells with all solution processed metal oxide transporting layers; organic solar cells; tandem solar cells; transparent solar cells; single-junction or other cells comprising conjugated polymers with selenium substituted diketopyrrolopyrrole unit (e.g., comprising a low-bandgap polymer); organic tandem photovoltaic devices connected by solution processed inorganic metal and metal oxide (e.g., comprising an interconnecting layer fabricated using a metal and metal oxide nanoparticle solution); organic photovoltaic devices incorporating gold/silica core/shell nanorods into a device active layer (e.g., devices fabricated through solution-based processing and enabling plasmonic light trapping); multiple donor/acceptor bulk heterojunction solar cells; cells (e.g., metal chalcogenide cells, such as, for example, $CuInSe_2$ cells) comprising a transparent charge collection layer (e.g., a solution processable window layer comprising titanium oxide); cells comprising electrodes comprising a highly conductive Ag nanowire mesh composite film with suitable transparency and mechanical, electrical, and optical properties (e.g., formed by a solution-based method to improve nanowires connection); cells comprising solution-processed silver nanowire-indium tin oxide nanoparticle films as a transparent conductor; cells comprising solution processed silver nanowire composite as a transparent conductor (e.g., a silver nanowire composite coating prepared using a sol-gel process as a transparent contact); copper indium gallium (di)selenide (CIGS) cells (e.g., CIGS solar cells solution-deposited by spray-coating); polarizing organic photovoltaic-based cells (e.g., tandem solar cells); cells comprising kesterite copper zinc tin chalcogenide films (e.g., fabricated through solution synthesis and deposition); or any combination thereof.

In some embodiments, a solar cell (e.g., one or more solar cells in a group or array of solar cells) and/or a group or array of solar cells may have an efficiency (e.g., energy or power conversion efficiency) of at least about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, or more. In certain embodiments, the solar cell(s) may have an efficiency of at least about 7%, 10.5%, 13.5%, or 15%, or from about 5% to about 7%.

Materials and Methods
Synthesis of $LSG-MnO_2$, $Au/MnO_2$, and $CCG/MnO_2$ Electrodes In one example, the LSG framework was prepared by focusing a laser beam on a DVD disc coated with graphite oxide. In an example, the laser beam is provided by a LightScribe DVD burner (GH20LS50) and has a frequency, and power of 40 milliwatts, and 730 nanometers, respectively. First, the DVD disc is covered by a film of gold coated polyimide (Astral Technology Unlimited, Inc.) or a sheet of polyethylene terephthalate. This was coated with a 2% GO dispersion in water using the doctor blade technique and left to dry for 5 hours (h) under ambient conditions. A computer-designed image is inscribed onto graphite oxide to make the appropriate LSG pattern. This was followed by electrodeposition of $MnO_2$ from 0.02 M $Mn(NO_3)_2$ in 0.1 M $NaNO_3$ aqueous solution using a standard three electrode setup, where a piece of LSG (1 $cm^2$) is used as the working electrode, Ag/AgCl as the reference electrode (BASi, Indiana, USA), and a platinum foil (2 $cm^2$, Sigma-Aldrich) as the counter-electrode. The deposition was achieved by applying a constant current of 250 microamperes per square centimeter ($\mu A/cm^2$) for different time periods between 3 and 960 min. After electrodeposition, the working electrode was thoroughly washed with DI water to remove the excess electrolyte and dried in an oven at 60° C. for 1 h. The amount of $MnO_2$ deposited on the LSG framework was determined from the difference in weight of the electrode before and after electrodeposition using a high precision microbalance with a readability of 1 microgram ($\mu g$) (Mettler Toledo, MX5).

For comparison, $MnO_2$ was electrodeposited on other substrates such as gold-coated polyimide and graphene (CCG) paper. The gold-coated polyimide was obtained from Astral Technology Unlimited, Inc. (Minnesota, USA) and used without further treatment. The graphene paper was produced as described in Li D., et al., "Processable aqueous dispersions of graphene nanosheets." Nature Nanotechnology 3:101-105 (2008), incorporated by reference herein with respect to the relevant portions therein. The gold-coated polyimide and graphene paper are cut into rectangular strips of 1 $cm^2$ for further electrodeposition of $MnO_2$ under the same conditions as described above.

Assembly of Sandwich-Type Hybrid Supercapacitors

Figure 18A:
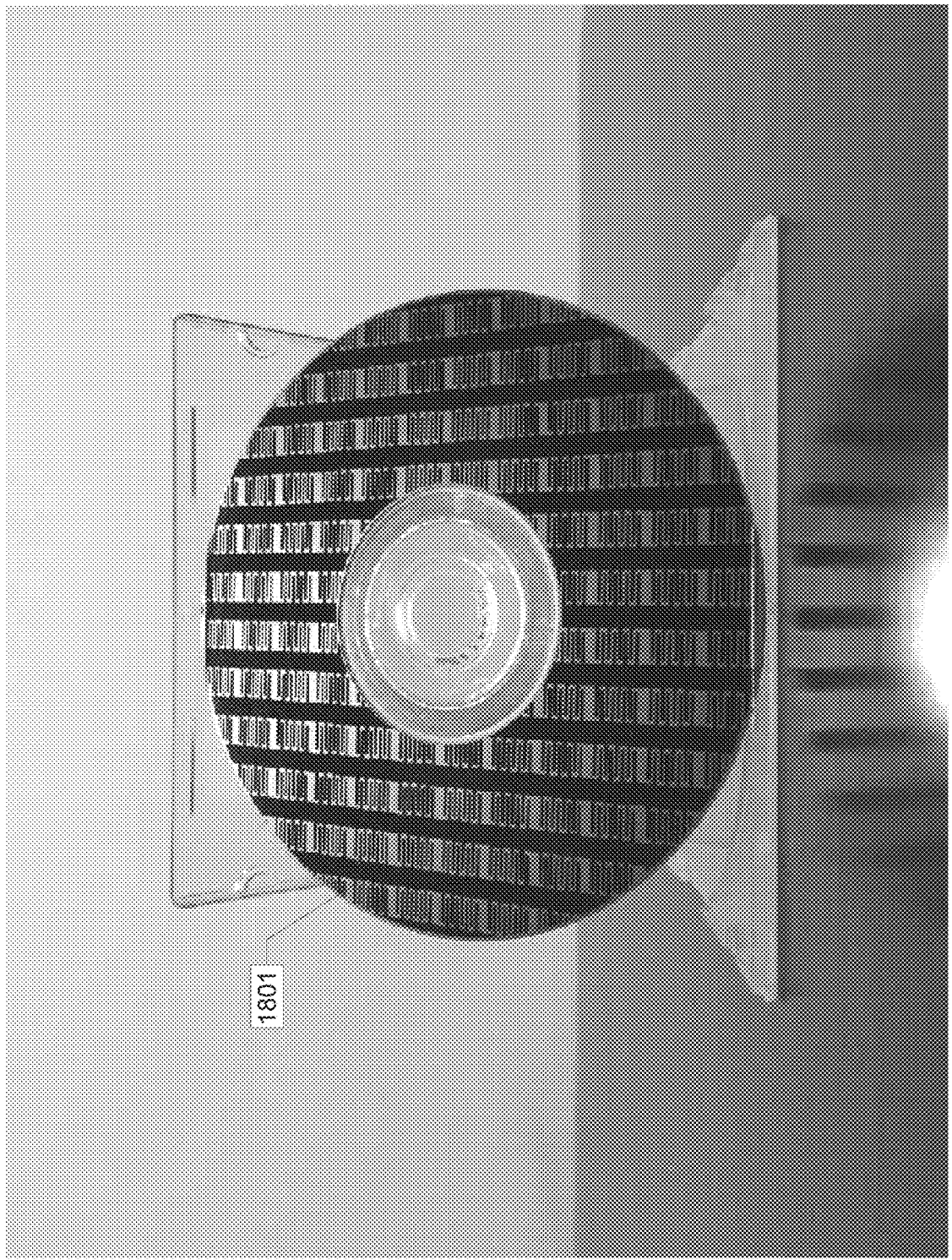
FIG. 18A shows an exemplary image of a LSG microsupercapacitor array wherein graphene is used to connect the supercapacitor cells, in accordance with some embodiments.
Figure 18B:
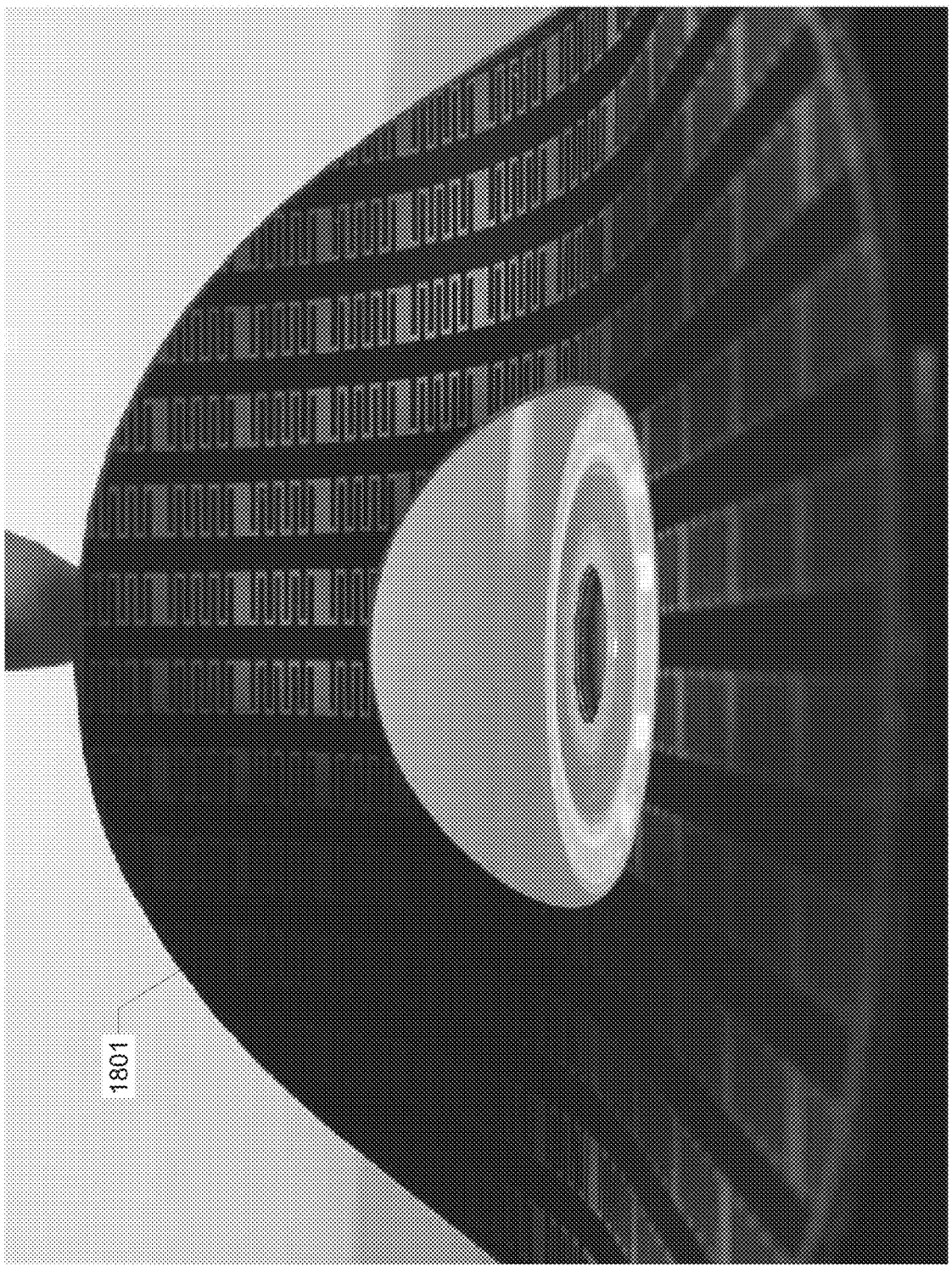
FIG. 18B shows an exemplary image of a flexed LSG microsupercapacitor array wherein graphene is used to connect the supercapacitor cells, in accordance with some embodiments.

Hybrid supercapacitors with sandwich structure are assembled using electrodes prepared in the previous section. Both symmetric and asymmetric supercapacitors are constructed. Symmetric supercapacitors are assembled by sandwiching a Celgard M824 (Celgard, N.C., USA) separator between two identical electrodes using 1.0 M $Na_2SO_4$ aqueous solution as the electrolyte. In the asymmetric structure, $LSG-MnO_2$ was used as the positive electrode and LSG as the negative electrode. For the LSG- and CCG-based supercapacitors, stainless steel (or copper) tape was attached to the electrodes, using silver paint, as the current collector. Before assembly, the electrodes are soaked in the electrolyte for 1 h to ensure proper wetting. In another embodiment, per FIGS. 18A-B, the electrodes are attached using a graphene film.

Fabrication of Interdigitated Hybrid Microsupercapacitors

An example of the fabrication process of a microsupercapacitor is illustrated in FIGS. 6A-I and described below. First, LSG interdigitated microelectrodes are inscribed directly on a GO film supported on a gold-coated polyimide (or a polyethylene terephthalate) substrate using a consumer grade DVD burner. Second, $MnO_2$ nanoflowers are grown on one set of the interdigitated electrodes using the electrodeposition setup described above. The applied current was normalized to the active LSG deposition area at a current density of 250 $\mu A/cm^2$ and the mass loading was controlled by adjusting the deposition time. Likewise, symmetric microsupercapacitors based on $LSG-MnO_2$ as both the positive and the negative electrodes are prepared as well. Here, the fabrication process is the same except that the two sides (instead of one side) of the bare interdigitated LSG electrodes are connected together using copper tape and used as the working electrode during electrodeposition. In another embodiment, per FIGS. 18A-B, the interdigitated LSG electrodes 1801 are connected together using a graphene film to form a flexible supercapacitor array.

Characterization and Measurements

The morphology and microstructure of the different electrodes were investigated by means of field emission scanning electron microscopy (JEOL 6700) equipped with energy dispersive spectroscopy (EDS) and optical microscopy (Zeiss Axiotech 100). XPS analysis was performed using a Kratos Axis Ultra DLD spectrometer. The thicknesses of the different components of the device were measured using cross-sectional scanning electron microscopy and a Dektak 6 profilometer. The electrochemical performances of the LSG-MSC supercapacitors were investigated by cyclic voltammetry (CV), galvanostatic charge/discharge tests, and electrochemical impedance spectroscopy (EIS). CV testing was performed on a VersaSTAT3 electrochemical workstation (Princeton Applied Research, USA). Charge/discharge and EIS measurements were recorded on a VMP3 workstation (Bio-Logic Inc., Knoxville, Tenn.) equipped with a 10 A current booster. EIS experiments were carried out over a frequency range of 1 megahertz (MHz) to 10 millihertz (mHz) with an amplitude of 10 millivolts (mV) at open-circuit potential.

Calculations

The capacitances of the supercapacitors were calculated based on both cyclic voltammetry (CV) profiles and galvanostatic charge/discharge curves (CC). For the CV technique, the capacitance was calculated by integrating the discharge current (i) vs. potential (E) plots using the following equation:

$$C_{device} = \frac{\int i\,dV}{v \times \Delta E} \quad (1)$$

where v is the scan rate (V/s) and $\Delta E$ is the operating potential window.

The capacitance was also calculated from the charge/discharge (CC) curves at different current densities using the formula:

$$C_{device} = \frac{i_{app}}{dE/dt} \quad (2)$$

where $i_{app}$ is the current applied (in amps, A), and dV/dt is the slope of the discharge curve (in volts per second, V/s). Specific capacitances were calculated based on the area and the volume of the device stack according to the following equations:

$$\text{Areal capacitance } (C_A) = \frac{C_{device}}{A} \quad (3)$$

$$\text{Volumetric stack capacitance } (C_V) = \frac{C_{device}}{V} \quad (4)$$

where A and V refer to the area (cm$^2$) and the volume (cm$^3$) of the device, respectively. The stack capacitances (F/cm$^3$) were calculated taking into account the volume of the device stack. This includes the active material, the current collector, and the separator with electrolyte.

The energy density of each device was obtained from the formula given in Equation (5):

$$E = \frac{1000}{2 \times 3600} C_V \Delta E^2 \quad (5)$$

where E is the energy density in Wh/L, $C_V$ is the volumetric stack capacitance obtained from galvanostatic charge/discharge curves using Equation (3) in F/cm$^3$ and $\Delta E$ is the operating voltage window in volts.

The power density of each device was calculated using the equation:

$$P = \frac{E}{t} \quad (6)$$

where P is the power density in W/L and t is the discharge time in hours.

Volumetric capacitance based on the volume of the active material only was calculated using the following equations:

Volumetric capacitance of the device, $$C_{v(device)} = \frac{C_{device}}{V} \quad (7)$$

where V is the volume of the active material on both electrodes;

Volumetric capacitance per electrode, $$C_{v(electrode)} = 4 \times C_{v(device)} \quad (8)$$

The specific capacitance contributed by MnO$_2$ alone was calculated by subtracting the charge of the bare LSG framework according to the equation $C_{s,MnO2} = (Q_{LSG/MnO2} - Q_{LSG})/(\Delta V \times m_{MnO2})$, where Q is the voltammetric charge, $\Delta V$ is the operating potential window and m is the mass.

Asymmetric supercapacitors may be configured such that there is a charge balance between the positive and negative electrodes (e.g., to achieve optimal performance with asymmetric supercapacitors). The charge stored by each electrode depends on its volumetric capacitance ($C_{v(electrode)}$), volume of the electrode (V), and the potential window in which the material operates ($\Delta E$).

$$q = C_{v(electrode)} \times V \times \Delta E \quad (9)$$

Charge balance can be attained when the following conditions are satisfied:

$$q_+ = q_- \quad (10)$$

$$\frac{V_+}{V_-} = \frac{C_{v(electrode)-} \times \Delta E_-}{C_{v(electrode)+} \times \Delta E_+} \quad (11)$$

The charge balance was achieved by adjusting the thickness of the positive and negative electrodes.

Comparison with Commercial Energy Storage Systems

The performance of a wide range of commercially available energy storage systems was tested for comparison with LSG-MnO$_2$ hybrid supercapacitors and microsupercapacitors. The tested energy storage systems include, for example, activated carbon (AC) supercapacitors, a pseudocapacitor (2.6 V, 35 mF), a battery-supercapacitor hybrid (lithium ion capacitor) (2.3 V, 220 F), an aluminum electrolytic capacitor (3 V, 300 microfarads (µF)) and a lithium thin-film battery (4 V/500 microampere-hours (µAh)). Activated carbon supercapacitors of varying sizes were tested: small size (2.7 V, 0.05 F), medium size (2.7 V, 10 F), and large size (2.7 V, 350 F). The activated carbon large cell (2.7 V, 350 F) was tested at a lower current density of 160 milliamps per cubic centimeter (mA/cm$^3$) due a 10 A maximum current limitation of measuring equipment. The devices were tested under the same dynamic conditions as the LSG-MnO$_2$ hybrid supercapacitors and microsupercapacitors.

XPS Analysis

XPS was used to analyze the chemical composition and the oxidation state of Mn in LSG-MnO$_2$ electrodes. The Mn 2p and Mn 3s spectra are presented in FIGS. 3F-G. The peaks of Mn 2p$_{3/2}$ and Mn 2p$_{1/2}$ are located at 642.1 electronvolts (eV) and 653.9 eV, respectively, with a spin energy separation of 11.6 eV. The peak separation of the Mn 3s doublet can be related to the oxidation state of Mn in manganese oxides (e.g., 5.79 eV for MnO, 5.50 eV for Mn$_3$O$_4$, 5.41 eV for Mn$_2$O$_3$ and 4.78 eV for MnO$_2$). The as-prepared LSG-MnO$_2$ showed a separation energy of 4.8 eV for the Mn 3s doublet (FIG. 3G), suggesting that the oxide is MnO$_2$, which was further confirmed from the O 1s spectrum.

Systems, devices, and methods herein may be adapted to other active materials. Such embodiments may enable, for example, fabrication of batteries comprising a plurality of interconnected battery cells, or other devices (e.g., photovoltaics, thermoelectrics or fuel cells) comprising cells with asymmetric electrodes.

Systems, devices, and methods herein (e.g., supercapacitors) may be used in a variety of applications, including but not limited to, for example, hybrid and electric vehicles, consumer electronics, military and space applications, and/or portable applications (e.g., smartphones, tablets, computers, etc.). Energy storage devices (e.g., high-voltage devices) herein can be compact, reliable, energy dense, charge quickly, possess both long cycle life and calendar life, or any combination thereof. In some cases, supercapacitors may be used to replace or complement batteries. For example, the hybrid supercapacitors herein may store as much charge as a lead acid battery, yet be recharged in seconds compared with hours for conventional batteries.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An electrochemical system comprising:
   a planar array of interconnected electrochemical cells;
   wherein each electrochemical cell comprises at least two electrodes,
   wherein each electrode comprises a charge storing active material comprising a three-dimensional interconnected corrugated carbon-based network (ICCN) comprising a plurality of expanded and interconnected carbon layers and having a plurality of pores, and
   wherein at least one electrode further comprises pseudocapacitive nanostructures electrodeposited within at least a portion of the plurality of pores; and
   a current collector coupled to the planar array of interconnected electrochemical cells.

2. The electrochemical system of claim 1, wherein the pseudocapacitive nanostructures comprise MnO$_2$, RuO$_2$, Co$_3$O$_4$, NiO, Fe$_2$O$_3$, CuO, MoO$_3$, V$_2$O$_5$, Ni(OH)$_2$, or any combination thereof.

3. The electrochemical system of claim 1, wherein the planar array of interconnected electrochemical cells is arranged in an interdigitated structure.

4. The electrochemical system of claim 1, further comprising an electrolyte disposed between the at least two electrodes.

5. The electrochemical system of claim 1, wherein at least one electrochemical cell is capable of outputting a voltage of at least about 5 volts.

6. The electrochemical system of claim 1, wherein the electrochemical system is capable of outputting a voltage of at least 100 volts.

7. The electrochemical system of claim 1, wherein at least one electrochemical cell has an energy density of at least about 22 watt-hours per liter (Wh/L).

8. The electrochemical system of claim 1, wherein the planar array of interconnected electrochemical cells has a capacitance per footprint of at least about 380 millifarads per square centimeter (mF/cm$^2$).

9. The electrochemical system of claim 1, wherein the planar array of interconnected electrochemical cells has a volumetric capacitance of at least about 1,100 farads per cubic centimeter (F/cm$^3$).

10. The electrochemical system of claim 1, comprising one or more positive electrodes having a first mass loading of the pseudocapacitive nanostructures and one or more negative electrodes having a second mass loading of the pseudocapacitive nanostructures, wherein the first mass loading is greater than the second mass loading.

11. The electrochemical system of claim 1, wherein the pseudocapacitive nanostructures comprise a pseudocapacitive nanoflower, a pseudocapacitive nanoflake, a pseudocapacitive nanorod, a pseudocapacitive nanowire, or any combination thereof.

12. A method for fabricating an electrochemical system, comprising:
    forming a carbonaceous film on a current collector;
    forming a charge storing active material comprising a three-dimensional interconnected corrugated carbon-based network (ICCN) having a plurality of pores from the carbonaceous film;
    patterning the three-dimensional interconnected corrugated carbon-based network (ICCN) to form an array of two or more cells, wherein each cell comprises at least two electrodes; and
    electrodepositing pseudocapacitive nanostructures within at least a portion of the plurality of pores.

13. The method of claim 12, wherein the carbonaceous film comprises graphene oxide (GO).

14. The method of claim 12, wherein said forming the charge storing active material comprising the three-dimensional interconnected corrugated carbon-based network (ICCN) from the carbonaceous film comprises light scribing.

15. The method of claim 12, wherein said patterning the three-dimensional interconnected corrugated carbon-based network (ICCN) comprises light scribing.

16. The method of claim 12, wherein said patterning the three-dimensional interconnected corrugated carbon-based network (ICCN) forms two or more interdigitated electrodes.

17. The method of claim 12, wherein the array of two or more cells is a planar array.

18. The method of claim 12, wherein the pseudocapacitive nanostructures comprise $MnO_2$, $RuO_2$, $Co_3O_4$, $NiO$, $Fe_2O_3$, $CuO$, $MoO_3$, $V_2O_5$, $Ni(OH)_2$, or any combination thereof.

19. The method of claim 12, further comprising depositing an electrolyte on the three-dimensional interconnected corrugated carbon-based network (ICCN).

20. The method of claim 12, further comprising connecting two or more cells within the array.

* * * * *